(12) United States Patent
Salkola

(10) Patent No.: US 11,663,812 B2
(45) Date of Patent: May 30, 2023

(54) RESOLVING ENTITIES FROM MULTIPLE DATA SOURCES FOR ASSISTANT SYSTEMS

(71) Applicant: Meta Platforms, Inc., Menlo Park, CA (US)

(72) Inventor: Markku Salkola, Los Altos, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 150 days.

(21) Appl. No.: 17/018,764

(22) Filed: Sep. 11, 2020

(65) Prior Publication Data
US 2020/0409936 A1 Dec. 31, 2020

Related U.S. Application Data

(63) Continuation of application No. 16/048,049, filed on Jul. 27, 2018, now Pat. No. 10,803,050.
(Continued)

(51) Int. Cl.
*A61N 1/00* (2006.01)
*G06F 16/332* (2019.01)
(Continued)

(52) U.S. Cl.
CPC .......... *G06F 16/3329* (2019.01); *G06F 3/011* (2013.01); *G06F 3/013* (2013.01);
(Continued)

(58) Field of Classification Search
CPC .... G06F 16/3329; G06F 9/453; G06F 16/243; G06F 16/9038; G06F 16/904;
(Continued)

(56) References Cited

U.S. PATENT DOCUMENTS

| 5,721,827 A | 2/1998 | Logan et al. |
| 5,872,850 A | 2/1999 | Klein et al. |

(Continued)

FOREIGN PATENT DOCUMENTS

| CN | 107909061 A | 4/2018 |
| JP | H1173297 A | 3/1999 |

(Continued)

OTHER PUBLICATIONS

US 11,531,820 B2, 12/2022, Liu et al. (withdrawn)
(Continued)

*Primary Examiner* — Isaac M Woo
(74) *Attorney, Agent, or Firm* — Baker Botts L.L.P.

(57) ABSTRACT

In one embodiment, a method includes receiving a request to access a first record in a plurality of records, where the first record describes a first set of attributes of a first entity, determining the first record is linked to a globally unique entity identifier, identifying one or more second records linked to the unique entity identifier, where the one or more second records describe one or more second sets of attributes of the first entity, generating a fused record comprising descriptions of attributes of the first entity from the first set and second sets of attributes, where the fused record is generated by deduping the plurality of records to associated the first record and the one or more second record with the unique entity identifier and compiling the first set and one or more second sets of attributes, and sending, in response responsive to the request to access the first record, instructions for presenting the fused record.

20 Claims, 17 Drawing Sheets

Related U.S. Application Data

(60) Provisional application No. 62/660,876, filed on Apr. 20, 2018.

(51) Int. Cl.

| | | |
|---|---|---|
| G06F 9/451 | (2018.01) |
| G10L 15/18 | (2013.01) |
| G10L 15/183 | (2013.01) |
| G10L 15/22 | (2006.01) |
| G06F 16/338 | (2019.01) |
| G06F 16/33 | (2019.01) |
| G06N 20/00 | (2019.01) |
| G06F 16/9535 | (2019.01) |
| G06Q 50/00 | (2012.01) |
| H04L 67/306 | (2022.01) |
| G06F 16/176 | (2019.01) |
| G10L 15/06 | (2013.01) |
| G10L 15/16 | (2006.01) |
| G06F 3/01 | (2006.01) |
| G06F 16/9032 | (2019.01) |
| G06F 16/2457 | (2019.01) |
| H04L 51/02 | (2022.01) |
| G06F 3/16 | (2006.01) |
| G06K 9/62 | (2022.01) |
| G06N 3/08 | (2023.01) |
| G10L 15/26 | (2006.01) |
| G06F 16/9038 | (2019.01) |
| G06F 16/904 | (2019.01) |
| G06F 40/30 | (2020.01) |
| G06F 40/40 | (2020.01) |
| G06F 16/22 | (2019.01) |
| G06F 16/23 | (2019.01) |
| G06F 7/14 | (2006.01) |
| H04L 43/0882 | (2022.01) |
| H04L 43/0894 | (2022.01) |
| H04L 12/28 | (2006.01) |
| H04L 41/00 | (2022.01) |
| H04L 41/22 | (2022.01) |
| H04W 12/08 | (2021.01) |
| G10L 15/07 | (2013.01) |
| G10L 17/22 | (2013.01) |
| G06N 3/006 | (2023.01) |
| G10L 17/06 | (2013.01) |
| G06F 16/248 | (2019.01) |
| G06F 16/951 | (2019.01) |
| G06F 16/242 | (2019.01) |
| G06F 16/2455 | (2019.01) |
| G10L 15/02 | (2006.01) |
| G10L 15/187 | (2013.01) |
| G06V 20/10 | (2022.01) |
| G06V 40/20 | (2022.01) |
| G06F 40/295 | (2020.01) |
| H04L 51/52 | (2022.01) |
| H04L 51/216 | (2022.01) |
| H04L 67/50 | (2022.01) |
| H04L 67/5651 | (2022.01) |
| G06N 7/00 | (2023.01) |
| H04L 51/18 | (2022.01) |
| H04L 67/75 | (2022.01) |
| G06F 16/903 | (2019.01) |
| G06F 40/205 | (2020.01) |
| H04L 67/10 | (2022.01) |
| H04L 51/046 | (2022.01) |
| G10L 13/00 | (2006.01) |
| G10L 13/04 | (2013.01) |
| H04L 67/53 | (2022.01) |

(52) U.S. Cl.
CPC ............. *G06F 3/017* (2013.01); *G06F 3/167* (2013.01); *G06F 7/14* (2013.01); *G06F 9/453* (2018.02); *G06F 16/176* (2019.01); *G06F 16/2255* (2019.01); *G06F 16/2365* (2019.01); *G06F 16/243* (2019.01); *G06F 16/248* (2019.01); *G06F 16/24552* (2019.01); *G06F 16/24575* (2019.01); *G06F 16/24578* (2019.01); *G06F 16/338* (2019.01); *G06F 16/3323* (2019.01); *G06F 16/3344* (2019.01); *G06F 16/904* (2019.01); *G06F 16/9038* (2019.01); *G06F 16/90332* (2019.01); *G06F 16/90335* (2019.01); *G06F 16/951* (2019.01); *G06F 16/9535* (2019.01); *G06F 40/205* (2020.01); *G06F 40/295* (2020.01); *G06F 40/30* (2020.01); *G06F 40/40* (2020.01); *G06K 9/6269* (2013.01); *G06N 3/006* (2013.01); *G06N 3/08* (2013.01); *G06N 7/005* (2013.01); *G06N 20/00* (2019.01); *G06Q 50/01* (2013.01); *G06V 20/10* (2022.01); *G06V 40/28* (2022.01); *G10L 15/02* (2013.01); *G10L 15/063* (2013.01); *G10L 15/07* (2013.01); *G10L 15/16* (2013.01); *G10L 15/183* (2013.01); *G10L 15/187* (2013.01); *G10L 15/1815* (2013.01); *G10L 15/1822* (2013.01); *G10L 15/22* (2013.01); *G10L 15/26* (2013.01); *G10L 17/06* (2013.01); *G10L 17/22* (2013.01); *H04L 12/2816* (2013.01); *H04L 41/20* (2013.01); *H04L 41/22* (2013.01); *H04L 43/0882* (2013.01); *H04L 43/0894* (2013.01); *H04L 51/02* (2013.01); *H04L 51/18* (2013.01); *H04L 51/216* (2022.05); *H04L 51/52* (2022.05); *H04L 67/306* (2013.01); *H04L 67/535* (2022.05); *H04L 67/5651* (2022.05); *H04L 67/75* (2022.05); *H04W 12/08* (2013.01); *G06F 2216/13* (2013.01); *G10L 13/00* (2013.01); *G10L 13/04* (2013.01); *G10L 2015/223* (2013.01); *G10L 2015/225* (2013.01); *H04L 51/046* (2013.01); *H04L 67/10* (2013.01); *H04L 67/53* (2022.05)

(58) Field of Classification Search
CPC ........... G06F 16/2255; G06F 16/24552; G06F 16/3323; G06F 16/90332; G06F 16/176; G06F 16/24575; G06F 16/3344; G06F 16/338; G06F 16/9535; G06F 16/2365; G06F 16/24578; G06F 16/951; G06F 16/248; G06F 40/40; G06F 40/295; G06F 40/30; G06F 3/011; G06F 3/013; G06F 3/017; G06F 3/167; G06F 7/14; G06F 2216/13; G06N 20/00; G06N 3/006; G06N 3/08; G06N 7/005; G06V 40/28; G06V 20/10; H04L 67/5651; H04L 51/216; H04L 51/52; H04L 67/535; H04L 67/75; H04L 12/2816; H04L 41/20; H04L 41/22; H04L 43/0882; H04L 43/0894; H04L 51/02; H04L 51/18; H04L 67/306; H04L 67/53; H04L 51/046; H04L 67/10; G06K 9/6269; G06Q 50/01; G10L 15/02; G10L 15/063; G10L 15/07; G10L 15/16; G10L 15/1815; G10L 15/1822; G10L 15/183; G10L 15/187; G10L 15/22; G10L 15/26; G10L 17/06; G10L 17/22; G10L 13/00; G10L 13/04; G10L 2015/223; G10L 2015/225; H04W 12/08
USPC .................................................. 707/600–899
See application file for complete search history.

(56) References Cited

U.S. PATENT DOCUMENTS

| | | | |
|---|---|---|---|
| 6,026,424 A | 2/2000 | Circenis |
| 6,233,575 B1 | 5/2001 | Agrawal et al. |
| 6,243,761 B1 | 6/2001 | Mogul et al. |
| 6,510,451 B2 | 1/2003 | Wu et al. |
| 6,578,025 B1 | 6/2003 | Pollack et al. |
| 6,665,640 B1 | 12/2003 | Bennett et al. |
| 6,901,364 B2 | 5/2005 | Nguyen et al. |
| 6,968,333 B2 | 11/2005 | Abbott et al. |
| 6,990,513 B2 | 1/2006 | Belfiore et al. |
| 7,069,215 B1 | 6/2006 | Bangalore et al. |
| 7,080,004 B2 | 7/2006 | Wang et al. |
| 7,406,408 B1 | 7/2008 | Lackey et al. |
| 7,426,537 B2 | 9/2008 | Lee et al. |
| 7,467,087 B1 | 12/2008 | Gillick et al. |
| 7,624,007 B2 | 11/2009 | Bennett |
| 7,702,508 B2 | 4/2010 | Bennett |
| 8,019,748 B1 | 9/2011 | Wu et al. |
| 8,112,275 B2 | 2/2012 | Kennewick et al. |
| 8,190,627 B2 | 5/2012 | Platt et al. |
| 8,195,468 B2 | 6/2012 | Weider et al. |
| 8,478,581 B2 | 7/2013 | Chen |
| 8,504,349 B2 | 8/2013 | Manu et al. |
| 8,619,767 B2 | 12/2013 | Ohashi |
| 8,817,951 B2 | 8/2014 | Goffin et al. |
| 8,868,592 B1 | 10/2014 | Weininger et al. |
| 8,938,394 B1 | 1/2015 | Faaborg et al. |
| 8,949,250 B1 | 2/2015 | Garg et al. |
| 8,995,981 B1 | 3/2015 | Aginsky et al. |
| 9,026,145 B1 | 5/2015 | Duleba et al. |
| 9,098,575 B2 | 8/2015 | Ilyas et al. |
| 9,171,341 B1 | 10/2015 | Trandal et al. |
| 9,177,291 B2 | 11/2015 | Martinazzi et al. |
| 9,195,436 B2 | 11/2015 | Mytkowicz et al. |
| 9,251,471 B2 | 2/2016 | Pinckney et al. |
| 9,344,338 B2 | 5/2016 | Quillen et al. |
| 9,367,806 B1 | 6/2016 | Cosic |
| 9,443,527 B1 | 9/2016 | Watanabe et al. |
| 9,508,341 B1 | 11/2016 | Parlikar et al. |
| 9,639,608 B2 | 5/2017 | Freeman |
| 9,660,950 B2 | 5/2017 | Archibong et al. |
| 9,686,577 B2 | 6/2017 | Tseng et al. |
| 9,720,955 B1 | 8/2017 | Cao et al. |
| 9,767,309 B1 | 9/2017 | Patel et al. |
| 9,785,717 B1 | 10/2017 | DeLuca |
| 9,824,321 B2 | 11/2017 | Raghunathan et al. |
| 9,881,077 B1 | 1/2018 | Alfonseca et al. |
| 9,916,753 B2 | 3/2018 | Aginsky et al. |
| 9,959,328 B2 | 5/2018 | Jain et al. |
| 9,986,394 B1 | 5/2018 | Taylor et al. |
| 10,108,707 B1 | 10/2018 | Chu et al. |
| 10,109,273 B1 | 10/2018 | Rajasekaram et al. |
| 10,127,220 B2 | 11/2018 | Bellegarda et al. |
| 10,127,227 B1 | 11/2018 | Badr et al. |
| 10,133,613 B2 | 11/2018 | Surti et al. |
| 10,162,886 B2 | 12/2018 | Wang et al. |
| 10,220,303 B1 | 3/2019 | Schmidt et al. |
| 10,229,680 B1 | 3/2019 | Gillespie et al. |
| 10,255,365 B2 | 4/2019 | Campbell et al. |
| 10,262,062 B2 | 4/2019 | Chang et al. |
| 10,336,856 B2 | 7/2019 | Stache et al. |
| 10,348,658 B2 | 7/2019 | Rodriguez et al. |
| 10,354,307 B2 | 7/2019 | Ye et al. |
| 10,387,464 B2 | 8/2019 | Weston et al. |
| 10,409,818 B1 | 9/2019 | Hayes et al. |
| 10,412,026 B2 | 9/2019 | Sherrets et al. |
| 10,418,032 B1 | 9/2019 | Mohajer et al. |
| 10,462,422 B1 | 10/2019 | Harrison et al. |
| 10,467,282 B2 | 11/2019 | Shorman et al. |
| 10,482,182 B1 | 11/2019 | Jankowski, Jr. |
| 10,504,513 B1 | 12/2019 | Gray et al. |
| 10,511,808 B2 | 12/2019 | Harrison et al. |
| 10,515,625 B1 | 12/2019 | Metallinou et al. |
| 10,574,613 B2 | 2/2020 | Leiba et al. |
| 10,579,688 B2 | 3/2020 | Green |
| 10,600,406 B1 | 3/2020 | Shapiro et al. |
| 10,649,985 B1 | 5/2020 | Cornell, Jr. et al. |
| 10,679,008 B2 | 6/2020 | Dubey et al. |
| 10,719,786 B1 | 7/2020 | Treseler et al. |
| 10,761,866 B2 | 9/2020 | Liu et al. |
| 10,762,903 B1 | 9/2020 | Kahan et al. |
| 10,782,986 B2 | 9/2020 | Martin |
| 10,810,256 B1 | 10/2020 | Goldberg et al. |
| 10,839,098 B2 | 11/2020 | Borup et al. |
| 10,841,249 B2 | 11/2020 | Lim et al. |
| 10,854,206 B1 | 12/2020 | Liu et al. |
| 10,855,485 B1 | 12/2020 | Zhou et al. |
| 10,867,256 B2 | 12/2020 | Bugay et al. |
| 10,878,337 B2 | 12/2020 | Katsuki et al. |
| 10,896,295 B1 | 1/2021 | Shenoy |
| 10,949,616 B1 | 3/2021 | Shenoy et al. |
| 10,957,329 B1 | 3/2021 | Liu et al. |
| 10,958,599 B1 | 3/2021 | Penov et al. |
| 10,963,273 B2 | 3/2021 | Peng et al. |
| 10,977,258 B1 | 4/2021 | Liu et al. |
| 10,977,711 B1 | 4/2021 | Verma et al. |
| 10,978,056 B1 | 4/2021 | Challa et al. |
| 11,009,961 B2 | 5/2021 | Moscarillo |
| 11,038,974 B1 | 6/2021 | Koukoumidis et al. |
| 11,042,554 B1 | 6/2021 | Balakrishnan et al. |
| 11,086,858 B1 | 8/2021 | Koukoumidis et al. |
| 11,087,756 B1 | 8/2021 | William et al. |
| 11,120,158 B2 | 9/2021 | Hockey et al. |
| 11,159,767 B1 | 10/2021 | Kamisetty et al. |
| 11,245,646 B1 | 2/2022 | Koukoumidis |
| 11,308,169 B1 | 4/2022 | Koukoumidis et al. |
| 11,436,300 B1 | 9/2022 | Felt et al. |
| 11,443,358 B2 | 9/2022 | Chow |
| 2001/0036297 A1 | 11/2001 | Ikegami et al. |
| 2002/0015480 A1 | 2/2002 | Daswani et al. |
| 2002/0111917 A1 | 8/2002 | Hoffman et al. |
| 2002/0141621 A1 | 10/2002 | Lane |
| 2002/0152067 A1 | 10/2002 | Viikki et al. |
| 2002/0165912 A1 | 11/2002 | Wenocur et al. |
| 2003/0005174 A1 | 1/2003 | Coffman et al. |
| 2003/0046083 A1 | 3/2003 | Devinney, Jr. et al. |
| 2003/0126330 A1 | 7/2003 | Balasuriya |
| 2003/0182125 A1 | 9/2003 | Phillips et al. |
| 2003/0220095 A1 | 11/2003 | Engelhart |
| 2004/0019487 A1 | 1/2004 | Kleindienst et al. |
| 2004/0019489 A1 | 1/2004 | Funk et al. |
| 2004/0044516 A1 | 3/2004 | Kennewick et al. |
| 2004/0075690 A1 | 4/2004 | Cirne |
| 2004/0085162 A1 | 5/2004 | Agarwal et al. |
| 2004/0098253 A1 | 5/2004 | Balentine et al. |
| 2004/0186819 A1 | 9/2004 | Baker |
| 2004/0230572 A1 | 11/2004 | Omoigui |
| 2004/0236580 A1 | 11/2004 | Bennett |
| 2005/0004907 A1 | 1/2005 | Bruno et al. |
| 2005/0135595 A1 | 6/2005 | Bushey et al. |
| 2005/0144284 A1 | 6/2005 | Ludwig et al. |
| 2005/0149327 A1 | 7/2005 | Roth et al. |
| 2006/0047617 A1 | 3/2006 | Bacioiu et al. |
| 2006/0294546 A1 | 12/2006 | Ro et al. |
| 2007/0028264 A1 | 2/2007 | Lowe |
| 2007/0073678 A1 | 3/2007 | Scott et al. |
| 2007/0073745 A1 | 3/2007 | Scott et al. |
| 2007/0124147 A1 | 5/2007 | Gopinath et al. |
| 2007/0124263 A1 | 5/2007 | Katariya et al. |
| 2007/0136058 A1 | 6/2007 | Jeong et al. |
| 2007/0185712 A1 | 8/2007 | Jeong et al. |
| 2007/0239454 A1 | 10/2007 | Paek et al. |
| 2007/0270126 A1 | 11/2007 | Forbes et al. |
| 2007/0300224 A1 | 12/2007 | Aggarwal et al. |
| 2008/0015864 A1 | 1/2008 | Ross et al. |
| 2008/0028036 A1 | 1/2008 | Slawson et al. |
| 2008/0095187 A1 | 4/2008 | Jung et al. |
| 2008/0107255 A1 | 5/2008 | Geva et al. |

(56) References Cited

U.S. PATENT DOCUMENTS

| | | |
|---|---|---|
| 2008/0178126 A1 | 7/2008 | Beeck et al. |
| 2008/0189269 A1 | 8/2008 | Olsen |
| 2008/0209577 A1 | 8/2008 | Vrielink et al. |
| 2008/0222142 A1 | 9/2008 | O'Donnell |
| 2008/0243885 A1 | 10/2008 | Harger et al. |
| 2008/0300884 A1 | 12/2008 | Smith |
| 2008/0313162 A1 | 12/2008 | Bahrami et al. |
| 2009/0007127 A1 | 1/2009 | Roberts et al. |
| 2009/0070113 A1 | 3/2009 | Gupta et al. |
| 2009/0119581 A1 | 5/2009 | Velusamy |
| 2009/0150322 A1 | 6/2009 | Bower et al. |
| 2009/0178011 A1 | 7/2009 | Ording et al. |
| 2009/0191521 A1 | 7/2009 | Paul et al. |
| 2009/0228439 A1 | 9/2009 | Manolescu et al. |
| 2009/0265299 A1 | 10/2009 | Hadad et al. |
| 2009/0282033 A1 | 11/2009 | Alshawi |
| 2009/0300525 A1 | 12/2009 | Jolliff et al. |
| 2009/0326945 A1 | 12/2009 | Tian |
| 2010/0064345 A1 | 3/2010 | Bentley et al. |
| 2010/0125456 A1 | 5/2010 | Weng et al. |
| 2010/0138215 A1 | 6/2010 | Williams |
| 2010/0138224 A1 | 6/2010 | Bedingfield, Sr. |
| 2010/0199320 A1 | 8/2010 | Ramanathan et al. |
| 2010/0217794 A1 | 8/2010 | Strandell et al. |
| 2010/0217837 A1 | 8/2010 | Ansari et al. |
| 2010/0241431 A1 | 9/2010 | Weng et al. |
| 2010/0241639 A1 | 9/2010 | Kifer et al. |
| 2010/0299329 A1 | 11/2010 | Emanuel et al. |
| 2010/0306191 A1 | 12/2010 | LeBeau et al. |
| 2010/0306249 A1 | 12/2010 | Hill et al. |
| 2011/0040751 A1 | 2/2011 | Chandrasekar et al. |
| 2011/0078615 A1 | 3/2011 | Bier |
| 2011/0119216 A1 | 5/2011 | Wigdor |
| 2011/0137918 A1 | 6/2011 | Yasrebi et al. |
| 2011/0153324 A1 | 6/2011 | Ballinger et al. |
| 2011/0153423 A1 | 6/2011 | Elvekrog et al. |
| 2011/0153863 A1 | 6/2011 | Khan et al. |
| 2011/0161348 A1 | 6/2011 | Oron |
| 2011/0184768 A1 | 7/2011 | Norton et al. |
| 2011/0238754 A1 | 9/2011 | Dasilva et al. |
| 2011/0246383 A1 | 10/2011 | Gibson et al. |
| 2011/0264522 A1 | 10/2011 | Chan et al. |
| 2012/0016678 A1 | 1/2012 | Gruber et al. |
| 2012/0019446 A1 | 1/2012 | Wu et al. |
| 2012/0022872 A1 | 1/2012 | Gruber et al. |
| 2012/0023120 A1 | 1/2012 | Kanefsky |
| 2012/0030301 A1 | 2/2012 | Herold et al. |
| 2012/0041907 A1 | 2/2012 | Wang et al. |
| 2012/0053945 A1 | 3/2012 | Gupta et al. |
| 2012/0069131 A1 | 3/2012 | Abelow |
| 2012/0078889 A1 | 3/2012 | Chu-Carroll et al. |
| 2012/0078891 A1 | 3/2012 | Brown et al. |
| 2012/0081303 A1 | 4/2012 | Cassar et al. |
| 2012/0101806 A1 | 4/2012 | Davis et al. |
| 2012/0101865 A1 | 4/2012 | Zhakov |
| 2012/0109858 A1 | 5/2012 | Makadia et al. |
| 2012/0117051 A1 | 5/2012 | Liu et al. |
| 2012/0159507 A1 | 6/2012 | Kwon et al. |
| 2012/0159635 A1 | 6/2012 | He et al. |
| 2012/0163224 A1 | 6/2012 | Long |
| 2012/0179453 A1 | 7/2012 | Ghani et al. |
| 2012/0179481 A1 | 7/2012 | Patel et al. |
| 2012/0179633 A1 | 7/2012 | Ghani et al. |
| 2012/0179694 A1 | 7/2012 | Sciacca et al. |
| 2012/0190386 A1 | 7/2012 | Anderson |
| 2012/0205436 A1 | 8/2012 | Thomas et al. |
| 2012/0232885 A1 | 9/2012 | Barbosa et al. |
| 2012/0233188 A1 | 9/2012 | Majumdar |
| 2012/0245944 A1 | 9/2012 | Gruber et al. |
| 2012/0254188 A1 | 10/2012 | Koperski et al. |
| 2012/0265787 A1 | 10/2012 | Hsu et al. |
| 2012/0278164 A1 | 11/2012 | Spivack et al. |
| 2012/0290950 A1 | 11/2012 | Rapaport et al. |
| 2012/0294477 A1 | 11/2012 | Yang et al. |
| 2012/0297294 A1 | 11/2012 | Scott et al. |
| 2012/0303356 A1 | 11/2012 | Boyle et al. |
| 2012/0311035 A1* | 12/2012 | Guha .............. G06Q 30/08 709/204 |
| 2012/0311126 A1 | 12/2012 | Jadallah et al. |
| 2013/0035930 A1 | 2/2013 | Ferrucci et al. |
| 2013/0046544 A1 | 2/2013 | Kay et al. |
| 2013/0054631 A1 | 2/2013 | Govani et al. |
| 2013/0073387 A1 | 3/2013 | Heath |
| 2013/0073389 A1 | 3/2013 | Heath |
| 2013/0073400 A1 | 3/2013 | Heath |
| 2013/0073473 A1 | 3/2013 | Heath |
| 2013/0117832 A1 | 5/2013 | Gandhi et al. |
| 2013/0124538 A1 | 5/2013 | Lee et al. |
| 2013/0191250 A1 | 7/2013 | Bradley et al. |
| 2013/0191416 A1 | 7/2013 | Lee et al. |
| 2013/0194193 A1 | 8/2013 | Kawalkar |
| 2013/0204813 A1 | 8/2013 | Master et al. |
| 2013/0226892 A1 | 8/2013 | Ehsani et al. |
| 2013/0238332 A1 | 9/2013 | Chen |
| 2013/0246521 A1 | 9/2013 | Schacht et al. |
| 2013/0254139 A1 | 9/2013 | Lei |
| 2013/0262752 A1 | 10/2013 | Talagala et al. |
| 2013/0265218 A1 | 10/2013 | Moscarillo |
| 2013/0268624 A1 | 10/2013 | Yagiura |
| 2013/0275441 A1 | 10/2013 | Agrawal et al. |
| 2013/0277564 A1 | 10/2013 | Teshima et al. |
| 2013/0289999 A1 | 10/2013 | Hymel |
| 2013/0290205 A1 | 10/2013 | Bonmassar et al. |
| 2013/0317858 A1 | 11/2013 | Hasan et al. |
| 2013/0346077 A1 | 12/2013 | Mengibar et al. |
| 2013/0346877 A1 | 12/2013 | Borovoy et al. |
| 2014/0012926 A1 | 1/2014 | Narayanan et al. |
| 2014/0019459 A1 | 1/2014 | Gradin et al. |
| 2014/0025702 A1 | 1/2014 | Curtiss et al. |
| 2014/0032659 A1 | 1/2014 | Marini et al. |
| 2014/0039895 A1 | 2/2014 | Aravamudan et al. |
| 2014/0040748 A1 | 2/2014 | Lemay et al. |
| 2014/0074483 A1 | 3/2014 | Van Os |
| 2014/0074934 A1 | 3/2014 | Van Hoff et al. |
| 2014/0094307 A1 | 4/2014 | Doolittle et al. |
| 2014/0104177 A1 | 4/2014 | Ouyang |
| 2014/0108307 A1 | 4/2014 | Raghunathan et al. |
| 2014/0108453 A1 | 4/2014 | Venkataraman et al. |
| 2014/0108562 A1 | 4/2014 | Panzer |
| 2014/0108989 A1 | 4/2014 | Bi et al. |
| 2014/0115410 A1 | 4/2014 | Kealy et al. |
| 2014/0122622 A1 | 5/2014 | Castera et al. |
| 2014/0129266 A1 | 5/2014 | Perl et al. |
| 2014/0143879 A1 | 5/2014 | Milman et al. |
| 2014/0195371 A1 | 7/2014 | Kageyama et al. |
| 2014/0207860 A1 | 7/2014 | Wang et al. |
| 2014/0222422 A1 | 8/2014 | Sarikaya et al. |
| 2014/0225931 A1 | 8/2014 | Plagemann et al. |
| 2014/0236591 A1 | 8/2014 | Yue et al. |
| 2014/0244712 A1 | 8/2014 | Walters et al. |
| 2014/0255887 A1 | 9/2014 | Xu et al. |
| 2014/0258191 A1 | 9/2014 | Gubin et al. |
| 2014/0280001 A1 | 9/2014 | Stein |
| 2014/0280017 A1 | 9/2014 | Indarapu et al. |
| 2014/0282153 A1 | 9/2014 | Christiansen et al. |
| 2014/0282276 A1 | 9/2014 | Drucker et al. |
| 2014/0282956 A1 | 9/2014 | Kennedy et al. |
| 2014/0297284 A1 | 10/2014 | Gruber et al. |
| 2014/0310470 A1 | 10/2014 | Rash et al. |
| 2014/0310614 A1 | 10/2014 | Jones |
| 2014/0314283 A1 | 10/2014 | Harding |
| 2014/0358539 A1 | 12/2014 | Rao et al. |
| 2014/0358890 A1 | 12/2014 | Chen et al. |
| 2014/0365216 A1 | 12/2014 | Gruber et al. |
| 2014/0365919 A1 | 12/2014 | Shaw et al. |
| 2014/0379340 A1 | 12/2014 | Timem et al. |
| 2015/0006286 A1 | 1/2015 | Liu et al. |
| 2015/0012345 A1 | 1/2015 | Bhagat et al. |
| 2015/0012524 A1 | 1/2015 | Heymans et al. |
| 2015/0019227 A1 | 1/2015 | Anandarajah |
| 2015/0032504 A1 | 1/2015 | Elango et al. |
| 2015/0046841 A1 | 2/2015 | Sharon et al. |
| 2015/0058720 A1 | 2/2015 | Smadja et al. |
| 2015/0067502 A1 | 3/2015 | Yang et al. |

(56) References Cited

U.S. PATENT DOCUMENTS

| | | |
|---|---|---|
| 2015/0073907 A1 | 3/2015 | Purves et al. |
| 2015/0078613 A1 | 3/2015 | Forutanpour et al. |
| 2015/0081321 A1 | 3/2015 | Jain |
| 2015/0081674 A1 | 3/2015 | Ali et al. |
| 2015/0082229 A1 | 3/2015 | Ouyang et al. |
| 2015/0088665 A1 | 3/2015 | Karlsson |
| 2015/0095033 A1 | 4/2015 | Boies et al. |
| 2015/0100524 A1 | 4/2015 | Pantel et al. |
| 2015/0142420 A1 | 5/2015 | Sarikaya et al. |
| 2015/0142447 A1 | 5/2015 | Kennewick et al. |
| 2015/0142704 A1 | 5/2015 | London |
| 2015/0149182 A1 | 5/2015 | Kalns et al. |
| 2015/0154001 A1 | 6/2015 | Knox et al. |
| 2015/0169284 A1 | 6/2015 | Quast et al. |
| 2015/0169744 A1 | 6/2015 | Walkingshaw et al. |
| 2015/0170050 A1 | 6/2015 | Price |
| 2015/0185827 A1 | 7/2015 | Sayed |
| 2015/0186156 A1 | 7/2015 | Brown et al. |
| 2015/0199333 A1 | 7/2015 | Nekhay |
| 2015/0199715 A1 | 7/2015 | Caron et al. |
| 2015/0207765 A1 | 7/2015 | Brantingham et al. |
| 2015/0220777 A1 | 8/2015 | Kauffmann et al. |
| 2015/0220888 A1 | 8/2015 | Iyer |
| 2015/0227519 A1 | 8/2015 | Clark et al. |
| 2015/0228275 A1 | 8/2015 | Watanabe et al. |
| 2015/0242525 A1 | 8/2015 | Perlegos |
| 2015/0242787 A1 | 8/2015 | Bernstein et al. |
| 2015/0248476 A1 | 9/2015 | Weissinger et al. |
| 2015/0256636 A1 | 9/2015 | Spivack et al. |
| 2015/0278691 A1 | 10/2015 | Xia et al. |
| 2015/0278922 A1 | 10/2015 | Isaacson et al. |
| 2015/0286747 A1 | 10/2015 | Anastasakos et al. |
| 2015/0293995 A1 | 10/2015 | Chen et al. |
| 2015/0317302 A1 | 11/2015 | Liu et al. |
| 2015/0331853 A1 | 11/2015 | Palmonari et al. |
| 2015/0332672 A1 | 11/2015 | Akbacak et al. |
| 2015/0339303 A1 | 11/2015 | Perlegos |
| 2015/0347375 A1 | 12/2015 | Tremblay et al. |
| 2015/0347572 A1 | 12/2015 | Yang et al. |
| 2015/0348543 A1 | 12/2015 | Zhao et al. |
| 2015/0363393 A1 | 12/2015 | Williams et al. |
| 2015/0370798 A1 | 12/2015 | Ju et al. |
| 2015/0373565 A1 | 12/2015 | Safavi |
| 2015/0379426 A1 | 12/2015 | Steele et al. |
| 2015/0379568 A1 | 12/2015 | Balasubramanian et al. |
| 2015/0379981 A1 | 12/2015 | Balasubramanian et al. |
| 2016/0004862 A1 | 1/2016 | Almehmadi et al. |
| 2016/0019290 A1 | 1/2016 | Ratnaparkhi et al. |
| 2016/0021179 A1 | 1/2016 | James et al. |
| 2016/0037311 A1 | 2/2016 | Cho |
| 2016/0042069 A1 | 2/2016 | Lee-Goldman et al. |
| 2016/0042249 A1 | 2/2016 | Babenko et al. |
| 2016/0048527 A1 | 2/2016 | Li |
| 2016/0063118 A1 | 3/2016 | Campbell et al. |
| 2016/0063553 A1 | 3/2016 | Pesochinsky |
| 2016/0070449 A1 | 3/2016 | Christiansen et al. |
| 2016/0080485 A1 | 3/2016 | Hamedi |
| 2016/0092160 A1 | 3/2016 | Graff et al. |
| 2016/0092598 A1 | 3/2016 | Mishra |
| 2016/0093298 A1 | 3/2016 | Naik et al. |
| 2016/0093304 A1 | 3/2016 | Kim et al. |
| 2016/0098482 A1 | 4/2016 | Moon et al. |
| 2016/0110381 A1 | 4/2016 | Chen et al. |
| 2016/0117360 A1 | 4/2016 | Kunc et al. |
| 2016/0156574 A1 | 6/2016 | Hum et al. |
| 2016/0156584 A1 | 6/2016 | Hum et al. |
| 2016/0163311 A1 | 6/2016 | Crook et al. |
| 2016/0170989 A1 | 6/2016 | Bishop et al. |
| 2016/0173568 A1 | 6/2016 | Penilla et al. |
| 2016/0188565 A1 | 6/2016 | Robichaud et al. |
| 2016/0188671 A1 | 6/2016 | Gupta et al. |
| 2016/0188727 A1 | 6/2016 | Waibel et al. |
| 2016/0188730 A1 | 6/2016 | Delli Santi et al. |
| 2016/0196491 A1 | 7/2016 | Chandrasekaran et al. |
| 2016/0203002 A1 | 7/2016 | Kannan et al. |
| 2016/0203238 A1 | 7/2016 | Cherniavskii et al. |
| 2016/0210363 A1 | 7/2016 | Rambhia et al. |
| 2016/0210963 A1 | 7/2016 | Kim et al. |
| 2016/0217124 A1 | 7/2016 | Sarikaya et al. |
| 2016/0219078 A1 | 7/2016 | Porras et al. |
| 2016/0239751 A1 | 8/2016 | Mosterman et al. |
| 2016/0253630 A1 | 9/2016 | Oliveri et al. |
| 2016/0261545 A1 | 9/2016 | Bastide et al. |
| 2016/0269472 A1 | 9/2016 | Byron et al. |
| 2016/0283016 A1 | 9/2016 | Zaitsev et al. |
| 2016/0292582 A1 | 10/2016 | Kozloski et al. |
| 2016/0306505 A1 | 10/2016 | Vigneras et al. |
| 2016/0307571 A1 | 10/2016 | Mizumoto et al. |
| 2016/0308799 A1 | 10/2016 | Schubert et al. |
| 2016/0320853 A1 | 11/2016 | Lien et al. |
| 2016/0336006 A1 | 11/2016 | Levit et al. |
| 2016/0336008 A1 | 11/2016 | Menezes et al. |
| 2016/0364382 A1 | 12/2016 | Sarikaya |
| 2016/0371378 A1 | 12/2016 | Fan et al. |
| 2016/0372116 A1 | 12/2016 | Summerfield |
| 2016/0379213 A1 | 12/2016 | Isaacson et al. |
| 2016/0381220 A1 | 12/2016 | Kurganov |
| 2017/0005803 A1 | 1/2017 | Brownewell et al. |
| 2017/0019362 A1 | 1/2017 | Kim et al. |
| 2017/0025117 A1 | 1/2017 | Hong |
| 2017/0026318 A1 | 1/2017 | Daniel et al. |
| 2017/0034112 A1 | 2/2017 | Perlegos |
| 2017/0061294 A1 | 3/2017 | Weston et al. |
| 2017/0061956 A1 | 3/2017 | Sarikaya et al. |
| 2017/0063887 A1 | 3/2017 | Muddu et al. |
| 2017/0091171 A1 | 3/2017 | Perez |
| 2017/0092264 A1 | 3/2017 | Hakkani-Tur et al. |
| 2017/0098236 A1 | 4/2017 | Lee et al. |
| 2017/0125012 A1 | 5/2017 | Kanthak et al. |
| 2017/0132688 A1 | 5/2017 | Freund et al. |
| 2017/0139938 A1 | 5/2017 | Balasubramanian et al. |
| 2017/0147676 A1 | 5/2017 | Jaidka et al. |
| 2017/0147696 A1 | 5/2017 | Evnine |
| 2017/0148073 A1 | 5/2017 | Nomula et al. |
| 2017/0169013 A1 | 6/2017 | Sarikaya et al. |
| 2017/0169354 A1 | 6/2017 | Diamanti et al. |
| 2017/0177715 A1 | 6/2017 | Chang et al. |
| 2017/0178626 A1 | 6/2017 | Gruber et al. |
| 2017/0180276 A1 | 6/2017 | Gershony et al. |
| 2017/0185375 A1 | 6/2017 | Martel et al. |
| 2017/0188101 A1 | 6/2017 | Srinivasaraghavan |
| 2017/0193390 A1 | 7/2017 | Weston et al. |
| 2017/0206271 A1 | 7/2017 | Jain |
| 2017/0206405 A1 | 7/2017 | Molchanov et al. |
| 2017/0220426 A1 | 8/2017 | Sankar et al. |
| 2017/0221475 A1 | 8/2017 | Bruguier et al. |
| 2017/0228240 A1 | 8/2017 | Khan et al. |
| 2017/0235360 A1 | 8/2017 | George-Svahn |
| 2017/0235726 A1 | 8/2017 | Wang et al. |
| 2017/0235740 A1 | 8/2017 | Seih et al. |
| 2017/0235848 A1 | 8/2017 | Van Dusen et al. |
| 2017/0243107 A1 | 8/2017 | Jolley et al. |
| 2017/0249059 A1 | 8/2017 | Houseworth |
| 2017/0255536 A1 | 9/2017 | Weissinger et al. |
| 2017/0263242 A1 | 9/2017 | Nagao |
| 2017/0270180 A1 | 9/2017 | State |
| 2017/0270919 A1 | 9/2017 | Parthasarathi et al. |
| 2017/0270929 A1 | 9/2017 | Aleksic et al. |
| 2017/0278514 A1 | 9/2017 | Mathias et al. |
| 2017/0286401 A1 | 10/2017 | He et al. |
| 2017/0287474 A1 | 10/2017 | Maergner et al. |
| 2017/0293834 A1 | 10/2017 | Raison et al. |
| 2017/0295114 A1 | 10/2017 | Goldberg et al. |
| 2017/0300831 A1 | 10/2017 | Gelfenbeyn et al. |
| 2017/0308589 A1 | 10/2017 | Liu et al. |
| 2017/0316159 A1 | 11/2017 | Hooker |
| 2017/0344645 A1 | 11/2017 | Appel et al. |
| 2017/0351786 A1 | 12/2017 | Quattoni et al. |
| 2017/0351969 A1 | 12/2017 | Parmar et al. |
| 2017/0357637 A1 | 12/2017 | Nell et al. |
| 2017/0357661 A1 | 12/2017 | Hornkvist et al. |
| 2017/0358293 A1 | 12/2017 | Chua et al. |
| 2017/0358304 A1 | 12/2017 | Castillo Sanchez et al. |
| 2017/0364563 A1 | 12/2017 | Gao et al. |

(56) References Cited

U.S. PATENT DOCUMENTS

| | | |
|---|---|---|
| 2017/0366479 A1 | 12/2017 | Ladha et al. |
| 2017/0373999 A1 | 12/2017 | Abou Mahmoud et al. |
| 2018/0013699 A1 | 1/2018 | Sapoznik et al. |
| 2018/0040020 A1 | 2/2018 | Kurian et al. |
| 2018/0047091 A1 | 2/2018 | Ogden et al. |
| 2018/0052824 A1 | 2/2018 | Ferrydiansyah et al. |
| 2018/0054523 A1 | 2/2018 | Zhang et al. |
| 2018/0060029 A1 | 3/2018 | Kogan et al. |
| 2018/0060439 A1 | 3/2018 | Kula et al. |
| 2018/0061401 A1 | 3/2018 | Sarikaya et al. |
| 2018/0061419 A1 | 3/2018 | Melendo Casado et al. |
| 2018/0062862 A1 | 3/2018 | Lu et al. |
| 2018/0067638 A1 | 3/2018 | Klein et al. |
| 2018/0068019 A1 | 3/2018 | Novikoff et al. |
| 2018/0075847 A1 | 3/2018 | Lee et al. |
| 2018/0082191 A1 | 3/2018 | Pearmain et al. |
| 2018/0083894 A1 | 3/2018 | Fung et al. |
| 2018/0088663 A1 | 3/2018 | Zhang et al. |
| 2018/0088677 A1 | 3/2018 | Zhang et al. |
| 2018/0089164 A1 | 3/2018 | Iida et al. |
| 2018/0101893 A1 | 4/2018 | Dagan et al. |
| 2018/0108358 A1 | 4/2018 | Humphreys et al. |
| 2018/0115598 A1 | 4/2018 | Shariat et al. |
| 2018/0121508 A1 | 5/2018 | Halstvedt |
| 2018/0130194 A1 | 5/2018 | Kochura et al. |
| 2018/0146019 A1 | 5/2018 | Chen et al. |
| 2018/0150233 A1 | 5/2018 | Hanzawa et al. |
| 2018/0150551 A1 | 5/2018 | Wang et al. |
| 2018/0150739 A1 | 5/2018 | Wu |
| 2018/0157759 A1 | 6/2018 | Zheng et al. |
| 2018/0157981 A1 | 6/2018 | Albertson et al. |
| 2018/0165723 A1 | 6/2018 | Wright et al. |
| 2018/0176614 A1 | 6/2018 | Lin et al. |
| 2018/0189628 A1 | 7/2018 | Kaufmann et al. |
| 2018/0196854 A1 | 7/2018 | Burks |
| 2018/0210874 A1 | 7/2018 | Fuxman et al. |
| 2018/0218428 A1 | 8/2018 | Xie et al. |
| 2018/0232435 A1 | 8/2018 | Papangelis et al. |
| 2018/0232662 A1 | 8/2018 | Solomon et al. |
| 2018/0233139 A1 | 8/2018 | Finkelstein et al. |
| 2018/0233141 A1 | 8/2018 | Solomon et al. |
| 2018/0239837 A1 | 8/2018 | Wang |
| 2018/0240014 A1 | 8/2018 | Strope et al. |
| 2018/0246953 A1 | 8/2018 | Oh et al. |
| 2018/0246983 A1 | 8/2018 | Rathod |
| 2018/0260086 A1 | 9/2018 | Leme et al. |
| 2018/0260481 A1 | 9/2018 | Rathod |
| 2018/0260680 A1 | 9/2018 | Finkelstein et al. |
| 2018/0260856 A1 | 9/2018 | Balasubramanian et al. |
| 2018/0268298 A1 | 9/2018 | Johansen et al. |
| 2018/0287968 A1 | 10/2018 | Koukoumidis et al. |
| 2018/0293221 A1 | 10/2018 | Finkelstein et al. |
| 2018/0293484 A1 | 10/2018 | Wang et al. |
| 2018/0301151 A1 | 10/2018 | Mont-Reynaud et al. |
| 2018/0309779 A1 | 10/2018 | Benyo et al. |
| 2018/0329512 A1 | 11/2018 | Liao et al. |
| 2018/0329982 A1 | 11/2018 | Patel et al. |
| 2018/0329998 A1 | 11/2018 | Thomson et al. |
| 2018/0330280 A1 | 11/2018 | Erenrich et al. |
| 2018/0330714 A1 | 11/2018 | Paulik et al. |
| 2018/0330721 A1 | 11/2018 | Thomson et al. |
| 2018/0330737 A1 | 11/2018 | Paulik et al. |
| 2018/0332118 A1 | 11/2018 | Phipps et al. |
| 2018/0341871 A1 | 11/2018 | Maitra et al. |
| 2018/0349962 A1 | 12/2018 | Adderly et al. |
| 2018/0350144 A1 | 12/2018 | Rathod |
| 2018/0350377 A1 | 12/2018 | Karazoun |
| 2018/0367483 A1 | 12/2018 | Rodriguez et al. |
| 2019/0005024 A1 | 1/2019 | Somech et al. |
| 2019/0005549 A1 | 1/2019 | Goldshtein et al. |
| 2019/0007208 A1 | 1/2019 | Surla et al. |
| 2019/0034406 A1 | 1/2019 | Singh et al. |
| 2019/0034849 A1 | 1/2019 | Romaine et al. |
| 2019/0035390 A1 | 1/2019 | Howard et al. |
| 2019/0051289 A1 | 2/2019 | Yoneda et al. |
| 2019/0065588 A1 | 2/2019 | Lin et al. |
| 2019/0073363 A1 | 3/2019 | Perez et al. |
| 2019/0082221 A1 | 3/2019 | Jain et al. |
| 2019/0087491 A1 | 3/2019 | Bax |
| 2019/0095500 A1 | 3/2019 | Pandey et al. |
| 2019/0095785 A1 | 3/2019 | Sarkar et al. |
| 2019/0104093 A1 | 4/2019 | Lim et al. |
| 2019/0121907 A1 | 4/2019 | Brunn et al. |
| 2019/0132265 A1 | 5/2019 | Nowak-Przygodzki et al. |
| 2019/0139150 A1 | 5/2019 | Brownhill et al. |
| 2019/0146647 A1 | 5/2019 | Ramchandran et al. |
| 2019/0147849 A1 | 5/2019 | Talwar et al. |
| 2019/0149489 A1 | 5/2019 | Akbulut et al. |
| 2019/0156204 A1 | 5/2019 | Bresch et al. |
| 2019/0156206 A1 | 5/2019 | Graham et al. |
| 2019/0163691 A1 | 5/2019 | Brunet et al. |
| 2019/0171655 A1 | 6/2019 | Psota et al. |
| 2019/0182195 A1 | 6/2019 | Avital et al. |
| 2019/0205368 A1 | 7/2019 | Wang et al. |
| 2019/0205464 A1 | 7/2019 | Zhao et al. |
| 2019/0206412 A1 | 7/2019 | Li et al. |
| 2019/0213490 A1 | 7/2019 | White et al. |
| 2019/0236167 A1 | 8/2019 | Hu et al. |
| 2019/0237068 A1 | 8/2019 | Canim et al. |
| 2019/0242608 A1 | 8/2019 | Laftchiev et al. |
| 2019/0258710 A1 | 8/2019 | Biyani et al. |
| 2019/0266185 A1 | 8/2019 | Rao et al. |
| 2019/0281001 A1 | 9/2019 | Miller et al. |
| 2019/0287526 A1 | 9/2019 | Ren et al. |
| 2019/0311036 A1 | 10/2019 | Shanmugam et al. |
| 2019/0311301 A1 | 10/2019 | Pyati |
| 2019/0311710 A1 | 10/2019 | Eraslan et al. |
| 2019/0313054 A1 | 10/2019 | Harrison et al. |
| 2019/0318729 A1 | 10/2019 | Chao et al. |
| 2019/0318735 A1 | 10/2019 | Chao et al. |
| 2019/0324527 A1 | 10/2019 | Presant et al. |
| 2019/0324553 A1 | 10/2019 | Liu et al. |
| 2019/0324780 A1 | 10/2019 | Zhu et al. |
| 2019/0325042 A1 | 10/2019 | Yu et al. |
| 2019/0325081 A1 | 10/2019 | Liu et al. |
| 2019/0325084 A1 | 10/2019 | Peng et al. |
| 2019/0325864 A1 | 10/2019 | Anders et al. |
| 2019/0327330 A1 | 10/2019 | Natarajan et al. |
| 2019/0327331 A1 | 10/2019 | Natarajan et al. |
| 2019/0332946 A1 | 10/2019 | Han et al. |
| 2019/0348033 A1 | 11/2019 | Chen et al. |
| 2019/0361408 A1 | 11/2019 | Tokuchi |
| 2019/0385051 A1 | 12/2019 | Wabgaonkar et al. |
| 2020/0012681 A1 | 1/2020 | McInerney et al. |
| 2020/0027443 A1 | 1/2020 | Raux |
| 2020/0045119 A1 | 2/2020 | Weldemariam et al. |
| 2020/0081736 A1 | 3/2020 | Gopalan et al. |
| 2020/0104427 A1 | 4/2020 | Long et al. |
| 2020/0175990 A1 | 6/2020 | Fanty |
| 2020/0184959 A1 | 6/2020 | Yas et al. |
| 2020/0202171 A1 | 6/2020 | Hughes et al. |
| 2020/0382449 A1 | 12/2020 | Taylor et al. |
| 2020/0388282 A1 | 12/2020 | Secker-Walker et al. |
| 2020/0410012 A1 | 12/2020 | Moon et al. |
| 2021/0011967 A1 | 1/2021 | Rathod |
| 2021/0117214 A1 | 4/2021 | Presant et al. |
| 2021/0117479 A1 | 4/2021 | Liu et al. |
| 2021/0117623 A1 | 4/2021 | Aly et al. |
| 2021/0117624 A1 | 4/2021 | Aghajanyan et al. |
| 2021/0117681 A1 | 4/2021 | Poddar et al. |
| 2021/0117712 A1 | 4/2021 | Huang et al. |
| 2021/0117780 A1 | 4/2021 | Malik et al. |
| 2021/0118440 A1 | 4/2021 | Peng et al. |
| 2021/0118442 A1 | 4/2021 | Poddar et al. |
| 2021/0119955 A1 | 4/2021 | Penov et al. |
| 2021/0120206 A1 | 4/2021 | Liu et al. |
| 2021/0281632 A1 | 9/2021 | Brewer et al. |
| 2021/0303512 A1 | 9/2021 | Barday et al. |
| 2022/0006661 A1 | 1/2022 | Rathod |
| 2022/0038615 A1 | 2/2022 | Chaudhri et al. |
| 2022/0092131 A1 | 3/2022 | Koukoumidis et al. |

(56) References Cited

U.S. PATENT DOCUMENTS

2022/0188361 A1 6/2022 Botros et al.
2022/0254338 A1 8/2022 Gruber et al.

FOREIGN PATENT DOCUMENTS

| JP | 2015095232 A | 5/2015 |
|---|---|---|
| JP | 2016151736 A | 8/2016 |
| KR | 20070043673 A | 4/2007 |
| KR | 101350712 B1 | 1/2014 |
| WO | 2012116241 A3 | 11/2012 |
| WO | 2014190297 A1 | 11/2014 |
| WO | 2016065020 A2 | 4/2016 |
| WO | 2017112003 A1 | 6/2017 |
| WO | 2017129149 A1 | 8/2017 |
| WO | 2018067402 A1 | 4/2018 |
| WO | 2018235191 A1 | 12/2018 |

OTHER PUBLICATIONS

Anonymous, "Semantic Parsing," Wikipedia, Mar. 22, 2018, 5 pages, Retrieved from the Internet: URL: https://en.wikipedia.org/w/index.php?title=Semantic_parsing&oldid=831890029, [Retrieved on May 24, 2022].
Anonymous, "Semantic Role Labeling," Wikipedia, Jan. 27, 2018, 2 pages, Retrieved from the Internet: URL: https://en.wikipedia.org/w/index.php?title=Semantic_role_labeling&oldid=822626564, [Retrieved on May 24, 2022].
Armentano M.G., et al., "A Framework for Attaching Personal Assistants to Existing Applications," Computer Languages, Systems & Structures, 2009, vol. 35(4), pp. 448-463.
Patel A., et al., "Cross-Lingual Phoneme Mapping for Language Robust Contextual Speech Recognition," IEEE International Conference on Acoustics, Speech and Signal Processing (ICASSP), 2018, pp. 5924-5928.
Trottier D., "A Research Agenda for Social Media Surveillance," Fast Capitalism, 2011, vol. 8, Issue 1, pp. 59-68.
Wong Y.W., et al., "Scalable Attribute-Value Extraction from Semi-Structured Text," IEEE International Conference on Data Mining Workshops, 2009, pp. 302-307.
Bang J., et al., "Example-Based Chat-Oriented Dialogue System With Personalized Long-Term Memory," International Conference on Big Data and Smart Computing (BIGCOMP), Jeju, South Korea, 2015, pp. 238-243.
Candito M.H., et al., "Can the TAG Derivation Tree Represent a Semantic Graph? An Answer in the Light of Meaning-Text Theory," Proceedings of the Fourth International Workshop on Tree Adjoining Grammars and Related Frameworks (TAG+ 4), 1998, 04 pages.
"Chat Extensions," [online], Apr. 18, 2017, 8 Pages, Retrieved from the Internet: URL: https://developers.facebook.com/docs/messenger-platform/guides/chat-extensions/.
Chen Y.N., et al., "Knowledge as a Teacher: Knowledge-Guided Structural Attention Networks," arXiv: preprint arXiv: 1609.03286, 2016, 12 pages.
Chen Y.N., et al., "Matrix Factorization with Domain Knowledge and Behavioral Patterns for Intent Modeling," NIPS Workshop on Machine Learning for SLU and Interaction, 2015, pp. 1-7.
Co-pending U.S. Appl. No. 15/953,957, inventors Kemal; El Moujahid et al., filed Apr. 16, 2018.
Co-pending U.S. Appl. No. 16/173,155, inventors Emmanouil; Koukoumidis et al., filed Oct. 29, 2018.
Co-pending U.S. Appl. No. 16/557,055, inventors Moon; Seungwhan et al., filed Aug. 30, 2019.
Co-pending U.S. Appl. No. 16/659,070, inventors Huang; Lisa Xiaoyi et al., filed Oct. 21, 2019.
Co-pending U.S. Appl. No. 16/659,203, inventors Huang; Lisa Xiaoyi et al., filed Oct. 21, 2019.
Co-pending U.S. Appl. No. 16/659,419, inventor Huang; Lisa Xiaoyi, filed Oct. 21, 2019.
Co-pending U.S. Appl. No. 16/741,630, inventors Crook; Paul Anthony et al., filed Jan. 13, 2020.
Co-pending U.S. Appl. No. 16/742,769, inventors Liu; Xiaohu et al., filed Jan. 14, 2020.
Co-pending U.S. Appl. No. 16/790,497, inventors Gao; Yang et al., filed Feb. 13, 2020.
Co-pending U.S. Appl. No. 16/815,960, inventors Malik; Kshitiz et al., filed Mar. 11, 2020.
Co-pending U.S. Appl. No. 16/842,366, inventors Sravani; Kamisetty et al., filed Apr. 7, 2020.
Co-pending U.S. Appl. No. 16/914,966, inventor Behar; Noam Yakob, filed Jun. 29, 2020.
Co-pending U.S. Appl. No. 16/917,664, inventors Liu; Xiaohu et al., filed Jun. 30, 2020.
Co-pending U.S. Appl. No. 16/921,665, inventors Liu; Honglei et al., filed Jul. 6, 2020.
Co-pending U.S. Appl. No. 16/998,423, inventors Armen; Aghajanyan et al., filed Aug. 20, 2020.
Co-pending U.S. Appl. No. 17/006,260, inventors William; Presant et al., filed Aug. 28, 2020.
Co-pending U.S. Appl. No. 17/006,339, inventors Shivani; Poddar et al., filed Aug. 28, 2020.
Co-pending U.S. Appl. No. 17/006,377, inventors Shivani; Poddar et al., filed Aug. 28, 2020.
Co-pending U.S. Appl. No. 17/009,542, inventor Kottur; Satwik, filed Sep. 1, 2020.
Co-pending U.S. Appl. No. 17/035,253, inventors Khemka; Piyush et al., filed Sep. 28, 2020.
Co-pending U.S. Appl. No. 17/120,013, inventors Botros; Fadi et al., filed Dec. 11, 2020.
Co-pending U.S. Appl. No. 17/136,636, inventors Greenberg; Michael et al., filed Dec. 29, 2020.
Co-pending U.S. Appl. No. 17/139,363, inventors Cheng; Daniel Manhon et al., filed Dec. 31, 2020.
Co-pending U.S. Appl. No. 17/186,459, inventors Liu; Bing et al., filed Feb. 26, 2021.
Co-pending U.S. Appl. No. 17/336,716, inventors Chaland; Christophe et al., filed Jun. 2, 2021.
Co-pending U.S. Appl. No. 17/351,501, inventors Sethi; Pooja et al., filed Jun. 18, 2021.
Co-pending U.S. Appl. No. 17/391,765, inventors Pu; Yiming et al., filed Aug. 2, 2021.
Co-pending U.S. Appl. No. 17/394,096, inventors Wang; Emily et al., filed Aug. 4, 2021.
Co-pending U.S. Appl. No. 17/394,159, inventors Santoro; Elizabeth Kelsey et al., filed Aug. 4, 2021.
Co-pending U.S. Appl. No. 17/407,922, inventors Pu; Yiming et al., filed Aug. 20, 2021.
Co-pending U.S. Appl. No. 17/504,276, inventors Kottur; Satwik et al., filed Oct. 18, 2021.
Co-pending U.S. Appl. No. 17/512,478, inventors Chen; Zhiyu et al., filed Oct. 27, 2021.
Co-pending U.S. Appl. No. 17/512,508, inventors Vincent; Joshuah et al., filed Oct. 27, 2021.
Co-Pending U.S. Appl. No. 15/953,957, filed Apr. 16, 2018, 117 pages.
Co-Pending U.S. Appl. No. 16/150,184, inventors Francislav; P. Penov et al., filed Oct. 2, 2018, 78 pages.
Co-Pending U.S. Appl. No. 16/173,155, filed Oct. 29, 2018, 79 pages.
Co-Pending U.S. Appl. No. 62/660,879, inventor Anuj; Kumar, filed Apr. 20, 2018.
Csaky R.K., "Deep Learning Based Chatbot Models," Budapest University of Technology and Economics, Nov. 2017, 69 pages, Retrieved from the Internet: URL: https://www.researchgate.net/publication/323587007_Deep_Learning_Based_Chatbot_Models.
Golovin D., et al., "Google Vizier: A Service for Black-Box Optimization," Proceedings of the 23rd ACM International Conference on Knowledge Discovery and Data Mining, Aug. 13-17, 2017, vol. 23, pp. 1487-1495.
Google Allo Makes Conversations Eeasier, Productive, and more Expressive, May 19, 2016 [Retrieved on Jul. 11, 2019], 13 Pages,

(56) References Cited

OTHER PUBLICATIONS

Retrieved from Internet: URL: https://www.trickyways.com/2016/05/google-allo-makes-conversations-eeasier-productive-expressive/.

Grow your Business with Social Bots, Digital Marketing Institute, Nov. 20, 2017, 14 pages, Retrieved from the Internet: URL: https://digitalmarketinginstitute.com/blog/grow-your-business-with-social-bots.

Guo D.Z., et al., "Joint Semantic Utterance Classification and Slot Filling With Recursive Neural Networks," IEEE Spoken Language Technology Workshop (SLT), 2014, pp. 554-559.

Hazen J.T., et al., "Pronunciation Modeling using a Finite-State Transducer Representation," Speech Communication, vol. 46, 2005, pp. 189-203.

Huang Z., et al., "Bidirectional LSTM-CRF Models for Sequence Tagging," arXiv preprint, arXiv:1508.01991, 2015, 10 pages.

International Search Report and Written Opinion for International Application No. PCT/US2018/033116, dated Jan. 17, 2019, 10 Pages.

International Search Report and Written Opinion for International Application No. PCT/US2018/034604, dated Jan. 18, 2019, 13 Pages.

International Search Report and Written Opinion for International Application No. PCT/US2018/038396, dated Jan. 21, 2019, 13 Pages.

International Search Report and Written Opinion for International Application No. PCT/US2018/039268, dated Jan. 18, 2019, 14 Pages.

International Search Report and Written Opinion for International Application No. PCT/US2018/042906, dated Feb. 27, 2019, 10 Pages.

International Search Report and Written Opinion for International Application No. PCT/US2018/045177, dated Jan. 16, 2019, 15 Pages.

International Search Report and Written Opinion for International Application No. PCT/US2018/049568, dated Feb. 11, 2019, 25 Pages.

International Search Report and Written Opinion for International Application No. PCT/US2018/054322, dated Feb. 8, 2019, 15 Pages.

International Search Report and Written Opinion for International Application No. PCT/US2019/028187, dated Aug. 12, 2019, 11 Pages.

International Search Report and Written Opinion for International Application No. PCT/US2019/028387, dated Aug. 21, 2019, 12 Pages.

Komer B., et al., "Hyperopt-Sklearn: Automatic Hyperparameter Configuration for Scikit-Learn," Proceedings of the 13th Python in Science Conference, 2014, vol. 13, pp. 34-40.

Leung K.W-T., et al., "Deriving Concept-Based User Profiles from Search Engine Logs," IEEE Transactions on Knowledge and Data Engineering, Jul. 2010, vol. 22 (7), pp. 969-982.

Li T., et al., "Ease.ml: Towards Multi-tenant Resource Sharing for Machine Learning Workloads," arXiv: 1708.07308v1, Aug. 24, 2017, pp. 1-17.

Liebman E., et al., "DJ-MC: A Reinforcement-Learning Agent for Music Playlist Recommendation," ArXiv, 2015, pp. 1-9.

Light M., et al., "Personalized Multimedia Information Access," Communications of the Association for Computing Machinery, May 2002, vol. 45 (5), pp. 54-59.

Mahajan D., et al., "LogUCB: An Explore-Exploit Algorithm for Comments Recommendation," Proceedings of the 21st ACM International Conference on Information and Knowledge Management (CIKM '12), 2012, pp. 6-15.

McInerney J., et al., "Explore, Exploit, and Explain: Personalizing Explainable Recommendations with Bandits," RecSys '18: Proceedings of the 12th ACM Conference on Recommender Systems, Sep. 2018, vol. 12, pp. 31-39.

Mesnil G., et al., "Using Recurrent Neural Networks for Slot Filling in Spoken Language Understanding," IEEE/ACM Transactions on Audio, Speech, and Language Processing, Mar. 2015, vol. 23 (3), pp. 530-539.

Moon T., et al., "Online Learning for Recency Search Ranking Using Real-Time User Feedback," Proceedings of the 19th ACM International Conference on Information and Knowledge Management (CIKM '10), 2010, pp. 1501-1504.

Mun H., et al., "Accelerating Smart Speaker Service with Content Prefetching and Local Control," In IEEE 17th Annual Consumer Communications & Networking Conference (CCNC), 2020, 6 pages.

Nanas N., et al., "Multi-topic Information Filtering with a Single User Profile," Springer-Verlag Berlin Germany, SETN, LNAI 3025, 2004, pp. 400-409.

Ren H., et al., "Dialog State Tracking using Conditional Random Fields," Proceedings of the SIGDIAL Conference, Association for Computational Linguistics, 2013, pp. 457-461.

So C.F., et al., "Ontological User Profiling and Language Modeling for Personalized Information Services," 2009 IEEE International Conference on e-Business Engineering, Macau, China, 2009, pp. 559-564.

Sood A., et al., "Topic-Focused Summarization of Chat Conversations," ECIR, LNCS 7814, Springer-Veriag, Berlin, Germany, 2013, pp. 800-803.

Tepper N., et al., "Collabot: Personalized Group Chat Summarization," In Proceedings of the Eleventh ACM International Conference on Web Search and Data Mining, Feb. 5, 2018, pp. 771-774.

U.S. Appl. No. 62/923,342, inventors Hanson; Michael Robert et al., filed Oct. 18, 2019.

Vanchinathan H.P., et al., "Explore-Exploit in Top-N Recommender Systems via Gaussian Processes," Proceedings of the 8th ACM Conference on Recommender systems (ReeSys '14), 2014, pp. 225-232.

Wang W., et al., "Rafiki: Machine Learning as an Analytics Service System," arXiv: 1804.06087v1, Apr. 17, 2018, pp. 1-13.

Wang X., et al., "Exploration in Interactive Personalized Music Recommendation: A Reinforcement Learning Approach," ACM Transactions on Multimedia Computing, Communications, and Applications, arXiv: 1311.6355v1, Oct. 2013, vol. 2 (3), pp. 1-24.

Kar R., et al., "Applying Chatbots to the Internet of Things: Opportunities and Architectural Elements," arXiv 1611.03799v1, submitted on Nov. 11, 2016, (2017), 9 pages.

Batrinca B., et al., "Social media analytics: a survey of techniques, tools and platforms,", Al & Society [Online], Feb. 2015, vol. 30 (1), pp. 89-116, [Retrieved in Mar. 28, 2019], Retrieved from the Internet: URL: https://link.springer.com/article/10.1007/s00146-014-0549-4.

Klopfenstein L.C., et al., "The Rise of Bots: A survey Conversational Interfaces, Patterns, and Paradigms," DIS 2017 Proceedings of the 2017 Conference on Designing Interactive Systems, Jun. 10, 2017, pp. 555-565.

\* cited by examiner

| Genre | Confidence | Semantic | Source(s) |
|---|---|---|---|
| Space | 0.572 | 0.682 | Ent_content_src_1 |
| Science Fiction | 0.901 | 0.633 | Movie_review_src_3, Movie_review_src_1, Ent_content_src_1, Media_DB_src_2, Movie_review_src_2 |
| Adaptation | 0.965 | 0.572 | Ent_content_src_1 |
| Adventure | 0.911 | 0.449 | Media_DB_src_1, Movie_review_src_1, Ent_content_src_1, Media_DB_src_2 |
| Drama | 0.928 | 0.249 | Media_DB_src_1, Movie_review_src_1, Media_DB_src_2 |
| Fantasy | 0.024 | 0.0 | Movie_review_src_2 |
| Comedy | 0.005 | 0.0 | Movie_review_src_1 |
| Action | 0.071 | 0.0 | Movie_review_src_1, Ent_content_src_1 |

*FIG. 9*

```
"title": "The Martian"
"directed by": "Ridley Scott"
"screenplay by": "Drew Coddard"
"cast": "Matt Damon as Mark Watney"
"cast": "Jessica Chastain as Commander Melissa Lewis"
"cast": "Jeff Daniels as Theodore Sanders, the Director of NASA"
...
"produced by": "Simon Kinberg"
"produced by": "Ridley Scott"
"produced by": "Michael Schaefer"
"produced by": "Aditya Sood"
"produced by": "Mark Huffam"
"based on": "The Martian by Andy Weir"
"music by": "Harry Gregson-Williams"
"edited by": "Pietro Wolski"
"U.S. release date": "October 02, 2015"
"running time": "142 minutes"
"MPAA rating": "pg-13"
"entity id": "fb-movie-the-martian-2015-20th-century-fox"      — 1010
...
"genre": "Space"        — 1020A
"genre": "Science Fiction"   — 1020B
"genre": "Adaptation"   — 1020C
"genre": "Adventure"    — 1020D
"genre": "Drama"        — 1020E
...
```
— 1001

*FIG. 10*

```
"title": "The Martian"
"directed by": "Ridley Scott"
"screenplay by": "Drew Coddard"
"cast": "Matt Damon as Mark Watney"
"cast": "Jessica Chastain as Commander Melissa Lewis"
"cast": "Jeff Daniels as Theodore Sanders, the Director of NASA"
...
"produced by": "Simon Kinberg"
"produced by": "Ridley Scott"
"produced by": "Michael Schaefer"
"produced by": "Aditya Sood"
"produced by": "Mark Huffam"
"based on": "The Martian by Andy Weir"
"music by": "Harry Gregson-Williams"
"edited by": "Pietro Wolski"
"U.S. release date": "October 02, 2015"
"running time": "142 minutes"
"MPAA rating": "pg-13"
"entity id": "fb-movie-the-martian-2015-20th-century-fox"
...
"genre": "Space"
"genre": "Science Fiction"
"genre": "Adaptation"
"genre": "Adventure"
"genre": "Drama"
...
"drug_content": "No"       ← 1210
"educational_content": "Yes"  ← 1220
"kid_friendly": "Yes"      ← 1230
"violence": "No"           ← 1240
...
```
— 1201

*FIG. 12*

RESOLVING ENTITIES FROM MULTIPLE DATA SOURCES FOR ASSISTANT SYSTEMS

PRIORITY

This application is a continuation under 35 U.S.C. § 120 of U.S. patent application Ser. No. 16/048,049, filed 27 Jul. 2018, which claims the benefit under 35 U.S.C. § 119(e) of U.S. Provisional Patent Application No. 62/660,876, filed 20 Apr. 2018, which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video) in stateful and multi-turn conversations to get assistance. The assistant system may create and store a user profile comprising both personal and contextual information associated with the user. In particular embodiments, the assistant system may analyze the user input using natural-language understanding. The analysis may be based on the user profile for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog management techniques to manage and forward the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute tasks that are relevant to user interests and preferences based on the user profile without a user input. In particular embodiments, the assistant system may check privacy settings to ensure that accessing a user's profile or other user information and executing different tasks are permitted subject to the user's privacy settings.

In particular embodiment, the assistant system may resolve entity records from multiple data sources such that records describing an entity are identified and are associated with a globally unique identifier. The assistant system may require access to knowledge described by entities and stored in a knowledge graph. The knowledge graph may comprise vertices representing entities and edges representing relationships between entities. A comprehensive, high-quality knowledge graph may have a unique instance for an entity, not duplicated instances for an entity. To build a comprehensive, high-quality knowledge graph for use by the assistant system, the entity-resolution module of the assistant system may need to identify entities based on data extracted from multiple sources and resolve to universal entity objects. Creating each entity object in the knowledge graph may involve one or more of the following five steps (1) deduping; (2) resolving; (3) attribute fusing; (4) semantic analysis; and (5) attribute classification. A functional unit may produce a structured record for each entity instance captured from data by collecting and processing data from multiple sources (e.g., external sources or internal sources such as the social graph). The structured record for an entity instance may be a set of attribute-value pairs. More than one record for a unique entity may be generated from a particular source. An entity-deduping module may process records from a single data source. The entity-deduping module may identify the best record for an entity and eliminate all the other records for the entity. Alternatively, the entity-deduping module may keep duplicated records for an entity and link the records to an entity identifier unique within the corresponding data source. In particular embodiments, the entity-deduping module may construct a merged record for the entity by merging the all records linked to the entity identifier unique within the data source. The records processed by the entity-deduping module may be processed by the entity-resolving module that resolves records from a plurality of sources to identify a number of records belonging to an entity. When multiple records belong to an entity, those records will be linked to a globally unique entity identifier. Although this disclosure describes deduping and resolving multiple records from multiple data sources for a unique entity in a particular manner, this disclosure contemplates deduping and resolving multiple records from multiple data sources for a unique entity in any suitable manner.

In particular embodiments, the assistant system may access a plurality of records based on data collected from a plurality of data sources, wherein the plurality of accessed records describes attributes of a plurality of entities, and wherein the records are grouped by their corresponding data source. The assistant system may dedupe the plurality of records by an entity-deduping module, wherein the entity-deduping module processes each group of records to associate each record within the group describing a particular entity with a unique entity identifier. The assistant system may select, for each particular entity, one of the plurality of data sources as a core source, wherein the group of records associated with the core source is selected as the core group of records. The assistant system may identify, for a particular record in the core group of records for each particular entity, a candidate set comprising one or more records from the non-core groups of records that satisfy one or more conditions to be in the candidate set for the particular record. The assistant system may generate, for each pair of records between a record in the core group and a record in the candidate set for each particular entity, a feature vector based on a measure of similarities of respective attributes in the pair of records. The pair of records may be transformed to the numeric feature vector by one-hot encoding, hashing, or by using real-valued similarity scores. The assistant system may also generate a real-valued feature vector based on a measure of similarities of respective attributes in the pair of records. The assistant system may compute, for each pair of records, a probability that the pair of records describe a common entity by processing the feature vector by a machine-learning classifier. The assistant system may link, for each pair of records, the record in the candidate set to a globally unique entity identifier identifying a unique entity if the probability exceeds a threshold probability.

In particular embodiments, the assistant system may fuse attributes of an entity when diverse values for attributes associated with the entity are collected from a plurality of sources. An attribute-fusion module of the assistant system may combine resolved entity records, which may include duplicates if not removed previously, to consistent representations by fusing their attribute values. The attribute-fusion module may filter out and conflate the attribute values by utilizing factorization machines that run based on high-level rules. The attribute-fusion module and a semantic-analysis module (which may be a sub-process of the attribute-fusion module) may compute a confidence probability and a semantic weight for each entity attribute value. The attribute-fusion module may produce a single record for an entity by combining values for given attributes. The attribute-fusion module may take one or more records associated with a particular entity as input. The one or more records may have a common globally unique entity identifier assigned to the particular entity. Each record may have diverse values for an attribute of the particular entity. For each attribute of the particular entity, the attribute-fusion module may identify a list of values that appear in the records associated with the entity. The attribute-fusion module may then, for each value in the list, compute a confidence probability that may represent a probability that the value is accurate for the given attribute of the particular entity. The attribute-fusion module may utilize factorization machines to compute the confidence probabilities. The attribute-fusion module may filter out a value from the list if the corresponding confidence probability is less than a threshold probability. The semantic-analysis module, a sub-process of the attribute-fusion module, may compute a semantic weight for each value in the list. The semantic-analysis module may sort the attribute values in the order of corresponding semantic weights. A semantic weight for an attribute value may represent how the attribute value is semantically appropriate for the particular entity considering all the available information related with the particular entity. The semantic weights may also be computed by factorization machines. The attribute-fusion module may then produce a record for an entity (a so-called fused entity record). Each attribute of the entity in the fused entity record may comprise one or more values whose confidence probabilities may be higher than the threshold probability and whose order may be sorted based on corresponding semantic weights. The factorization machines used to compute confidence probabilities and semantic weights may be trained with a large number of entities. As the attribute-fusion module gets feedback on a particular attribute value for an entity from the users, the attribute fusion may label the particular attribute value for the entity based on the feedback and train the factorization machines with the labelled data. The accuracy of the estimated confidence probabilities and the estimated semantic weights may increase as the labeled data increases. Although this disclosure describes fusing a plurality of records corresponding to a common entity in a particular manner, this disclosure contemplates fusing the plurality of records corresponding to the common entity in the plurality of records in any suitable manner.

In particular embodiments, the assistant system may access a plurality of records associated with a unique entity, wherein each record of the plurality of records describes one or more attributes of the unique entity, wherein each of the plurality of records comprises one or more attribute-value pairs comprising an attribute name and an attribute value. The assistant system may compute, for each unique attribute-value pair in the plurality of records, a confidence probability by processing the plurality of records with a first machine learning model, wherein the confidence probability represents a probability of the attribute value being correct for the unique entity. The assistant system may remove, if a computed confidence probability for each unique attribute-value pair in the plurality of records is less than a threshold probability, the attribute-value pair from each of the plurality of records. The assistant system may compute, for each unique attribute-value pair in the plurality of records, a semantic weight by processing the plurality of records with a second machine learning model, wherein the semantic weight represents a degree of semantic relatedness of the attribute value to the unique entity. The assistant system may construct, by a fusion module, a compiled record for the unique entity based on the plurality of records, wherein the fusion module combines the non-removed attribute-value pairs from the plurality of records, and wherein a plurality of attribute-value pairs with a common attribute name are sorted based on their respective semantic weights.

In particular embodiments, an attribute-classification module of the assistant system may determine a set of attribute values associated with an entity where the attribute values are not directly collectable from data sources. The attribute-fusion module may produce a single record for an entity, a so-called fused entity record, by combining attribute values collected from a plurality of sources. The entity may be classified into one of a plurality of domains. The domain is associated with a pre-determined list of required attributes corresponding to the domain. The produced fused entity record may not include all the required attributes in the list. An attribute may be one-hot encoded such that the value of the attribute may be one of a pre-determined set of plurality of candidates. At least a part of the attributes to be classified may be one-hot encoded. When an attribute-classification module accesses a fused entity record for an entity, the attribute-classification module may identify a domain of the entity. The domain of the entity may be mapped to the pre-determined list of required attributes for the entity. The attribute-classification module may identify attributes to be classified by determining whether the fused entity record contains each attribute in the list of required attributes. For each attribute to be classified, the attribute-classification module may determine a value using a corresponding attribute classifier from a plurality of attribute classifiers. The attribute classifier may determine the value of the attribute to be classified by generating and using a numeric feature vector associated with the fused entity based on the available information associated with the entity. The information, which may include the existing attribute-value pairs of the entity, may be transformed to the feature vector by one-hot or hash encoding. The attribute classifiers may be trained with labelled training data. The training data may be labelled by a machine-learning model or manually (e.g., based on crowdsourced data). Although this disclosure describes determining values of attributes to be classified for an entity in a particular manner, this disclosure contemplates determining values of attributes to be classified for an entity in any suitable manner.

In particular embodiments, the assistant system may access a compiled record for a unique entity, wherein the compiled record describes one or more attributes of the unique entity, and wherein the compiled record comprises one or more attribute-value pairs comprising an attribute name and an attribute value. The assistant system may determine, by an attribute-classifier module, a domain of the unique entity, wherein the domain is associated with a pre-determined list of required attributes corresponding to the domain. The assistant system may identify, from the list of required attributes, one or more attributes to be classified within the compiled record, wherein the compiled record does not contain attribute-value pairs corresponding to the attributes to be classified. The assistant system may determine, for each attribute to be classified, whether the attribute to be classified can be one-hot encoded to a one-hot vector by the attribute-classifier module, wherein each one-hot vector corresponds to one of the attributes to be classified and comprises a plurality of one-hot elements. The assistant system may compute, for each attribute to be classified that can be one-hot encoded, probabilities for the one-hot elements corresponding to the attribute to be classified by processing the compiled record with a machine-learning classifier, wherein the probability corresponding to each one-hot element represents a probability for the one-hot element to be a correct attribute value for the unique entity. The assistant system may construct, for each attribute to be classified that can be one-hot encoded, an attribute-value pair with a name of the attribute to be classified and the corresponding one-hot element with a highest computed probability. The assistant system may add the constructed attribute-value pair to the compiled record.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 9 illustrates an example table showing computed confidence probabilities and computed semantic weights corresponding to values appearing in the records for an attribute.

FIG. 10 illustrates an example fused entity record.

FIG. 12 illustrates an example fused entity record with the estimated attribute values that are not directly collectable from data sources.

DESCRIPTION OF EXAMPLE EMBODIMENTS

System Overview

Figure 1:
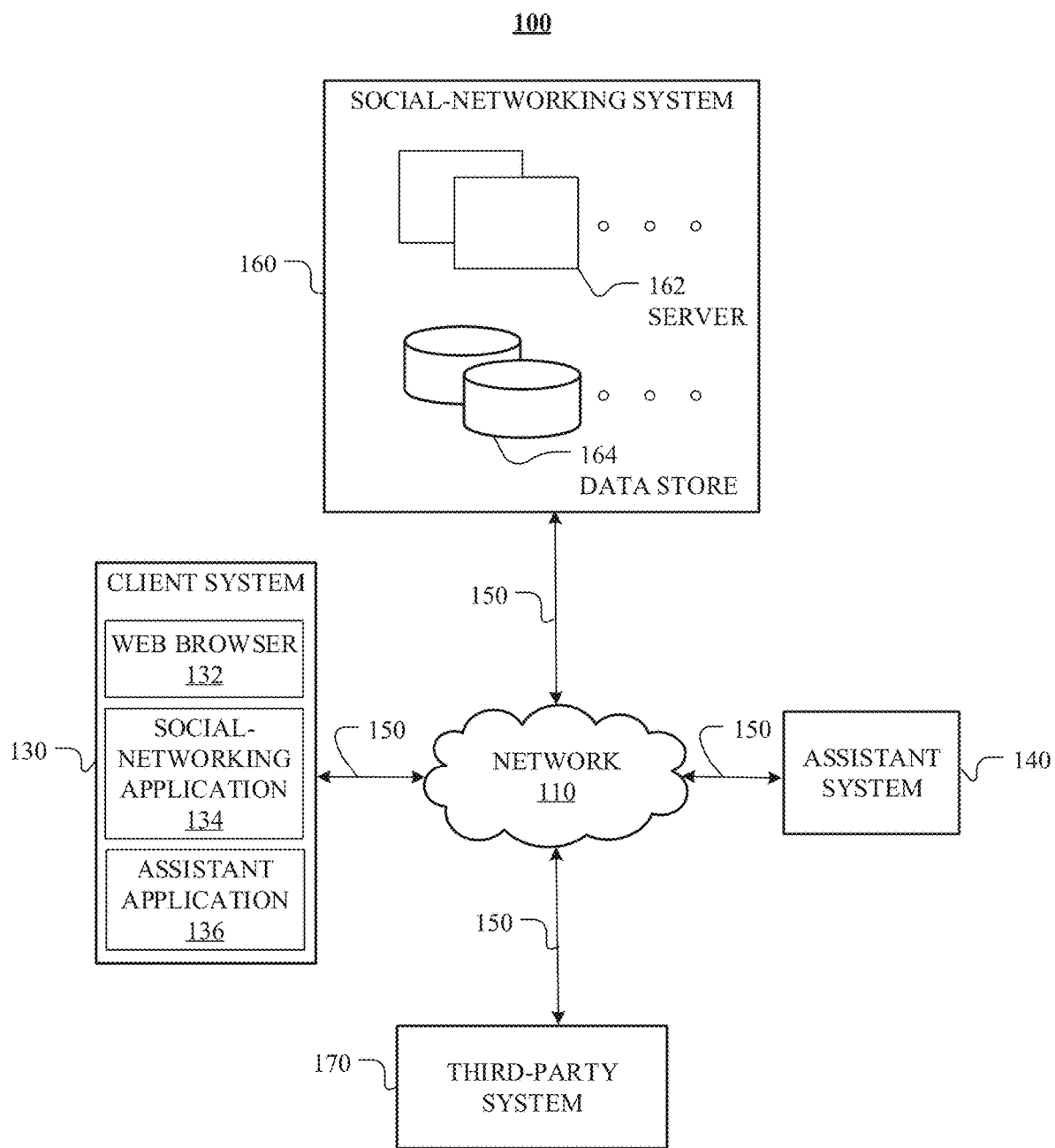
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. Patent Application No. 62/655,751, filed 10 Apr. 2018, U.S. patent application Ser. No. 29/631,910, filed 3 Jan. 2018, U.S. patent application Ser. No. 29/631,747, filed 2 Jan. 2018, U.S. patent application Ser. No. 29/631,913, filed 3 Jan. 2018, and U.S. patent application Ser. No. 29/631,914, filed 3 Jan. 2018, which are incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132 and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality). The assistant application 136 may then communicate the request to the assistant system 140. The assistant system 140 may accordingly generate the result and send it back to the assistant application 136. The assistant application 136 may further present the result to the user in text.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
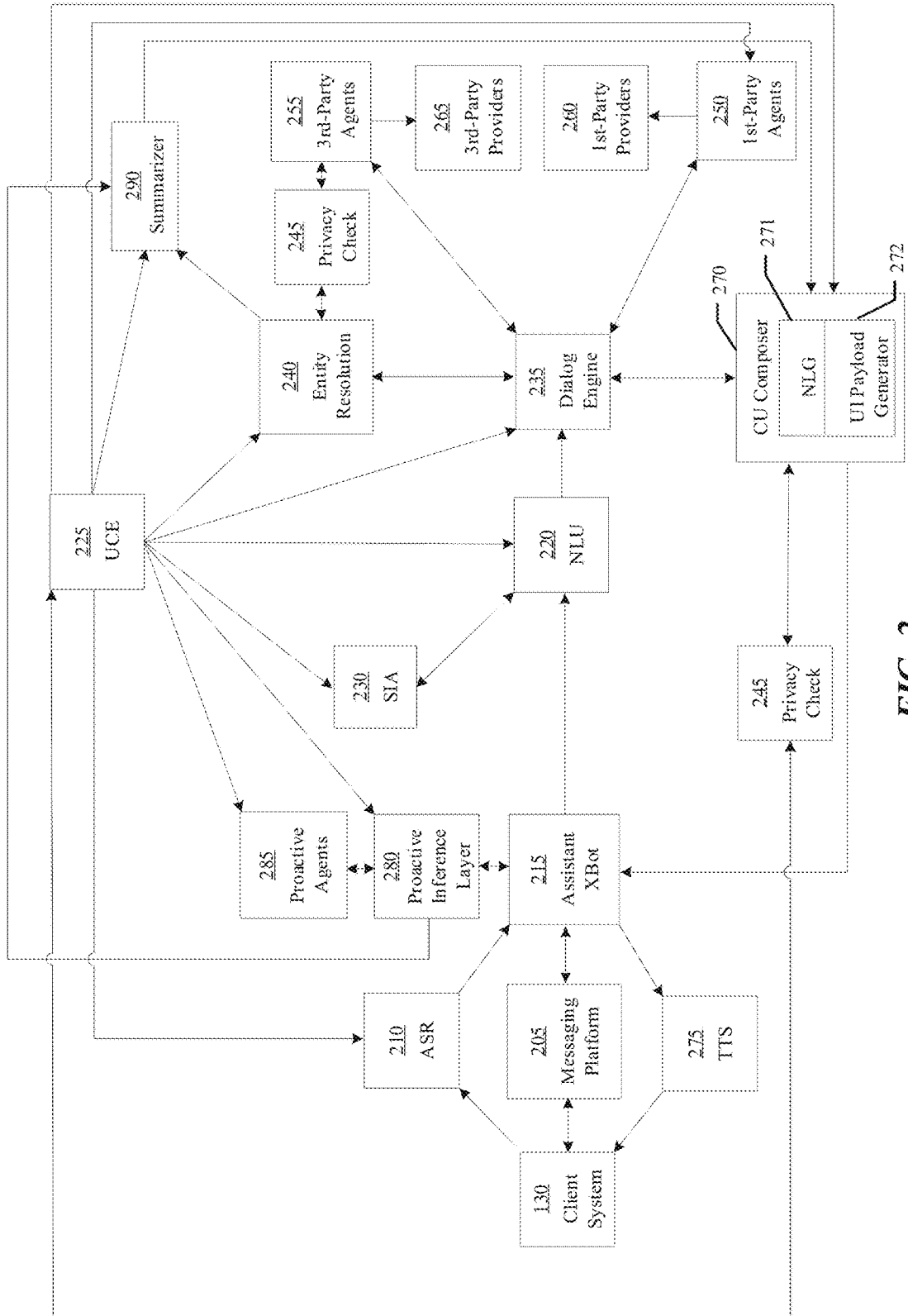
FIG. 2 illustrates an example architecture of the assistant system.

FIG. 2 illustrates an example architecture of the assistant system 140. In particular embodiments, the assistant system 140 may assist a user to obtain information or services. The assistant system 140 may enable the user to interact with it with multi-modal user input (such as voice, text, image, video) in stateful and multi-turn conversations to get assistance. The assistant system 140 may create and store a user profile comprising both personal and contextual information associated with the user. In particular embodiments, the assistant system 140 may analyze the user input using natural-language understanding. The analysis may be based on the user profile for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute pre-authorized tasks that are relevant to user interests and preferences based on the user profile, at a time relevant for the user, without a user input. In particular embodiments, the assistant system 140 may check privacy settings whenever it is necessary to guarantee that accessing user profile and executing different tasks are subject to the user's privacy settings.

In particular embodiments, the assistant system 140 may receive a user input from the assistant application 136 in the client system 130 associated with the user. If the user input is based on a text modality, the assistant system 140 may receive it at a messaging platform 205. If the user input is based on an audio modality (e.g., the user may speak to the assistant application 136 or send a video including speech to the assistant application 136), the assistant system 140 may process it using an audio speech recognition (ASR) module 210 to convert the user input into text. If the user input is based on an image or video modality, the assistant system 140 may process it using optical character recognition techniques within the messaging platform 205 to convert the user input into text. The output of the messaging platform 205 or the ASR module 210 may be received at an assistant xbot 215.

In particular embodiments, the assistant xbot 215 may be a type of chat bot. The assistant xbot 215 may comprise a programmable service channel, which may be a software code, logic, or routine that functions as a personal assistant to the user. The assistant xbot 215 may work as the user's portal to the assistant system 140. The assistant xbot 215 may therefore be considered as a type of conversational agent. In particular embodiments, the assistant xbot 215 may send the textual user input to a natural-language understanding (NLU) module 220 to interpret the user input. In particular embodiments, the NLU module 220 may get information from a user context engine 225 and a semantic information aggregator 230 to accurately understand the user input. The user context engine 225 may store the user profile of the user. The user profile of the user may comprise user-profile data including demographic information, social information, and contextual information associated with the user. The user-profile data may also include user interests and preferences on a plurality of topics, aggregated through conversations on news feed, search logs, messaging platform 205, etc. The usage of user profile may be protected behind a privacy check module 245 to ensure that a user's information can be used only for his/her benefit, and not shared with anyone else. The semantic information aggregator 230 may provide ontology data associated with a plurality of predefined domains, intents, and slots to the NLU module 220. In particular embodiments, a domain may denote a social context of interaction, e.g., education. An intent may indicate a purpose of a user interacting with the assistant system 140. A slot may represent a basic semantic entity. For example, a slot for "pizza" may be dish. The semantic information aggregator 230 may additionally extract information from a social graph, a knowledge graph, and a concept graph, and retrieve user profile from the user context engine 225. The semantic information aggregator 230 may further process information from these different sources by determining what information to aggregate, annotating n-grams of the user input, ranking the n-grams with confidence scores based on the aggregated information, formulating the ranked n-grams into features that can be used by the NLU module 220 for understanding the user input. Based on the output of the user context engine 225 and the semantic information aggregator 230, the NLU module 220 may identify a domain, an intent, and one or more slots from the user input in a personalized and context-aware manner. As an example and not by way of limitation, a user input may comprise "show me how to get to the coffee shop". The NLU module 220 may identify the particular coffee shop that the user wants to go based on the user's personal information and the associated contextual information. In particular embodiments, the NLU module 220 may comprise a lexicon of language and a parser and grammar rules to partition sentences into an internal representation. The NLU module 220 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm.

In particular embodiments, the identified domain, intent, and one or more slots from the NLU module 220 may be sent to a dialog engine 235. In particular embodiments, the dialog engine 235 may manage the dialog state and flow of the conversation between the user and the assistant xbot 215. The dialog engine 235 may additionally store previous conversations between the user and the assistant xbot 215. In particular embodiments, the dialog engine 235 may communicate with an entity resolution module 240 to resolve entities associated with the one or more slots, which supports the dialog engine 235 to forward the flow of the conversation between the user and the assistant xbot 215. In particular embodiments, the entity resolution module 240 may access the social graph, the knowledge graph, and the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute-value pairs. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given entity considering all the available information. For example, the knowledge graph may comprise an entity of a movie "The Martian" (2015), which includes information that has been extracted from multiple content sources (e.g., an online social network, an online encyclopedia, movie review sources, media databases, and entertainment content sources), and then deduped, resolved, and fused to generate the single unique record for the knowledge graph. The entity may be associated with a space attribute value which indicates the genre of the movie "The Martian" (2015). The entity resolution module 240 may additionally request user profile of the user associated with the user input from the user context engine 225. In particular embodiments, the entity resolution module 240 may communicate with a privacy check module 245 to guarantee that the resolving of the entities does not violate privacy policies. In particular embodiments, the privacy check module 245 may use an authorization/privacy server to enforce privacy policies. As an example and not by way of limitation, an entity to be resolved may be another user who specifies in his/her privacy settings that his/her identity should not be searchable on the online social network, and thus the entity resolution module 240 may not return that user's identifier in response to a request. Based on the information obtained from the social graph, knowledge graph, concept graph, and user profile, and subject to applicable privacy policies, the entity resolution module 240 may therefore accurately resolve the entities associated with the user input in a personalized and context-aware manner. In particular embodiments, each of the resolved entities may be associated with one or more identifiers hosted by the social-networking system 160. As an example and not by way of limitation, an identifier may comprise a unique user identifier (ID). In particular embodiments, each of the resolved entities may be also associated with a confidence score.

In particular embodiments, the dialog engine 235 may communicate with different agents based on the identified intent and domain, and the resolved entities. In particular embodiments, the agents may comprise first-party agents 250 and third-party agents 255. In particular embodiments, first-party agents 250 may comprise internal agents that are accessible and controllable by the assistant system 140 (e.g. agents associated with services provided by the online social network). In particular embodiments, third-party agents 255 may comprise external agents that the assistant system 140 has no control over (e.g., third-party music streams agents, third-party ticket sales agents). The first-party agents 250 may be associated with first-party providers 260 that provide content objects and/or services hosted by the social-networking system 160. The third-party agents 255 may be associated with third-party providers 265 that provide content objects and/or services hosted by the third-party system 170.

In particular embodiments, the communication from the dialog engine 235 to the first-party agents 250 may comprise requesting particular content objects and/or services provided by the first-party providers 260. As a result, the first-party agents 250 may retrieve the requested content objects from the first-party providers 260 and/or execute tasks that command the first-party providers 260 to perform the requested services. In particular embodiments, the communication from the dialog engine 235 to the third-party agents 255 may comprise requesting particular content objects and/or services provided by the third-party providers 265. As a result, the third-party agents 255 may retrieve the requested content objects from the third-party providers 265 and/or execute tasks that command the third-party providers 265 to perform the requested services. The third-party agents 255 may access the privacy check module 245 to guarantee no privacy violations before interacting with the third-party providers 265. As an example and not by way of limitation, the user associated with the user input may specify in his/her privacy settings that his/her profile information is invisible to any third-party content providers. Therefore, when retrieving content objects associated with the user input from the third-party providers 265, the third-party agents 255 may complete the retrieval without revealing to the third-party providers 265 which user is requesting the content objects.

In particular embodiments, each of the first-party agents 250 or third-party agents 255 may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, each of the first-party agents 250 or third-party agents 255 may retrieve user profile from the user context engine 225 to execute tasks in a personalized and context-aware manner. As an example and not by way of limitation, a user input may comprise "book me a ride to the airport." A transportation agent may execute the task of booking the ride. The transportation agent may retrieve user profile of the user from the user context engine 225 before booking the ride. For example, the user profile may indicate that the user prefers taxis, so the transportation agent may book a taxi for the user. As another example, the contextual information associated with the user profile may indicate that the user is in a hurry so the transportation agent may book a ride from a third-party ride-sharing service for the user since it may be faster to get a car from a ride-sharing service than a taxi company. In particular embodiment, each of the first-party agents 250 or third-party agents 255 may take into account other factors when executing tasks. As an example and not by way of limitation, other factors may comprise price, rating, efficiency, partnerships with the online social network, etc.

In particular embodiments, the dialog engine 235 may communicate with a conversational understanding composer (CU composer) 270. The dialog engine 235 may send the requested content objects and/or the statuses of the requested services to the CU composer 270. In particular embodiments, the dialog engine 235 may send the requested content objects and/or the statuses of the requested services as a $<k, c, u, d>$tuple, in which k indicates a knowledge source, c indicates a communicative goal, u indicates a user model, and d indicates a discourse model. In particular embodiments, the CU composer 270 may comprise a natural-language generator (NLG) 271 and a user interface (UI) payload generator 272. The natural-language generator 271 may generate a communication content based on the output of the dialog engine 235. In particular embodiments, the NLG 271 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator 271 to build complex concepts/roles from atomic ones. In particular embodiments, the content determination component may perform the following tasks to determine the communication content. The first task may comprise a translation task, in which the input to the natural-language generator 271 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator 271. The sentence planner may determine the organization of the communication content to make it human understandable. The surface realization component may determine specific words to use, the sequence of the sentences, and the style of the communication content. The UI payload generator 272 may determine a preferred modality of the communication content to be presented to the user. In particular embodiments, the CU composer 270 may communicate with the privacy check module 245 to make sure the generation of the communication content follows the privacy policies. In particular embodiments, the CU composer 270 may retrieve user profile from the user context engine 225 when generating the communication content and determining the modality of the communication content. As a result, the communication content may be more natural, personalized, and context-aware for the user. As an example and not by way of limitation, the user profile may indicate that the user likes short sentences in conversations so the generated communication content may be based on short sentences. As another example and not by way of limitation, the contextual information associated with the user profile may indicated that the user is using a device that only outputs audio signals so the UI payload generator 272 may determine the modality of the communication content as audio.

In particular embodiments, the CU composer 270 may send the generated communication content to the assistant xbot 215. In particular embodiments, the assistant xbot 215 may send the communication content to the messaging platform 205. The messaging platform 205 may further send the communication content to the client system 130 via the assistant application 136. In alternative embodiments, the assistant xbot 215 may send the communication content to a text-to-speech (TTS) module 275. The TTS module 275 may convert the communication content to an audio clip. The TTS module 275 may further send the audio clip to the client system 130 via the assistant application 136.

In particular embodiments, the assistant xbot 215 may interact with a proactive inference layer 280 without receiving a user input. The proactive inference layer 280 may infer user interests and preferences based on user profile that is retrieved from the user context engine 225. In particular embodiments, the proactive inference layer 280 may further communicate with proactive agents 285 regarding the inference. The proactive agents 285 may execute proactive tasks based on the inference. As an example and not by way of limitation, the proactive tasks may comprise sending content objects or providing services to the user. In particular embodiments, each proactive task may be associated with an agenda item. The agenda item may comprise a recurring item such as a daily digest. The agenda item may also comprise a one-time item. In particular embodiments, a proactive agent 285 may retrieve user profile from the user context engine 225 when executing the proactive task. Therefore, the proactive agent 285 may execute the proactive task in a personalized and context-aware manner. As an example and not by way of limitation, the proactive inference layer may infer that the user likes the band Maroon 5 and the proactive agent 285 may generate a recommendation of Maroon 5's new song/album to the user.

In particular embodiments, the proactive agent 285 may generate candidate entities associated with the proactive task based on user profile. The generation may be based on a straightforward backend query using deterministic filters to retrieve the candidate entities from a structured data store. The generation may be alternatively based on a machine-learning model that is trained based on user profile, entity attributes, and relevance between users and entities. As an example and not by way of limitation, the machine-learning model may be based on support vector machines (SVM). As another example and not by way of limitation, the machine-learning model may be based on a regression model. As another example and not by way of limitation, the machine-learning model may be based on a deep convolutional neural network (DCNN). In particular embodiments, the proactive agent 285 may also rank the generated candidate entities based on user profile and the content associated with the candidate entities. The ranking may be based on the similarities between a user's interests and the candidate entities. As an example and not by way of limitation, the assistant system 140 may generate a feature vector representing a user's interest and feature vectors representing the candidate entities. The assistant system 140 may then calculate similarity scores (e.g., based on cosine similarity) between the feature vector representing the user's interest and the feature vectors representing the candidate entities. The ranking may be alternatively based on a ranking model that is trained based on user feedback data.

In particular embodiments, the proactive task may comprise recommending the candidate entities to a user. The proactive agent 285 may schedule the recommendation, thereby associating a recommendation time with the recommended candidate entities. The recommended candidate entities may be also associated with a priority and an expiration time. In particular embodiments, the recommended candidate entities may be sent to a proactive scheduler. The proactive scheduler may determine an actual time to send the recommended candidate entities to the user based on the priority associated with the task and other relevant factors (e.g., clicks and impressions of the recommended candidate entities). In particular embodiments, the proactive scheduler may then send the recommended candidate entities with the determined actual time to an asynchronous tier. The asynchronous tier may temporarily store the recommended candidate entities as a job. In particular embodiments, the asynchronous tier may send the job to the dialog engine 235 at the determined actual time for execution. In alternative embodiments, the asynchronous tier may execute the job by sending it to other surfaces (e.g., other notification services associated with the social-networking system 160). In particular embodiments, the dialog engine 235 may identify the dialog intent, state, and history associated with the user. Based on the dialog intent, the dialog engine 235 may select some candidate entities among the recommended candidate entities to send to the client system 130. In particular embodiments, the dialog state and history may indicate if the user is engaged in an ongoing conversation with the assistant xbot 215. If the user is engaged in an ongoing conversation and the priority of the task of recommendation is low, the dialog engine 235 may communicate with the proactive scheduler to reschedule a time to send the selected candidate entities to the client system 130. If the user is engaged in an ongoing conversation and the priority of the task of recommendation is high, the dialog engine 235 may initiate a new dialog session with the user in which the selected candidate entities may be presented. As a result, the interruption of the ongoing conversation may be prevented. When it is determined that sending the selected candidate entities is not interruptive to the user, the dialog engine 235 may send the selected candidate entities to the CU composer 270 to generate a personalized and context-aware communication content comprising the selected candidate entities, subject to the user's privacy settings. In particular embodiments, the CU composer 270 may send the communication content to the assistant xbot 215 which may then send it to the client system 130 via the messaging platform 205 or the TTS module 275.

In particular embodiments, the assistant xbot 215 may communicate with a proactive agent 285 in response to a user input. As an example and not by way of limitation, the user may ask the assistant xbot 215 to set up a reminder. The assistant xbot 215 may request a proactive agent 285 to set up such reminder and the proactive agent 285 may proactively execute the task of reminding the user at a later time.

In particular embodiments, the assistant system 140 may comprise a summarizer 290. The summarizer 290 may provide customized news feed summaries to a user. In particular embodiments, the summarizer 290 may comprise a plurality of meta agents. The plurality of meta agents may use the first-party agents 250, third-party agents 255, or proactive agents 285 to generated news feed summaries. In particular embodiments, the summarizer 290 may retrieve user interests and preferences from the proactive inference layer 280. The summarizer 290 may then retrieve entities associated with the user interests and preferences from the entity resolution module 240. The summarizer 290 may further retrieve user profile from the user context engine 225. Based on the information from the proactive inference layer 280, the entity resolution module 240, and the user context engine 225, the summarizer 290 may generate personalized and context-aware summaries for the user. In particular embodiments, the summarizer 290 may send the summaries to the CU composer 270. The CU composer 270 may process the summaries and send the processing results to the assistant xbot 215. The assistant xbot 215 may then send the processed summaries to the client system 130 via the messaging platform 205 or the TTS module 275.

Figure 3:
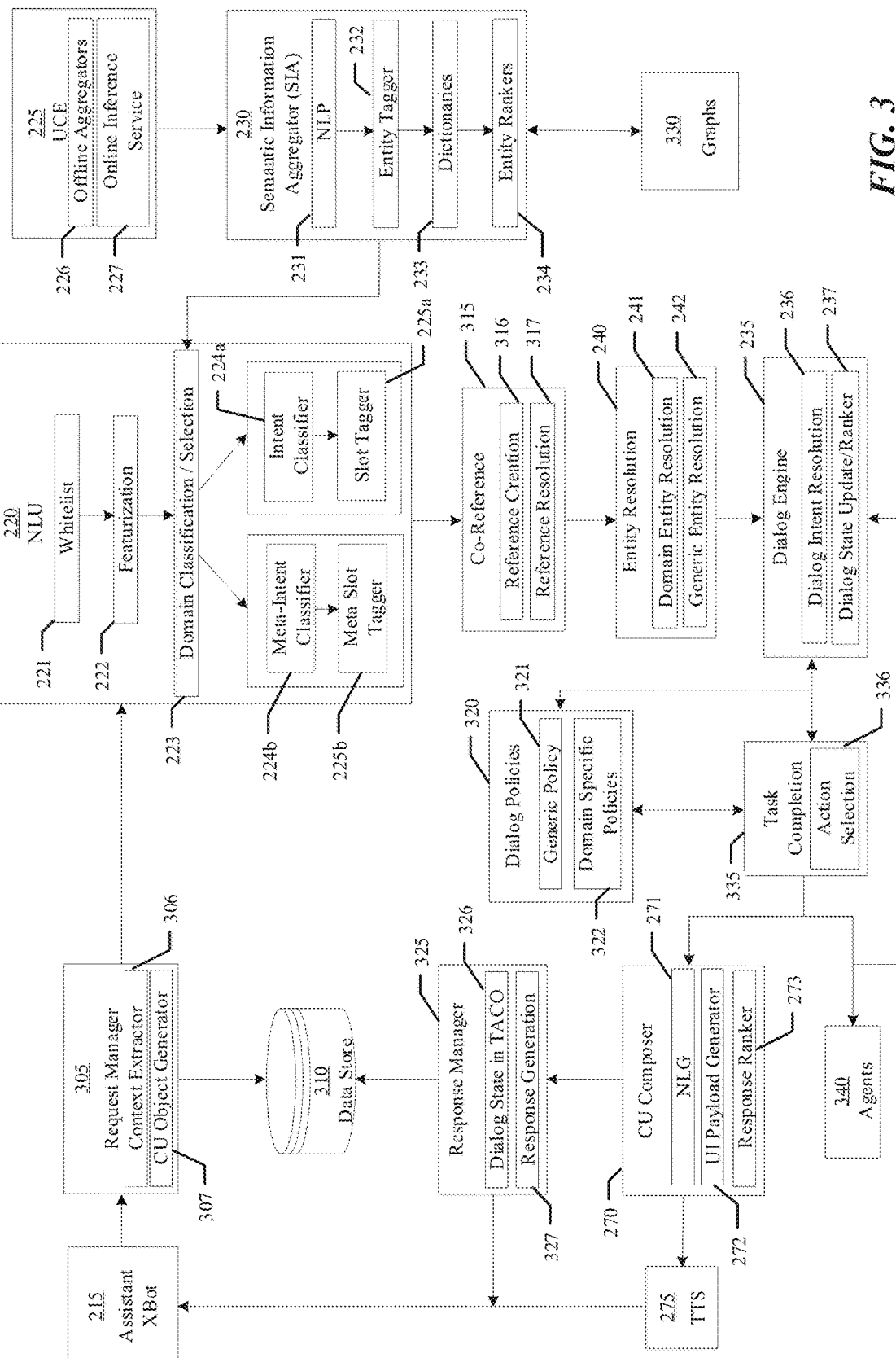
FIG. 3 illustrates an example diagram flow of responding to a user request by the assistant system.

FIG. 3 illustrates an example diagram flow of responding to a user request by the assistant system 140. In particular embodiments, the assistant xbot 215 may access a request manager 305 upon receiving the user request. The request manager 305 may comprise a context extractor 306 and a conversational understanding object generator (CU object generator) 307. The context extractor 306 may extract contextual information associated with the user request. The CU object generator 307 may generate particular content objects relevant to the user request. In particular embodiments, the request manager 305 may store the contextual information and the generated content objects in data store 310 which is a particular data store implemented in the assistant system 140.

In particular embodiments, the request manger 305 may send the generated content objects to the NLU module 220.

The NLU module 220 may perform a plurality of steps to process the content objects. At step 221, the NLU module 220 may generate a whitelist for the content objects. At step 222, the NLU module 220 may perform a featurization based on the whitelist. At step 223, the NLU module 220 may perform domain classification/selection based on the features resulted from the featurization. The domain classification/selection results may be further processed based on two related procedures. At step 224a, the NLU module 220 may process the domain classification/selection result using an intent classifier. The intent classifier may determine the user's intent associated with the user request. As an example and not by way of limitation, the intent classifier may be based on a machine-learning model that may take the domain classification/selection result as input and calculate a probability of the input being associated with a particular predefined intent. At step 224b, the NLU module may process the domain classification/selection result using a meta-intent classifier. The meta-intent classifier may determine categories that describe the user's intent. As an example and not by way of limitation, the meta-intent classifier may be based on a machine-learning model that may take the domain classification/selection result as input and calculate a probability of the input being associated with a particular predefined meta-intent. At step 225a, the NLU module 220 may use a slot tagger to annotate one or more slots associated with the user request. At step 225b, the NLU module 220 may use a meta slot tagger to annotate one or more slots for the classification result from the meta-intent classifier. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 220 may improve the domain classification/selection of the content objects by extracting semantic information from the semantic information aggregator 230. In particular embodiments, the semantic information aggregator 230 may aggregate semantic information in the following way. The semantic information aggregator 230 may first retrieve information from the user context engine 225. In particular embodiments, the user context engine 225 may comprise offline aggregators 226 and an online inference service 227. The offline aggregators 226 may process a plurality of data associated with the user that are collected from a prior time window. As an example and not by way of limitation, the data may include news feed posts/comments, interactions with news feed posts/comments, search history, etc. that are collected from a prior 90-day window. The processing result may be stored in the user context engine 225 as part of the user profile. The online inference service 227 may analyze the conversational data associated with the user that are received by the assistant system 140 at a current time. The analysis result may be stored in the user context engine 225 also as part of the user profile. In particular embodiments, the semantic information aggregator 230 may then process the retrieved information, i.e., user profile, from the user context engine 225 in the following steps. At step 231, the semantic information aggregator 230 may process the retrieved information from the user context engine 225 based on natural-language processing (NLP). At step 232, the processing result may be annotated with entities by an entity tagger. Based on the annotations, the semantic information aggregator 230 may generate dictionaries for the retrieved information at step 233. At step 234, the semantic information aggregator 230 may rank the entities tagged by the entity tagger. In particular embodiments, the semantic information aggregator 230 may communicate with different graphs 330 including social graph, knowledge graph, and concept graph to extract ontology data that is relevant to the retrieved information from the user context engine 225. In particular embodiments, records for the knowledge graph may be generated in part or in whole by an entity-generation system, as described in further detail herein. In particular embodiments, the semantic information aggregator 230 may aggregate user profile, the ranked entities, and the information from the graphs 330. The semantic information aggregator 230 may then send the aggregated information to the NLU module 220 to facilitate the domain classification/selection.

In particular embodiments, the output of the NLU module 220 may be sent to a co-reference module 315 to interpret references of the content objects associated with the user request. The co-reference module 315 may comprise reference creation 316 and reference resolution 317. In particular embodiments, the reference creation 316 may create references for entities determined by the NLU module 220. The reference resolution 317 may resolve these references accurately. As an example and not by way of limitation, a user request may comprise "find me the nearest department store and direct me there". The co-reference module 315 may interpret "there" as "the nearest department store". In particular embodiments, the co-reference module 315 may access the user context engine 225 and the dialog engine 235 when necessary to interpret references with improved accuracy.

In particular embodiments, the identified domains, intents, meta-intents, slots, and meta slots, along with the resolved references may be sent to the entity resolution module 240 to resolve relevant entities. In particular embodiments, the entity resolution module 240 may comprise domain entity resolution 241 and generic entity resolution 242. The domain entity resolution 241 may resolve the entities by categorizing the slots and meta slots into different domains. In particular embodiments, entities may be resolved based on the ontology data extracted from the graphs 330. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 242 may resolve the entities by categorizing the slots and meta slots into different generic topics. In particular embodiments, the resolving may be also based on the ontology data extracted from the graphs 330. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a particular car, the generic entity resolution 242 may resolve the particular car as vehicle and the domain entity resolution 241 may resolve the car as particular make/model of electric car.

In particular embodiments, the output of the entity resolution module 240 may be sent to the dialog engine 235 to forward the flow of the conversation with the user. The dialog engine 235 may comprise dialog intent resolution 236 and dialog state update/ranker 237. In particular embodiments, the dialog intent resolution 236 may resolve the user intent associated with the current dialog session. In particular embodiments, the dialog state update/ranker 237 may update/rank the state of the current dialog session. As an example and not by way of limitation, the dialog state update/ranker 237 may update the dialog state as "completed" if the dialog session is over. As another example and not by way of limitation, the dialog state update/ranker 237 may rank the dialog state based on a priority associated with it.

In particular embodiments, the dialog engine 235 may communicate with a task completion module 335 about the dialog intent and associated content objects. The task completion module 335 may comprise an action selection component 336. In particular embodiments, the dialog engine 235 may additionally check against dialog policies 320 regarding the dialog state. The dialog policies 320 may comprise generic policy 321 and domain specific policies 322, both of which may guide how to select the next system action based on the dialog state. In particular embodiments, the task completion module 335 may communicate with dialog policies 320 to obtain the guidance of the next system action. In particular embodiments, the action selection component 336 may therefore select an action based on the dialog intent, the associated content objects, and the guidance from dialog policies 320.

In particular embodiments, the output of the task completion module 335 may be sent to the CU composer 270. In alternative embodiments, the selected action may require one or more agents 340 to be involved. As a result, the task completion module 335 may inform the agents 340 about the selected action. Meanwhile, the dialog engine 235 may receive an instruction to update the dialog state. As an example and not by way of limitation, the update may comprise awaiting agents' response. In particular embodiments, the CU composer 270 may generate a communication content for the user using the NLG 271 based on the output of the task completion module 335. The CU composer 270 may also determine a modality of the generated communication content using the UI payload generator 272. Since the generated communication content may be considered as a response to the user request, the CU composer 270 may additionally rank the generated communication content using a response ranker 273. As an example and not by way of limitation, the ranking may indicate the priority of the response.

In particular embodiments, the output of the CU composer 270 may be sent to a response manager 325. The response manager 325 may perform different tasks including storing/updating the dialog state 326 retrieved from data store 310 and generating responses 327. In particular embodiments, the generated response and the communication content may be sent to the assistant xbot 215. In alternative embodiments, the output of the CU composer 270 may be additionally sent to the TTS module 275 if the determined modality of the communication content is audio. The speech generated by the TTS module 275 and the response generated by the response manager 325 may be then sent to the assistant xbot 215.

Resolving Entities from Multiple Data Sources

In particular embodiment, the assistant system 140 may resolve entity records from multiple data sources such that records describing an entity are identified and are associated with a globally unique identifier. The assistant system 140 may require access to knowledge described by entities and stored in a knowledge graph. The knowledge graph may comprise vertices representing entities and edges representing relationships between entities. A comprehensive, high-quality knowledge graph may have a unique instance for an entity, not duplicated instances for an entity. To build a comprehensive, high quality knowledge graph for use by the assistant system 140, the entity resolution module 240 of the assistant system 140 may need to identify entities based on data extracted from multiple sources and resolve to universal entity objects. Creating each entity object for the knowledge graph may involve one or more of the following five steps (1) deduping; (2) resolving; (3) attribute fusing; (4) semantic analysis; and (5) attribute classification. A functional unit may produce a structured record for each entity instance captured from data by collecting and processing data from multiple sources (e.g., external sources or internal sources such as the social graph). The structured record for an entity instance may be a set of attribute-value pairs. More than one record for a unique entity may be generated from a particular source. An entity-deduping module may process records from a single data source. The entity-deduping module may identify the best record for an entity and eliminate all the other records for the entity. Alternatively, the entity-deduping module may keep duplicated records for an entity and link the records to an entity identifier unique within the corresponding data source. In particular embodiments, the entity-deduping module may construct a merged record for the entity by merging the all records linked to the entity identifier unique within the data source. In particular embodiments, duplicated records may be merged by a later module. The records processed by the entity-deduping module may be processed by the entity resolving module that resolves records from a plurality of sources to identify a number of records belonging to an entity. When multiple records belong to an entity, those records will be linked to a globally unique entity identifier. Although this disclosure describes deduping and resolving multiple records from multiple data sources for a unique entity in a particular manner, this disclosure contemplates deduping and resolving multiple records from multiple data sources for a unique entity in any suitable manner.

Figure 4:
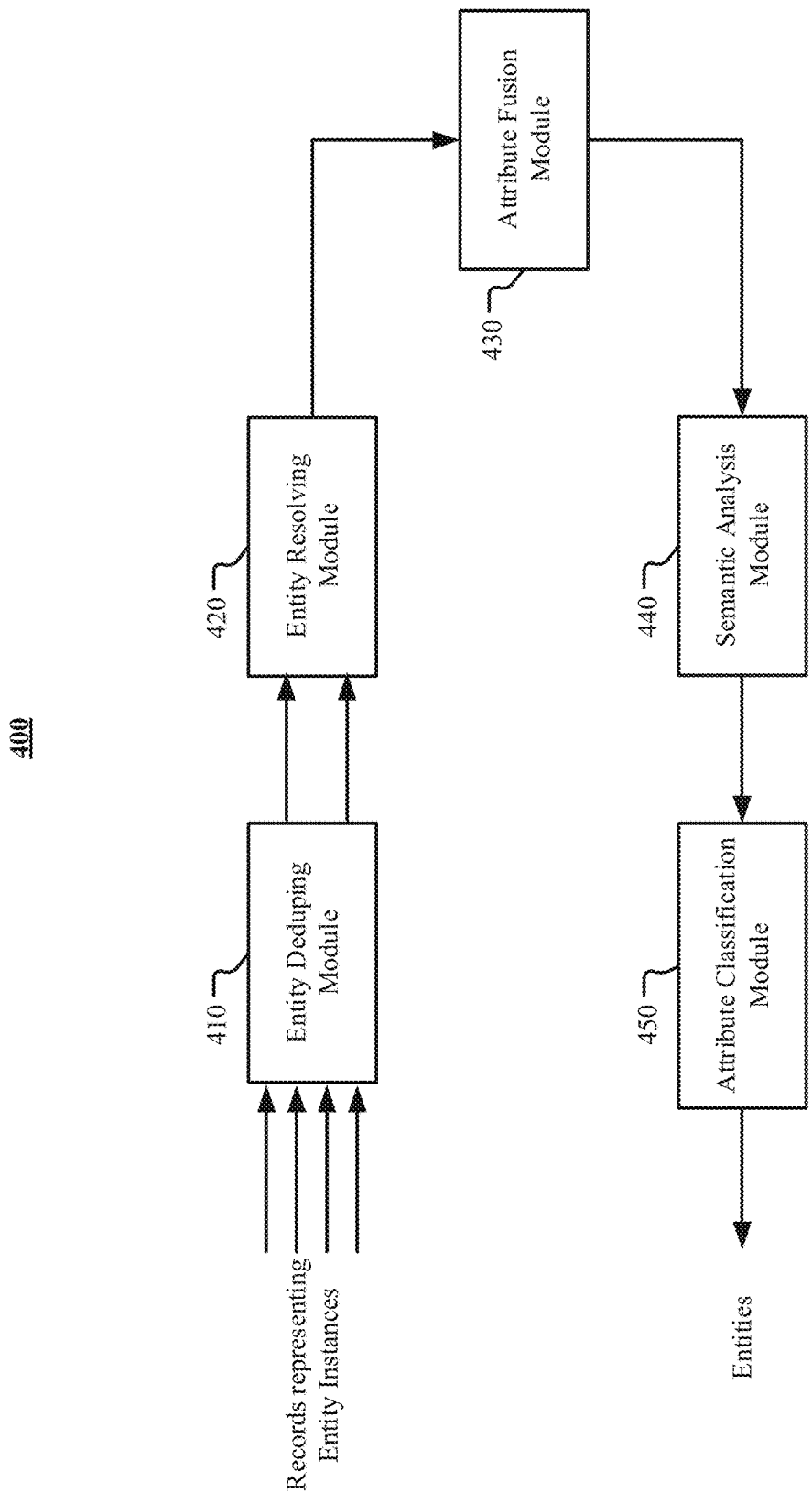
FIG. 4 illustrates an example architecture for an entity-generation system to create entity objects in the knowledge graph based on collected data from multiple data sources.

FIG. 4 illustrates an example architecture for an entity-generation system 400 to create entity objects for the knowledge graph based on collected data from multiple data sources. The entity-generation system 400 may be a sub-system of the entity resolution module 240. In particular embodiments, the entity-generation system 400 may be a separate system from the entity resolution module 240. An entity-deduping module 410 may access a plurality of records based on data collected from a plurality of data sources, where each record may represent an entity instance in the collected data. The entity-deduping module 410 may dedupe a plurality of records from a data source for an entity to a single record. An entity resolving module 420 may resolve records from multiple data sources such that records corresponding to an entity are linked to a unique entity identifier. An attribute-fusion module 430 may fuse attributes of an entity when diverse values for attributes associated with the entity are collected from a plurality of data sources. The attribute-fusion module 430, along with a semantic-analysis module 440, may produce a single record for the entity by combining attribute values. The semantic-analysis module 440, a sub-process of the attribute-fusion module 430, may compute a semantic weight for each attribute value associated with the entity. A semantic weight for an attribute value may represent how the value being semantically appropriate for the particular entity considering all the available information related with the particular entity. The semantic-analysis module 440 may sort the attribute values in the order of corresponding semantic weights. An attribute-classification module 450 may determine a set of attribute values associated with an entity where the attribute values are not directly collectable from data sources. The attribute-classification module 450 may add the attribute-value pairs corresponding to the determined attribute values to the single record of the entity. Once a single record for an entity is completed, the entity-generation system 400 may forward the completed record to a knowledge-graph-generation module.

In particular embodiments, the assistant system 140 may access a plurality of records based on data collected from a plurality of data sources. Each of the plurality of accessed records may describe attributes of each of a plurality of entities. Each of the plurality of accessed records may comprise one or more attribute-value pairs comprising an attribute name and an attribute value. Each attribute-value pair may describe an attribute of the corresponding entity. In particular embodiments, the plurality of accessed records may be of JavaScript Object Notation (JSON) format. In particular embodiments, the plurality of accessed records may be of Extensible Markup Language (XML) format. In particular embodiments, the plurality of accessed records may be of any other suitable format comprising attribute-value pairs. An entity may be classified into one of a plurality of pre-determined domains. A domain of an entity may be associated with a pre-determined list of required attributes corresponding to the domain. The records may be grouped by their corresponding data source. Although this disclosure describes accessing a plurality of records based on data collected from a plurality of data sources in a particular manner, this disclosure contemplates accessing the plurality of records based on data collected from the plurality of data sources in any suitable manner.

In particular embodiments, a third-party system may generate the plurality of accessed records based on collected data from a data source. A data-analyzing module of the third-party system may detect an occurrence of an entity in the collected data from the data source by parsing and analyzing the collected data from the source. The data-analyzing module may extract information associated with the entity by parsing and analyzing text and multimedia data around the occurrence of the entity. The third-party system may generate each record based on the extracted information associated with the entity. In particular embodiments, the assistant system 140 may generate the plurality of accessed records based on collected data from a data source. A data-analyzing module of the assistant system 140 may detect an occurrence of an entity in the collected data from the data source by parsing and analyzing the collected data from the source. The data-analyzing module may extract information associated with the entity by parsing and analyzing text and multimedia data around the occurrence of the entity. The assistant system 140 may generate each record based on the extracted information associated with the entity. As an example and not by way of limitation, a third-party system may collect data from an online database and parse and analyze the collected data to detect an occurrence of an entity. The third-party system may generate a record for "New York City" when the third-party system detects an occurrence of "New York City" by parsing and analyzing a page regarding "New York City." One or more other names for "New York City" including "NYC," "New York, New York" and "the city of New York" may be linked to the page for "New York City" in the database system. Though "Big Apple" is a nickname of "New York City," the database system maintains a separate page for "Big Apple" to provide the origin and history of the nickname. The third-party system may generate a record for "Big Apple" when the third-party system detects an occurrence of "Big Apple" based on parsing and analyzing a page about "Big Apple" As another example and not by way of limitation, the assistant system 140 may receive a corpus of collected data from a data source and generate records for each detected occurrence of an entity. The assistant system 140 may receive a corpus of collected data from a social network. The assistant system 140 may generate a record for "New York City" when the assistant system 140 detects an occurrence of "New York City" from a page or a posting. Because the social network may have multiple occurrences of "New York City," the assistant system 140 may generate multiple records for "New York City." Although this disclosure describes generating a record corresponding to an occurrence of an entity in a particular manner, this disclosure contemplates generating a record corresponding to an occurrence of an entity in any suitable manner.

In particular embodiments, the assistant system 140 may dedupe the plurality of records by an entity-deduping module 410. The entity-deduping module 410 may process each group of records to produce a set of deduped records. Each record in the set of deduped records may be associated with a unique entity identifier. One or more deduped records describing a particular entity may be associated with a unique entity identifier corresponding to the particular entity. The entity-deduping module 410 may process one group of records at a time. As an example and not by way of limitation, the entity-deduping module 410 of the assistant system 140 may dedupe the plurality of records generated based on collected data from an online database. After deduping process, each record is associated with a unique entity identifier that is unique within the online database group. Although this disclosure describes deduping a plurality of records from a single data source in a particular manner, this disclosure contemplates deduping the plurality of records from the single data source in any suitable manner.

Figure 5:
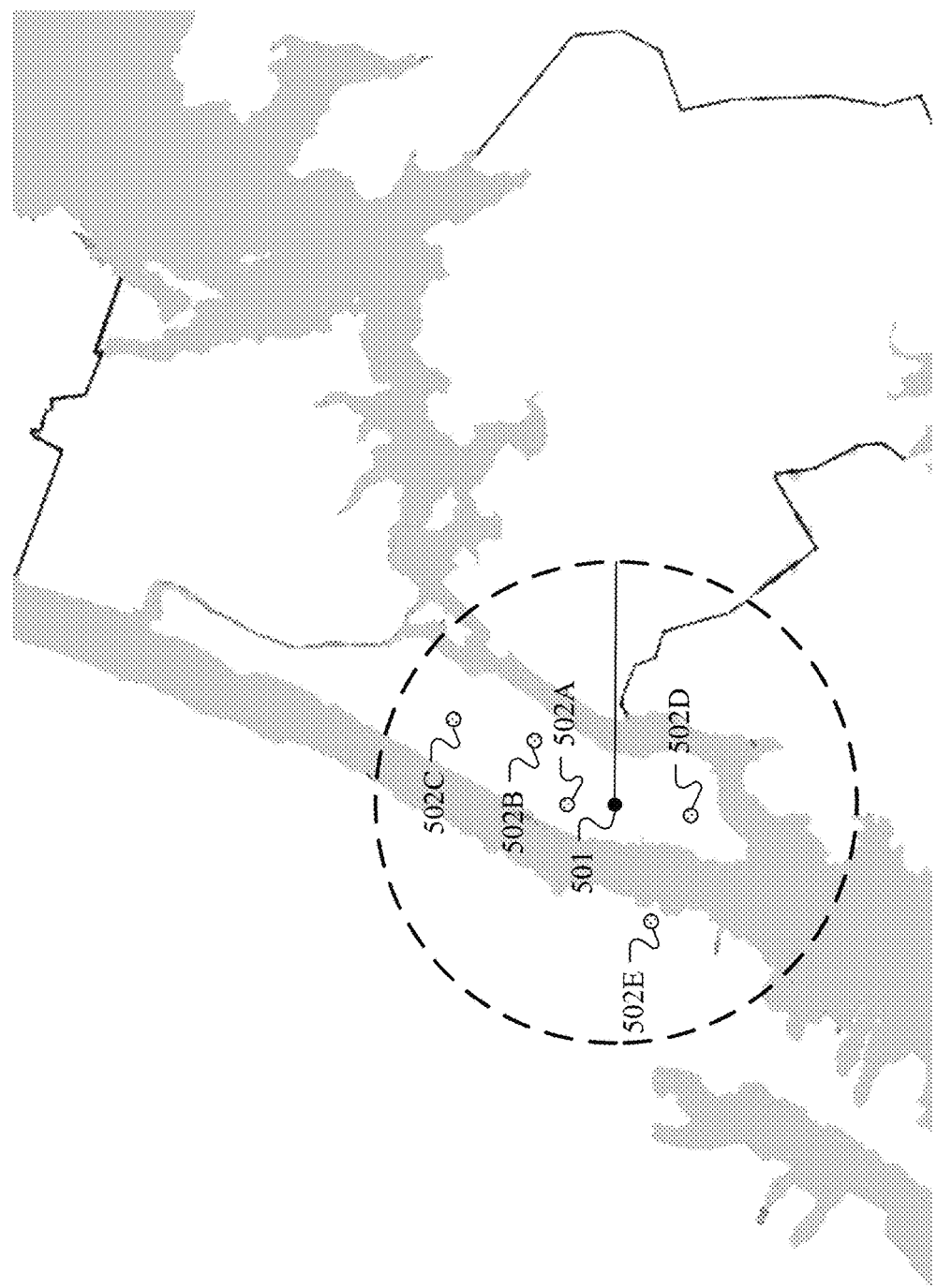
FIG. 5 illustrates an example selection of a candidate set based on geographic locations of corresponding entities.

In particular embodiments, the entity-deduping module 410 may select a first record describing a particular entity from the plurality of records in the group that does not have an assigned entity identifier yet. The entity-deduping module 410 may assign an entity identifier unique within the group to the first record. The entity-deduping module 410 may identify a candidate set comprising one or more records in the group that satisfy one or more conditions to be in the candidate set for the first record. The one or more records in the candidate set may have higher probabilities of describing the particular entity than the rest of the records in the group. The one or more conditions for a record in the group to be in the candidate set may comprise a first condition that a geographic location of entity corresponding to the record in the group is within a threshold distance from a geographic location of the particular entity. In particular embodiments, the one or more conditions for a record in the group to be in the candidate set may comprise a first condition that a geographic location of an entity corresponding to the record in the group is one of the k closest locations to the geographic location of the particular entity among the geographic locations associated with entities corresponding to the records in the group, where k is a pre-determined number. FIG. 5 illustrates an example selection of a candidate set based on geographic locations of corresponding entities. As an example and not by way of limitation, illustrated in FIG. 5, a particular entity corresponding to the first record is associated with geographic coordinates 501 in Manhattan borough of New York City. The entity-deduping module 410 may index the records in the group based on geographic coordinates associated with corresponding entities. The entity-deduping module 410 may determine that geographic coordinates 502A, 502B, 502C, 502D, and 502E are within a threshold distance from the geographic coordinates 501. The geographic coordinates 502E is in New Jersey while the geographic coordinates 502A, 502B, 502C and 502D are in Manhattan. The entity-deduping module 410 may select records associated with the geographic coordinates 502A, 502B, 502C, 502D and 502E as the candidate set. In particular embodiments, A particular entity may not be associated with a geographic location. In such cases, the one or more conditions for a record in the group to be in the candidate set may comprise a first condition that an index of an entity corresponding to the record is close to an index of the particular entity, where the indices may be determined by a locality sensitive hashing algorithm. As an example not by way of limitation, the locality sensitive hashing algorithm may determine indices based on a similarity of entity names such that entities with similar names may be hashed into close indices. Although this disclosure describes identifying a set of candidate records given a first record in a particular manner, this disclosure contemplates identifying the set of candidate records given the first record in any suitable manner.

Figure 6:
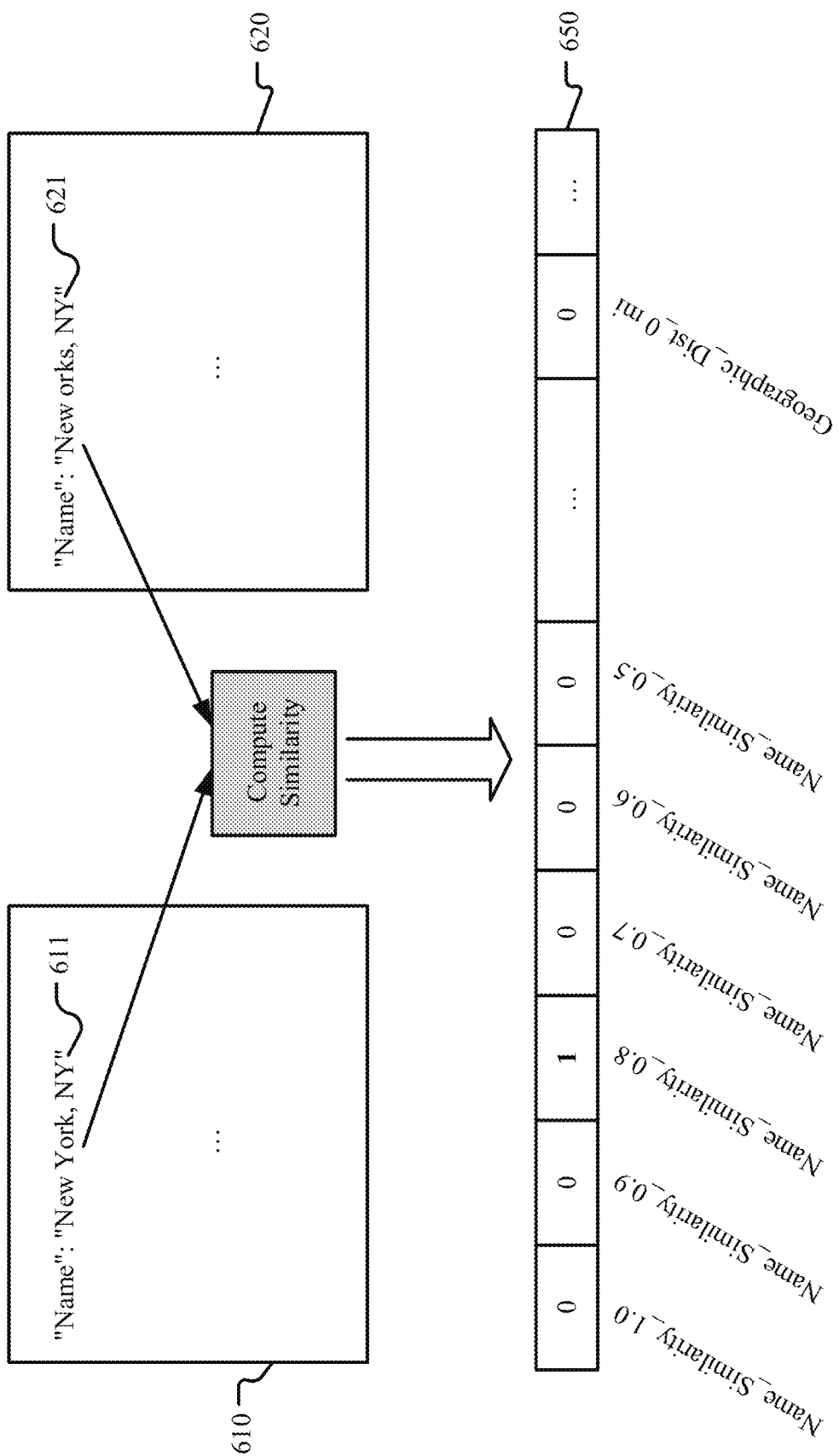
FIG. 6 illustrates an example one-hot feature vector generation based on the similarities of respective attributes.

In particular embodiments, the entity-deduping module 410 may identify k records {y1, y2, . . . , yk} as the candidate set for a first record x. For each pair of records (x, yi) between the first record x and a second record in the candidate set yi, the entity-deduping module 410 may generate a feature vector based on a measurement of similarities of respective attributes in the pair of records. The numeric feature vector may be generated from the pair of records by one-hot encoding, hashing, or by using real-valued similarity scores. FIG. 6 illustrates an example one-hot feature vector generation based on the similarities of respective attributes. As an example and not by way of limitation, as illustrated in FIG. 6, the entity-deduping module 410 generates an one-hot feature vector between a first record 610 and a second record 620 in the candidate set. The Name attribute for the first record 610 is "New York, N.Y." 611 while the Name attribute for the second record 620 is "New orks, NY" 621. The entity-deduping module 410 may compute a similarity between name attribute values 611 and 621. Since the computed similarity is about 80%, the entity-deduping module 410 may set "Name_Similarity_0.8" element of the one-hot feature vector 650 to "1" while set the other Name Similarity elements of the one-hot feature vector 650 (e.g., "Name_Similarity_1.0," "Name_Similarity_0.9," "Name_Similarity_0.7," . . . "Name_Similarity_0.0") to "0." The entity-deduping module 410 may fill the other elements of the one-hot feature vector 650 based on a measurement of similarities of respective attribute values between the two records. Although this disclosure describes generating a feature vector based on a measurement of similarities of respective attributes between two records in a particular manner, this disclosure contemplates generating the feature vector based on a measurement of similarities of respective attributes between two records in any suitable manner.

In particular embodiments, the entity-deduping module 410 may, for each pair of a first record x and a second record yi in the set of candidate records, compute a probability that the pair of records describe a common entity by processing the feature vector generated based on the pair of records by a machine-learning classifier. If the probability exceeds a threshold, the entity-deduping module 410 may determine that the first record x and the second record yi describe the common entity. The machine-learning classifier may be based on Gradient Boosted Decision Trees (GBDT). In particular embodiments, the machine-learning classifier may be any other supervised machine learning algorithm-based classifier, such as a logistic regression, support vector machine, or neural network classifier. Different classifier may be used for different domain of entities. Each classifier may be trained with labelled records. Once the entity-deduping module 410 determines that two records x and yi describe a common entity, the entity-deduping module 410 may dedupe the records either by keeping a record with more information or linking the both records to an entity identifier unique within the group. In particular embodiments, the entity-deduping module 410 may keep a record with more information among the pair of records and remove a record with less information. To achieve that, for each pair of the first record x and a second record yi that were determined to describe a common entity, the entity-deduping module 410 may determine if the second record yi in the candidate set contains more information than the first record x. In response to the determination, the entity-deduping module 410 may assign the entity identifier assigned to the first record x to the second record yi and swap the two records such that the first record x becomes the second record yi and the second record yi becomes the first record x. The entity-deduping module 410 may remove the second record yi from the group. As an example and not by way of limitation, continuing with a prior example illustrated in FIG. 5, the entity-deduping module 410 may determine that the first record associated with coordinates 501 and a second record associated with coordinates 502A describe a same entity. The entity-deduping module 410 may determine that the second record associated with the coordinates 502A has more information than the first record associated with the coordinates 501. The entity-deduping module 410 may assign the entity identifier assigned to the first record associated with the coordinates 501 to the second record associated with the coordinates 502A and swap the two records such that the second record associated with coordinates 502A becomes the first record. The entity-deduping module 410 may delete the record associated with the coordinates 501 from the group of records. In particular embodiments, the entity-deduping module 410 may link the second record yi to the entity identifier that assigned to the first record x if the entity-deduping module 410 determines that the records x and yi describe a common entity. In particular embodiments, the entity-deduping module 410 may construct the merged record by merging the records linked to the entity identifier assigned to the first record x after processing all the second records {y1, y2, . . . , yk} in the candidate set for the first record x. The entity-deduping module 410 may link the merged record to the entity identifier assigned to the first record. After constructing the merged record, the entity-deduping module 410 may remove the records used to construct the merged record, i.e., the first record and the second records in the candidate set linked to the entity identifier assigned to the first record. As an example and not by way of limitation, continuing with a prior example illustrated in FIG. 5, the entity-deduping module 410 may generate feature vectors for pairs between the first record associated with the coordinates 501 and the second records associated with the coordinates 502A, 502B, 502C, 502D and 502E. The entity-deduping module 410 may determine whether each of the second records describes the same entity with the first record by processing the generated feature vectors by a machine-learning classifier. As a result of the classification process, the entity-deduping module 410 determines that the first record associated with the coordinates 501 and the second records associated coordinates 502A and 502D describe a same entity, while the second records associated with the coordinates 502B, 502C and 502E describe different entities. The entity-deduping module 410 may assign the entity identifier assigned to the first record to the second records associated with the coordinates 502A and 502D. In particular embodiments, the entity-deduping module 410 may construct a merged record by merging the first record associated with the coordinate 501 and the second records associated with the coordinates 502A and 502D. The entity-deduping module 410 may assign the entity identifier assigned to the first record to the constructed merged record. The entity-deduping module 410 may delete the first record associated with the coordinates 501 and the second records associated with the coordinates 502A and 502D from the group. Although this disclosure describes deduping records based on classifications using machine-learning classifiers in a particular manner, this disclosure contemplates deduping records based on classifications using machine-learning classifiers in any suitable manner.

In particular embodiments, the entity resolving module 420 of the assistant system 140 may select one of the plurality of data sources as a core source. The selection may be done in any suitable manner. The entity resolving module 420 may select the group of records associated with the core source as the core group of records. As an example and not by way of limitation, an entity resolving module 420 may access a plurality of records that have been deduped by the entity-deduping module 410. The plurality of records may have been generated based on collected records from various online resources. The plurality of records may be grouped based on their respective data source. Records in a group may be linked to a source identifier that identifies the data source of the group. The entity resolving module 420 may select the social network as the core source. The entity resolving module 420 may select the group of records associated with the social network as the core group of records. Although this disclosure describes selecting a core source from a plurality of data source in a particular manner, this disclosure contemplates selecting a core source from a plurality of data source in any suitable manner.

In particular embodiments, for a particular record in the core group of records corresponding to each particular entity, the entity resolving module 420 of the assistant system 140 may identify a candidate set comprising one or more records from the non-core groups of records that satisfy one or more conditions to be in the candidate set for the particular record. The one or more records in the candidate set may have higher probabilities of describing the entity described by the particular record in the core group than the other records in the non-core group of records. The one or more conditions for a record from the non-core groups to be in the candidate set may comprise a first condition that a geographic location of an entity corresponding to the record from the non-core groups is within a threshold distance from a geographic location of the particular entity. In particular embodiments, the particular entity may not be associated with a geographic location. In such cases, the one or more conditions for a record from the non-core groups to be in the candidate set may comprise a first condition that an index of an entity corresponding to the record from the non-core groups is close to an index of the particular entity, where the indices may be determined by a locality sensitive hashing algorithm. As an example not by way of limitation, the locality sensitive hashing algorithm may determine indices based on a similarity of entity names such that entities with similar names may be hashed into close indices. Although this disclosure describes identifying a candidate set for a particular record corresponding to a particular entity where the candidate set comprises one or more records having higher probabilities of describing the particular entity than the other records from the non-core groups of records in a particular manner, this disclosure contemplates identifying a candidate set for a particular record corresponding to a particular entity where the candidate set comprises one or more records having higher probabilities of describing the particular entity than the other records from the non-core groups of records in any suitable manner.

In particular embodiments, for each pair of records between a particular record x in the core group and a record yi in the candidate set {y1, y2, . . . , yk} for each particular entity, the entity resolving module 420 of the assistant system 140 may generate a feature vector based on a measure of similarities of respective attributes in the pair of records. The numeric feature vector may be generated from the pair of records by one-hot encoding, hashing, or by using real-valued similarity scores. An example generation of a one-hot feature vector is illustrated in FIG. 6. Although this disclosure describes generating a one-hot feature vector based on a measurement of similarities of respective attributes between two records in a particular manner, this disclosure contemplates generating the one-hot feature vector based on the measurement of similarities of respective attributes between two records in any suitable manner.

In particular embodiments, the entity resolving module 420 of the assistant system 140 may compute, for each pair of records (x, yi), a probability that the pair of records describe a common entity by processing the numeric feature vector by a machine-learning classifier. The machine-learning classifier may be a Gradient Boosted Decision Trees (GBDT) classifier. In particular embodiments, the machine-learning classifier may be any other supervised machine learning algorithm-based classifier such as a logistic regression, support vector machine, or neural network classifier. The machine-learning classifier may be trained with labelled training data. The training data may be labelled based on crowdsourced data. Although this disclosure describes computing a probability that a pair of records describe a common entity in a particular manner, this disclosure contemplates computing the probability that the pair of records describe the common entity in any suitable manner.

In particular embodiments, the entity resolving module 420 of the assistant system 140 may link the record yi in the candidate set to a globally unique entity identifier identifying the particular entity if the probability for a pair of records exceeds a threshold, where the particular entity corresponds to the particular record x. The globally unique entity identifier may be the entity identifier assigned to the particular record x within the core group of records. As an example and not by way of limitation, the entity resolving module 420 may access a particular record x from the core group of records. The particular record x is associated with a particular entity identifier unique within the core group identifying a particular entity. The entity resolving module 420 may identify a candidate set {y1, y2, . . . , yk} from the non-core groups of records based on geographic locations associated with corresponding entities. The entity resolving module 420 may generate a numeric feature vector based on a measure of similarities of respective attributes for a pair of records x and y1. The entity resolving module 420 may compute a probability that the particular record x and a record y1 describe a common entity by processing the one-hot feature vector with a GBDT classifier. Because the computed probability exceeds a pre-determined threshold, the entity resolving module 420 may link the particular entity identifier to the record y1 in the candidate set. The entity resolving module 420 may compute a probability that the record x and record yi describe a common entity for each yi in the candidate set. The entity resolving module 420 may link the particular entity identifier to the record yi if the probability exceeds the pre-determined threshold. Although this disclosure describes linking a record in the candidate set to a globally unique entity identifier in a particular manner, this disclosure contemplates linking a record in the candidate set to a globally unique entity identifier in any suitable manner.

In particular embodiments, for a particular record in the core group of records corresponding to each particular entity, the entity resolving module 420 may identify, from each of the non-core groups of records, a candidate set comprising one or more records that satisfy one or more conditions to be in the candidate set for the particular record. For each pair of records between the particular record x in the core group and a record yi in the candidate set {y1, y2, . . . , yk} for each particular entity, the entity resolving module 420 may generate a feature vector based on a measure of similarities of respective attributes in the pair of records. The feature vector may be generated from the pair of records by one-hot encoding, hashing, or by using real-valued similarity scores. The entity resolving module 420 may compute, for each pair of records (x, yi), a probability that the pair of records describe a common entity by processing the feature vector by a machine-learning classifier. The entity resolving module 420 may link the record yi with the highest computed probability among the records in the candidate set to a globally unique entity identifier identifying the particular entity, if the highest computed probability exceeds a pre-determined threshold. The entity resolving module 420 may link one record from a non-core group to the globally unique entity identifier identifying the particular entity. Although this disclosure describes linking one record from a non-core group of records to a globally unique entity identifier identifying the particular entity in a particular manner, this disclosure contemplates linking one record from a non-core group of records to a globally unique entity identifier identifying the particular entity in any suitable manner.

In particular embodiments, the core group of records may not have records for all the entities described by records in all the groups. After linking the records in the non-core groups to all the available globally unique entity identifiers in the core group, the entity resolving module 420 may select one of the non-core groups that still have records not linked to globally unique entity identifier as the second core group. For each particular record in the second core group that has not been linked to a globally unique entity identifier, the entity resolving module 420 may assign a globally unique entity identifier identifying a particular entity described by the particular record. The particular entity may not be described by any record in the first core group of records. The entity resolving module 420 may identify a candidate set comprising one or more records from the non-core groups of records that satisfy one or more conditions to be in the candidate set for the particular record. In particular embodiments, the entity resolving module 420 may identify a candidate set for each non-core groups of records. The entity resolving module 420 may compute, for each record in the candidate set, a probability that the particular record and the record in the candidate set describe a common entity as described above. The entity resolving module 420 may link a record in the candidate set to the globally unique entity identifier identifying the particular entity if the computed probability indicates that the record in the candidate set describes the particular entity. The entity resolving module 420 may continue selecting a next core group after assigning globally unique entity identifiers to the records in the second core group until all the records in all the group of records are linked to globally unique entity identifiers. Although this disclosure describes assigning globally unique entity identifiers to the records describing entities that are not described by any record in the core group in a particular manner, this disclosure contemplates assigning globally unique entity identifiers to the records describing entities that are not described by any record in the core group in any suitable manner.

Figure 7:
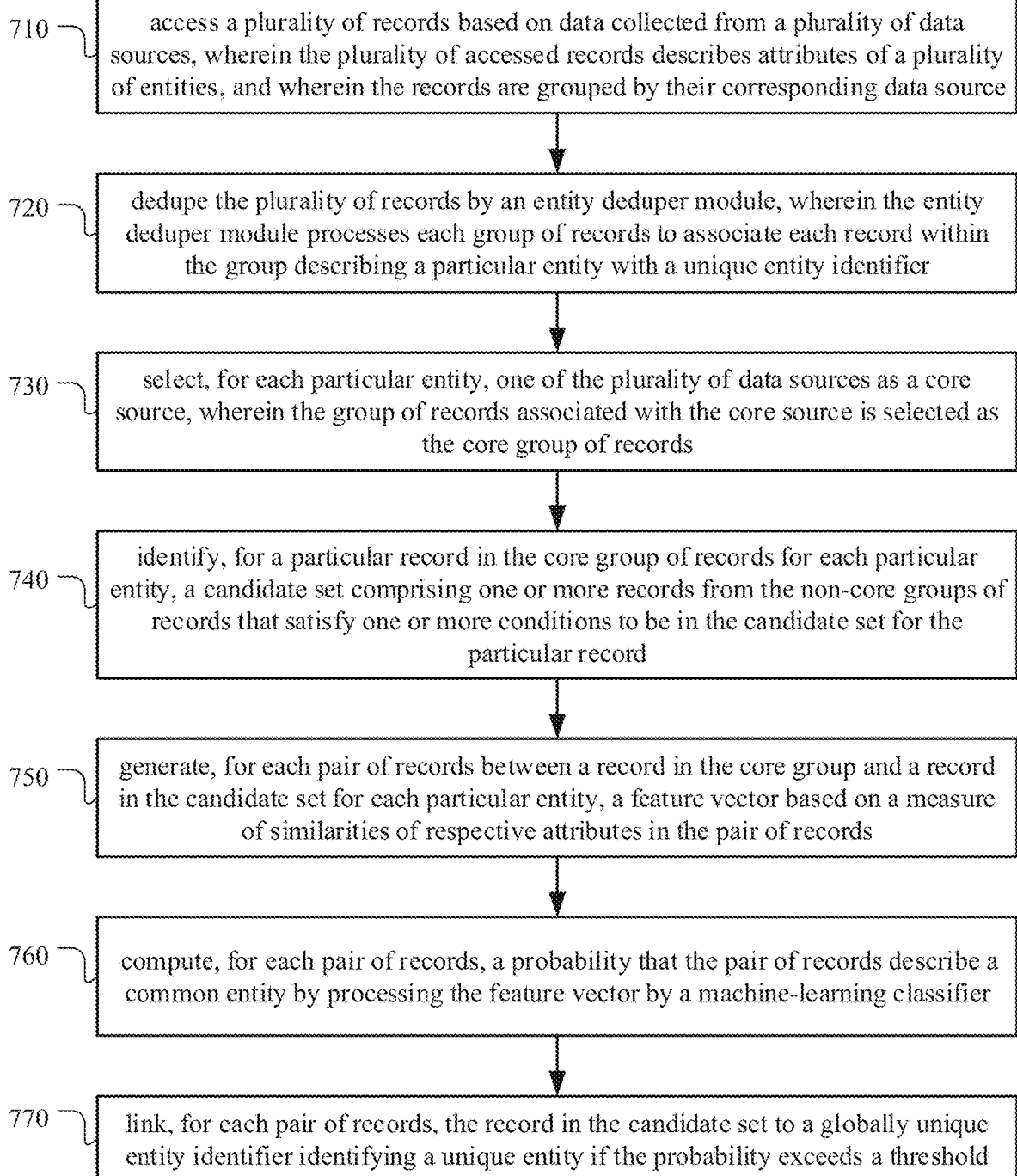
FIG. 7 illustrates an example method for resolving entities from multiple data sources.

FIG. 7 illustrates an example method 700 for resolving entities from multiple data sources. The method may begin at step 710, where the assistant system 140 may access a plurality of records based on data collected from a plurality of data sources, wherein the plurality of accessed records describes attributes of a plurality of entities, and wherein the records are grouped by their corresponding data source. At step 720, the assistant system 140 may dedupe the plurality of records by an entity-deduping module, wherein the entity-deduping module processes each group of records to associate each record within the group describing a particular entity with a unique entity identifier. At step 730, the assistant system 140 may select, for each particular entity, one of the plurality of data sources as a core source, wherein the group of records associated with the core source is selected as the core group of records. At step 740, the assistant system 140 may identify, for a particular record in the core group of records for each particular entity, a candidate set comprising one or more records from the non-core groups of records that satisfy one or more conditions to be in the candidate set for the particular record. At step 750, the assistant system 140 may generate, for each pair of records between a record in the core group and a record in the candidate set for each particular entity, a feature vector based on a measure of similarities of respective attributes in the pair of records. At step 760, the assistant system 140 may compute, for each pair of records, a probability that the pair of records describe a common entity by processing the feature vector by a machine-learning classifier. At step 770, the assistant system 140 may link, for each pair of records, the record in the candidate set to a globally unique entity identifier identifying a unique entity if the probability exceeds a threshold. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for resolving entities from multiple data sources including the particular steps of the method of FIG. 7, this disclosure contemplates any suitable method for resolving entities from multiple data sources including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Using Entity Properties from Multiple Data Sources

In particular embodiments, the assistant system 140 may fuse attributes of an entity when diverse values for attributes associated with the entity are collected from a plurality of sources. An attribute-fusion module 430 of the assistant system 140 may combine resolved entity records, which may include duplicates if not removed previously, to consistent representations by fusing their attribute values. The attribute-fusion module 430 may filter out and conflate the attribute values by utilizing factorization machines that run based on high-level rules. The attribute-fusion module 430 and a semantic-analysis module 440 (which may be a sub-process of the attribute-fusion module) may compute a confidence probability and a semantic weight for each entity attribute value. The attribute-fusion module 430 may produce a single record for an entity by combining values for given attributes. The attribute-fusion module 430 may take one or more records associated with a particular entity as input. The one or more records may have a common globally unique entity identifier assigned to the particular entity. Each record may have diverse values for an attribute of the particular entity. For each attribute of the particular entity, the attribute-fusion module 430 may identify a list of values that appear in the records associated with the entity. The attribute-fusion module 430 may then, for each value in the list, compute a confidence probability that may represent a probability that the value is accurate for the given attribute of the particular entity. The attribute-fusion module 430 may utilize factorization machines to compute the confidence probabilities. The attribute-fusion module 430 may filter out a value from the list if the corresponding confidence probability is less than a threshold probability. The semantic-analysis module 440, a sub-process of the attribute-fusion module 430, may compute a semantic weight for each value in the list. A semantic weight for an attribute value may represent how the attribute value is semantically appropriate for the particular entity considering all the available information related with the particular entity. The semantic weights may also be computed by factorization machines. The semantic-analysis module 440 may sort the attribute values in the order of corresponding semantic weights. The attribute-fusion module 430 may then produce a record for an entity (a so-called fused entity record). Each attribute of the entity in the fused entity record may comprise one or more values whose confidence probabilities may be higher than the threshold probability and whose order may be sorted based on corresponding semantic weights. The factorization machines used to compute confidence probabilities and semantic weights may be trained with a large number of entities. As the attribute-fusion module 430 gets feedback on a particular attribute value for an entity from the users, the attribute-fusion module 430 may label the particular attribute value for the entity based on the feedback and train the factorization machines with the labelled data. The accuracy of the estimated confidence probabilities and the estimated semantic weights may increase as the labeled data increases. Although this disclosure describes fusing a plurality of records corresponding to a common entity in a particular manner, this disclosure contemplates fusing the plurality of records corresponding to the common entity in the plurality of records in any suitable manner.

Figure 8:
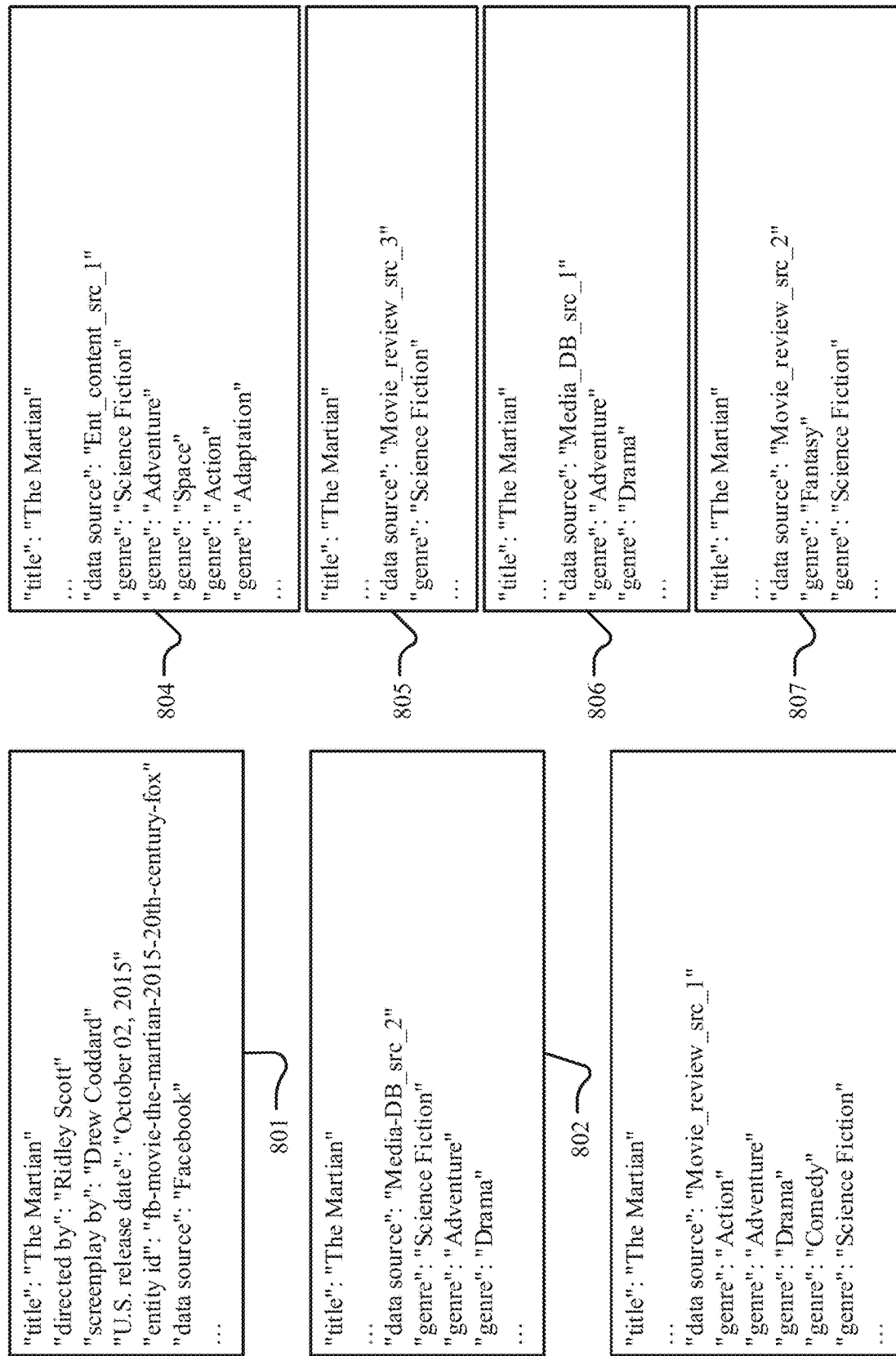
FIG. 8 illustrates an example access to a plurality of records associated with a particular entity.

In particular embodiments, the attribute-fusion module 430 of the assistant system 140 may access a plurality of records associated with a particular entity. The plurality of records may be generated based on information associated with the particular entity presenting on data collected from a plurality of data sources. Each of the plurality of records may comprise an identifier identifying a corresponding data source. The entity-deduping module 410 and the entity resolving module 420 may have determined that each of the plurality of records describes the particular entity. The entity resolving module 420 may have linked each of the plurality of records to a globally unique entity identifier that identifies the particular entity. Each record of the plurality of records may describe one or more attributes of the particular entity. Each record of the plurality of records may comprise one or more attribute-value pairs. An attribute-value pair may comprise an attribute name and an attribute value. The particular entity may be classified into one of a plurality of domains. The domain is associated with a pre-determined list of required attributes corresponding to the domain. FIG. 8 illustrates an example access to a plurality of records associated with a particular entity. As an example and not by way of limitation, illustrated in FIG. 8, the attribute-fusion module 430 of the assistant system 140 may access a plurality of records corresponding to a movie "The Martian," that was released in 2015. The record 801 was generated based on data from social networks. Since the entity resolving module 420 chose "social network" as the core data source, the records corresponding to the movie "The Martian" from the other data sources may be linked to the entity identifier unique within the social network. Because the records correspond to an entity of "Movie" domain, each record may comprise a subset of the list of pre-determined required attributes for a "Movie" entity. Each record may not have all the attributes in the list of pre-determined required attributes for the entity domain "Movie." Each record may have diverse values for an attribute of the "The Martian" entity. A record may have multiple values for a particular attribute. The record 802 was generated based on data from a second media database. The record 802 comprises three values for "genre" attribute: "Science Fiction," "Adventure," and "Drama." The record 803 was generated based on data from a first movie review source. The record 803 comprises five values for "genre" attribute: "Action," "Adventure," "Drama," "Comedy," and "Science Fiction." The record 804 was generated based on data from an entertainment content source. The record 804 comprises five values for "genre" attribute: "Science Fiction," "Adventure," "Space," "Action," and "Adaptation." The record 805 was generated based on data from a third movie review source. The record 805 comprises one value for "genre" attribute: "Science Fiction." The record 806 was generated based on data from a first media database. The record 806 comprises two values for "genre" attribute: "Adventure," and "Drama." The record 807 was generated based on data from the second movie review source. The record 807 comprises two values for "genre" attribute: "Fantasy," and "Science Fiction." Though FIG. 8 illustrates only eight records generated based on data from eight data sources, the attribute-fusion module 430 may access more records corresponding to the movie. Though FIG. 8 shows only a few attributes in each record, the record may comprise much more attributes. Although this disclosure describes accessing a plurality of records corresponding to a particular entity generated based on data from a plurality of data sources in a particular manner, this disclosure contemplates accessing a plurality of records corresponding to a particular entity generated based on data from a plurality of data sources in any suitable manner.

In particular embodiments, the attribute-fusion module 430 may identify a list of values that appear in the records associated with the entity for each attribute of the entity. As an example and not by way of limitation, continuing with the prior example illustrated in FIG. 8, the attribute-fusion module 430 may identify eight values for the "genre" attribute: "Science Fiction," "Adventure," "Drama," "Action," "Comedy," "Space," "Adaptation," and "Fantasy" that appear in the accessed records corresponding to the entity for a movie "The Martian." Although this disclosure describes identifying a list of values appearing in the records corresponding to an entity for a particular attribute of the entity in a particular manner, this disclosure contemplates identifying the list of values appearing in the records corresponding to the entity for the particular attribute of the entity in any suitable manner.

In particular embodiments, the attribute-fusion module 430 may compute a confidence probability for each attribute value in the list for each attribute for the particular entity. To compute the confidence probability, the attribute-fusion module 430 may process information from the plurality of records corresponding to the particular entity with a first machine learning model. The first machine learning model may be a factorization machines model. The confidence probability may represent a probability of the attribute value being correct for the particular entity. FIG. 9 illustrates an example table showing computed confidence probabilities and computed semantic weights corresponding to values appearing in the records for an attribute. As an example and not by way of limitation, illustrated in FIG. 9, the attribute-fusion module 430 may compute confidence probability for each of the identified values for "genre" attribute of a movie "The Martian." To compute the confidence probability of a particular value, the attribute-fusion module 430 may provide information from the plurality of records describing "The Martian" movie and the particular value to a factorization machines model as input. The factorization machines model may be trained to compute a confidence probability for a value to be a correct "genre" attribute of a movie entity based on the other available information associated with the movie entity. As illustrated in FIG. 9, the factorization machines model produces the following confidence probabilities: A probability that "Space" is a correct genre for the movie "The Martian" is 0.572. A probability that "Science Fiction" is a correct genre for the movie "The Martian" is 0.901. A probability that "Adaptation" is a correct genre for the movie "The Martian" is 0.965. A probability that "Adventure" is a correct genre for the movie "The Martian" is 0.911. A probability that "Drama" is a correct genre for the movie "The Martian" is 0.928. A probability that "Fantasy" is a correct genre for the movie "The Martian" is 0.024. A probability that "Comedy" is a correct genre for the movie "The Martian" is 0.005. A probability that "Action" is a correct genre for the movie "The Martian" is 0.071. In particular embodiments, the attribute-fusion module 430 may remove each attribute-value pair from each of the plurality of records if a computed confidence probability for the corresponding attribute value is less than a threshold probability. In particular embodiments, the attribute-fusion module 430 may remove an attribute value from the list of identified attribute values for a particular attribute of a particular entity if a confidence probability for the attribute value is less than the threshold probability. As an example and not by way of limitation, continuing with a prior example illustrated in FIG. 9, the attribute-fusion module 430 may remove "Fantasy," "Comedy," and "Action" from the list of identified attribute values for "genre" attribute of the movie "The Martian" because their respective confidence probabilities are less than a pre-determined threshold probability. Although this disclosure describes removing an attribute value from the plurality of records if a computed confidence probability for the corresponding attribute value is less than a threshold probability in a particular manner, this disclosure contemplates removing an attribute value from the plurality of records if a computed confidence probability for the corresponding attribute value is less than a threshold probability in any suitable manner.

In particular embodiments, the semantic-analysis module 440 of the assistant system 140 may compute a semantic weight for each attribute-value pair in each of the plurality of records by processing the plurality of records with a second machine learning model. In particular embodiments, the second machine learning model may be the first machine learning model. The semantic-analysis module 440 may be a sub-process of the attribute-fusion module 430. In particular embodiments, the semantic-analysis module 440 may compute a semantic weight for each attribute value in the list of identified attribute values for each attribute of an entity by processing information associated with the entity. The information associated with the entity may be collected from the plurality of records. The second machine learning model may be a factorization machines model. The semantic-analysis module 440 may provide the information associated with the entity collected from the plurality of records and the attribute value from the list of identified attribute values to the factorization machines model as input. The factorization machines model may be trained to compute a semantic weight for a value of a particular attribute of a particular domain entity based on the provided information associated with the entity. Thus, the semantic-analysis module 440 may utilize different factorization machines model for each attribute of each entity domain. The factorization machines model may produce a semantic weight for the input attribute value, where the semantic weight may represent a degree of semantic relatedness of the attribute value to the entity described by the plurality of records. As an example and not by way of limitation, continuing with a prior example illustrated in FIG. 9, the semantic-analysis module 440 may compute a semantic weight for each values in the list of identified attribute values for "genre" attribute of the movie "The Martian." The semantic-analysis module 440 may provide information associated with the movie "The Martian" collected from the plurality of records and each value to a factorization machines model as input. The factorization machines model may be trained to compute a semantic weight for a "genre" value of a movie entity based on provided input associated with the movie entity. The factorization machines model may produce semantic weights for the identified values for "genre" attribute of the movie "The Martian." The factorization machines model may produce 0.682 as the semantic weight for "Space" for "genre" attribute of the movie "The Martian." The factorization machines model may produce 0.633 as the semantic weight for "Science Fiction" for "genre" attribute of the movie "The Martian." The factorization machines model may produce 0.572 as the semantic weight for "Adaptation" for "genre" attribute of the movie "The Martian." The factorization machines model may produce 0.449 as the semantic weight for "Adventure" for "genre" attribute of the movie "The Martian." The factorization machines model may produce 0.249 as the semantic weight for "Drama" for "genre" attribute of the movie "The Martian." Because the attribute-fusion module 430 removed "Fantasy," "Comedy," and "Action" from the list based on their corresponding computed confidence probabilities, the semantic-analysis module 440 may not compute semantic weights for them. In particular embodiments, the semantic-analysis module 440 may sort the values in the list of the identified attribute values for a particular attribute based on their corresponding semantic weights such that a value with a higher semantic weight appears before a value with a lower semantic weight in the list. As an example and not by way of limitation, continuing with a prior example illustrated in FIG. 9, the semantic-analysis module 440 may sort the values in the list of identified attribute values for "genre" attribute of the movie "The Martian" based on their corresponding semantic weights. The semantic-analysis module 440 may put "Space" at the top of the list as the corresponding semantic weight 0.682 is the highest among the computed semantic weights for the values in the list though the confidence probability for "Space" is the lowest probability among the computed confidence probabilities that are higher than the threshold probability. The fact that "Space" is associated with the highest semantic weight may indicate that "Space" is most semantically related with the movie "The Martian" among the values in the list of identified attribute values for "genre" attribute. Although this disclosure describes sorting attribute values for a particular attribute of a particular entity based on their corresponding computed semantic weights in a particular manner, this disclosure contemplates sorting attribute values for a particular attribute of a particular entity based on their corresponding computed semantic weights in any suitable manner.

In particular embodiments, the attribute-fusion module 430 of the assistant system 140 may construct a compiled record for the particular entity based on the plurality of records associated with the particular entity. The compiled record may also be called as the fused entity record. The fused entity record may comprise an identifier identifying the particular entity. The attribute-fusion module 430 may combine the non-removed attribute-value pairs from the plurality of records. A plurality of attribute-value pairs with a common attribute name may be sorted based on their respective semantic weights. Among the plurality of attribute-value pairs with the common attribute name, an attribute-value pair with a higher semantic weight may appear before an attribute-value pair with a lower semantic weight in the fused entity record for the particular entity. In particular embodiments, the attribute-fusion module 430 may construct a fused entity record for the particular entity based on the list of identified attribute values for each attribute of the particular entity. The attribute-fusion module 430 may add an attribute-value pair to the fused entity record for each of the non-removed attribute values in the list of identified attribute value for a particular attribute. Because the attribute-fusion module 430 may have removed values with confidence probabilities lower than the threshold probability, the fused entity record may comprise attribute-value pairs for values with confidence scores higher than the threshold probability. Because the list of identified attribute values for a particular attribute may have been sorted based on their respective semantic weights, a plurality of attribute-value pairs with a common attribute name in the fused entity record may be sorted based on their respective semantic weights. Among the plurality of attribute-value pairs with the common attribute name, an attribute value associated with a higher semantic weight may describe the nature of the unique entity better than an attribute value associated with a lower semantic weight. The fused entity record may comprise an identifier identifying the particular entity. FIG. 10 illustrates an example fused entity record. As an example and not by way of limitation, continuing with a prior example, the attribute-fusion module 430 may construct a fused entity record 1001 for the movie "The Martian" based on the list of identified attribute values for each attribute of the movie. The fused entity record 1001 may comprise a unique entity identifier 1010 for the movie "The Martian." Because the fused entity record 1001 may be a fused record based on information from a plurality of data sources, the fused entity record 1001 may not have a data source identifier identifying the data source. In the previous example, the attribute-fusion module 430 has removed "Fantasy," "Comedy," and "Action" from the list of identified attribute values for "genre" attribute based on their respective confidence probabilities. Also, the semantic-analysis module 440 has sorted "Space," "Science Fiction," "Adaptation," "Adventure," and "Drama" in such order based on their respective semantic weights. The fused entity record 1001 constructed by the attribute-fusion module 430 may not have attribute-value pairs for "Fantasy," "Comedy," and "Action" because they have been removed from the list. The fused entity record 1001 may have attribute-value pairs for "Space" 1020A, "Science Fiction" 1020B, "Adaptation" 1020C, "Adventure" 1020D and "Drama" 1020E for "genre" attribute in the order. Although this disclosure describes constructing a fused entity record in a particular manner, this disclosure contemplates constructing a fused entity record in any suitable manner.

In particular embodiments, the attribute-fusion module 430 of the assistant system 140 may receive feedback regarding one or more of the non-removed attribute-value pairs on the fused entity record for the particular entity. The attribute-fusion module 430 may create labelled training data based on the received feedback. The attribute-fusion module 430 may train the first machine learning model and the second machine learning model with the labelled training data. The first machine learning model and the second machine learning model may be factorization machines models. As the number of labelled training data increases, the accuracy of the estimated confidence probabilities and the estimated semantic weights may improve. As an example and not by way of limitation, continuing with a prior example, the attribute-fusion module 430 may receive a feedback indicating that "Space," and "Adventure" are most suitable values for the genre of the movie "The Martian." The feedback also indicates that "Space" describes the movie "The Martian" best. The attribute-fusion module 430 may construct labelled training data based on received feedback and train the factorization machines models for computing confidence probabilities and for computing semantic weights for attribute of movie entities. Although this disclosure describes training machine learning models with labelled training data generated based on feedback in a particular manner, this disclosure contemplates training machine learning models with labelled training data generated based on feedback in any suitable manner.

Figure 11:
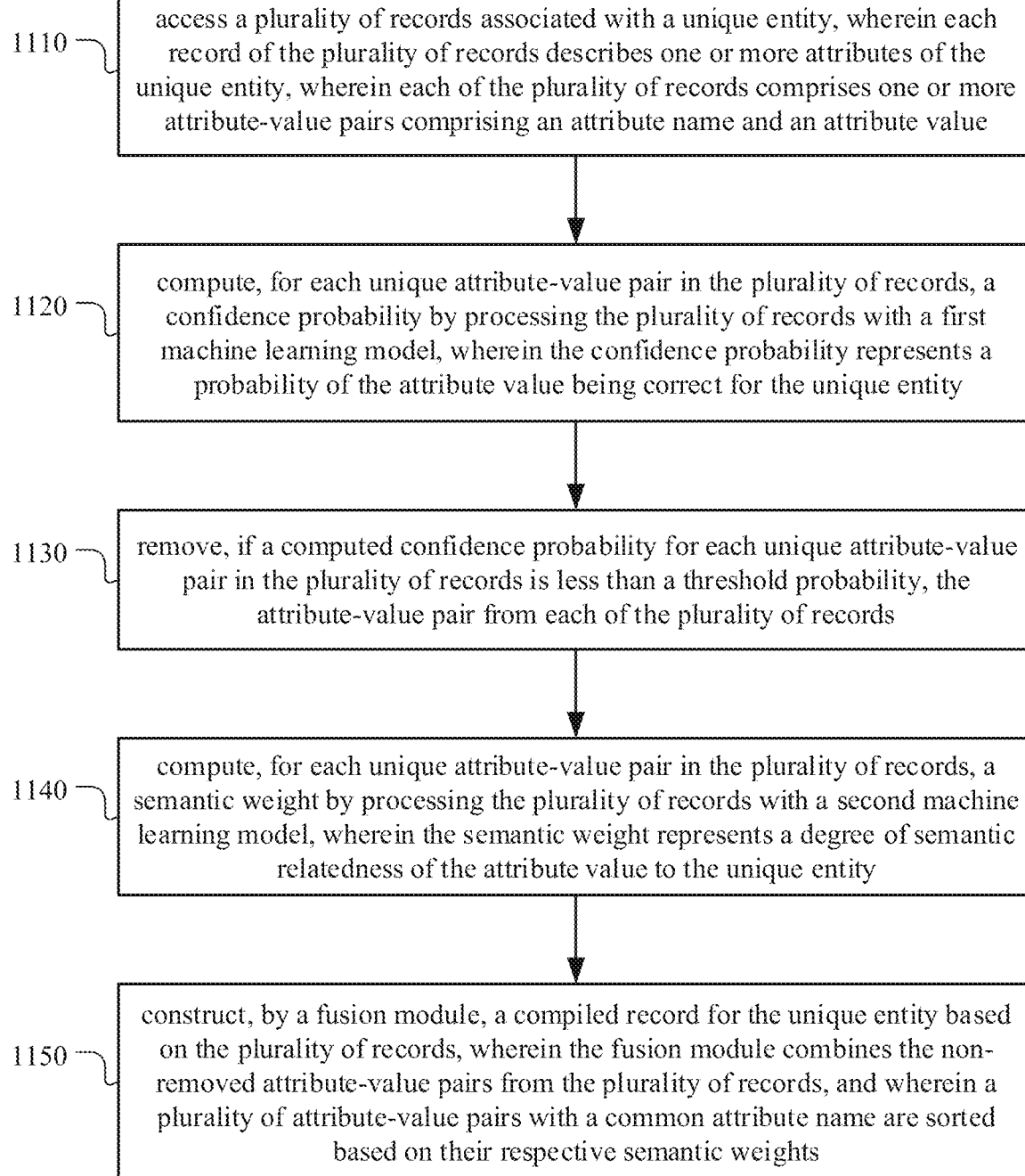
FIG. 11 illustrates an example method for fusing a plurality of records corresponding to an entity to construct a fused entity record.

FIG. 11 illustrates an example method 1100 for fusing a plurality of records corresponding to an entity to construct a fused entity record. The method may begin at step 1110, where the assistant system 140 may access a plurality of records associated with a unique entity, wherein each record of the plurality of records describes one or more attributes of the unique entity, wherein each of the plurality of records comprises one or more attribute-value pairs comprising an attribute name and an attribute value. At step 1120, the assistant system 140 may compute, for each unique attribute-value pair in the plurality of records, a confidence probability by processing the plurality of records with a first machine learning model, wherein the confidence probability represents a probability of the attribute value being correct for the unique entity. At step 1130, the assistant system 140 may remove, if a computed confidence probability for each unique attribute-value pair in the plurality of records is less than a threshold probability, the attribute-value pair from each of the plurality of records. At step 1140, the assistant system 140 may compute, for each unique attribute-value pair in the plurality of records, a semantic weight by processing the plurality of records with a second machine learning model, wherein the semantic weight represents a degree of semantic relatedness of the attribute value to the unique entity. At step 1150, the assistant system 140 may construct, by a fusion module, a compiled record for the unique entity based on the plurality of records, wherein the fusion module combines the non-removed attribute-value pairs from the plurality of records, and wherein a plurality of attribute-value pairs with a common attribute name are sorted based on their respective semantic weights. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for fusing a plurality of records corresponding to an entity to construct a fused entity record including the particular steps of the method of FIG. 11, this disclosure contemplates any suitable method for fusing a plurality of records corresponding to an entity to construct a fused entity record including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Classifying and Tagging Entities by Synthetic Attributes

In particular embodiments, an attribute-classification module 450 of the assistant system 140 may determine a set of attribute values associated with an entity where the attribute values are not directly collectable from data sources. The attribute-fusion module 450 may produce a single record for an entity, a so-called fused entity record 1001, by combining attribute values collected from a plurality of sources. The entity may be classified into one of a plurality of domains. The domain is associated with a pre-determined list of required attributes corresponding to the domain. The produced fused entity record 1001 may not include all the required attributes in the list. An attribute may be one-hot encoded when a value of the attribute may be one of a pre-determined set of plurality of candidates. At least a part of the attributes to be classified may be one-hot encoded. When an attribute-classification module 450 accesses a fused entity record 1001 for an entity, the attribute-classification module 450 may identify a domain of the entity. The domain of the entity may be mapped to the pre-determined list of required attributes for the entity. The attribute-classification module 450 may identify attributes to be classified by determining whether the fused entity record contains each attribute in the list of required attributes. For each attribute to be classified, the attribute-classification module 450 may determine a value using a corresponding attribute classifier from a plurality of attribute classifiers. The attribute classifier may determine the value of an attribute to be classified by generating and using a numeric feature vector associated with the fused entity based on the available information associated with the entity. The information, which may include the existing attribute-value pairs of the entity, may be transformed to the feature vector by one-hot or hash encoding. The attribute classifiers may be trained with labelled training data. The training data may be labelled by a machine-learning module or manually (e.g., based on crowdsourced data). Although this disclosure describes determining values of attributes to be classified for an entity in a particular manner, this disclosure contemplates determining values of attributes to be classified for an entity in any suitable manner.

In particular embodiments, the attribute-classification module 450 may access a fused entity record 1001 for a particular entity. The attribute-fusion module 430 may construct the fused entity record 1001 by compiling a plurality of records describing one or more attributes of the particular entity. Each of the plurality of records may have been generated based on data collected from a plurality of data sources. The fused entity record 1001 may be associated with an identifier 1010 identifying the particular entity. The fused entity record 1001 may comprise one or more attribute-value pairs, where each attribute-value pair may describe an attribute of the particular entity. An attribute-value pair may comprise an attribute name and an attribute value. As an example and not by way of limitation, continuing with a prior example illustrated in FIG. 10, the attribute-classification module 450 may access a fused entity record 1001 for the movie "The Martian." The fused entity record 1001 may have been constructed by the attribute-fusion module 430. The fused entity record 1001 may comprise an attribute-value pair for an entity identifier 1010. Although this disclosure describes accessing a fused entity record in a particular manner, this disclosure contemplates accessing a fused entity record in any suitable manner.

In particular embodiments, the attribute-classification module 450 may determine a domain of the particular entity. The domain may be associated with a pre-determined list of required attributes corresponding to the domain. In particular embodiments, the fused entity record 1001 corresponding to the particular entity may not include all the required attributes in the pre-determined list. The attribute-classification module 450 may identify one or more attributes to be classified from the list of required attributes within the accessed fused entity record 1001. As an example and not by way of limitation, continuing with a prior example illustrated in FIG. 10, the attribute-classification module 450 may determine that the entity "The Martian" is a movie entity. The attribute-classification module 450 may identify a list of required attributes for a movie domain. Then, the attribute-classification module 450 may identify a set of attributes to be classified from the fused entity record 1001 by checking whether the fused entity record 1001 contains at least one attribute-value pair for each attribute in the list of required attributes for a movie entity. The attribute-classification module 450 may identify that "awards," "drug_content," "educational_content," "kid_friendly," and "violence" attribute are missing from the fused entity record 1001 corresponding to the movie "The Martian." Although this disclosure describes identifying one or more attributes to be classified from a fused entity record in a particular manner, this disclosure contemplates identifying one or more attributes to be classified from a fused entity record in any suitable manner.

In particular embodiments, the attribute-classification module 450 may determine, for each attribute to be classified, whether the attribute to be classified can be one-hot encoded to a one-hot vector. Each one-hot vector may correspond to one of the attributes to be classified and comprises a plurality of one-hot elements. Each of the plurality of one-hot elements may represent a candidate value for the corresponding attribute to be classified. Only one one-hot element among the plurality of one-hot elements of a one-hot vector may be set to 'true.' As an example and not by way of limitation, continuing with a prior example, the attribute-classification module 450 may determine that "awards" attribute of the movie "The Martian" cannot be encoded to a one-hot vector. The attribute-classification module 450 may determine that "drug_content," "educational_content," "kid_friendly," and "violence" attributes can be encoded into one-hot vectors because values for those attributes would be either "true" or "false," but not both "true" and "false." Although this disclosure describes determining whether an attribute to be classified can be one-hot encoded in a particular manner, this disclosure contemplates determining whether an attribute to be classified can be one-hot encoded in any suitable manner.

In particular embodiments, the attribute-classification module 450 may determine, for each attribute to be classified, whether the fused entity record 1001 comprises enough information to classify the attribute to be classified. The attribute-classification module 450 may process the fused entity record 1001 with a machine-learning classifier to classify the attribute to be classified. The machine-learning classifier may utilize a part of information available in to fused entity record 1001 to classify the attribute to be classified. The required information for the classification may be dependent to the attribute. If the required information for the machine-learning classifier to classify an attribute to be classified is not available in the fused entity record 1001, the attribute-classification module 450 may not be able to classify the attribute. Thus, the attribute-classification module 450 may skip classifying such attribute. Although this disclosure describes determining whether the fused entity record has enough information to classify an attribute to be classified in a particular manner, this disclosure contemplates determining whether the fused entity record has enough information to classify an attribute to be classified in any suitable manner.

In particular embodiments, the attribute-classification module 450 may compute, for each attribute to be classified that can be one-hot encoded, probabilities for the one-hot elements corresponding to the attribute to be classified by processing the fused entity record 1001 with a machine-learning classifier. The probability corresponding to each one-hot element may represent a probability for the one-hot element to be a correct attribute value for the particular entity. The machine-learning classifier may be a Gradient Boosted Decision Trees (GBDT) classifier. In particular embodiments, the machine-learning classifier may be any other supervised machine learning classifier such as a logistic regression, support vector machine, or neural network classifier. The attribute-classification module 450 may train a plurality of machine-learning classifiers with labelled training data. Each of the plurality of machine-learning classifiers may be trained to compute the probabilities for a particular attribute of a particular domain of entity. The training data may be labelled based on crowdsourced data. After the attribute-classification module 450 computed probability for the one-hot elements corresponding to one of the attributes to be classified, The attribute-classification module 450 may construct an attribute-value pair with a name of the one of the attributes to be classified and the corresponding one-hot element with a highest computed probability. The attribute-classification module 450 may add the constructed attribute-value pair to the fused entity record 1001. As an example and not by way of limitation, continuing with a prior example, the attribute-classification module 450 may compute probabilities for the one-hot elements corresponding to "drug_content" attribute of "The Martian" movie by processing information of the fused entity record 1001 with a GBDT classifier. The one-hot elements corresponding to "drug_content" may comprise "Yes" and "No." The used GBDT classifier may be trained to compute probabilities for "drug_content" attribute for movie entities. The attribute-classification module 450 may also compute probabilities for the one-hot elements corresponding to "educational_content," "kid_friendly," and "violence" attributes by processing information of the fused entity record 1001 with the respective GBDT classifiers. Each of those GBDT classifiers may be trained to compute probabilities for corresponding attribute of movie entities. The attribute-classification module 450 may construct an attribute-value pair for "drug_content" attribute with the one-hot element with the higher probability "No," an attribute-value pair for "educational_content" attribute with the one-hot element with the highest probability "Yes," an attribute-value pair for "kid_friendly" attribute with the one-hot element with the highest probability "Yes," an attribute-value pair for "violence" attribute with the one-hot element with the highest probability "No." The attribute-classification module 450 may add the constructed attribute-value pairs to the fused entity record 1001 to make the fused entity record the updated fused entity record 1201. FIG. 12 illustrates an example fused entity record with the estimated attribute values that are not directly collectable from data sources. The attribute-classification module 450 may add an attribute-value pair for "drug_content" attribute 1210 with the estimated attribute value "No" to the fused entity record 1201. The attribute-classification module 450 may add an attribute-value pair for "educational_content" attribute 1220 with the estimated attribute value "Yes" to the fused entity record 1201. The attribute-classification module 450 may add an attribute-value pair for "kid_friendly" attribute 1230 with the estimated attribute value "Yes" to the fused entity record 1201. The attribute-classification module 450 may add an attribute-value pair for "violence" attribute 1240 with the estimated attribute value "No" to the fused entity record 1201. Although this disclosure describes estimating the attribute values that are not directly collectable from data sources in a particular manner, this disclosure contemplates estimating the attribute values that are not directly collectable from data sources in any suitable manner.

In particular embodiments, the assistant system 140 may forward the fused entity record 1201 to a knowledge-graph-generation module when the attribute classification for attributes to be classified for the particular entity has finished. The knowledge-graph-generation module may utilize the fused entity record 1201 as a collection of information for the particular entity. Although this disclosure describes forwarding the fused entity record to a knowledge-graph-generation module in a particular manner, this disclosure contemplates forwarding the fused entity record to the knowledge-graph-generation module in any suitable manner.

Figure 13:
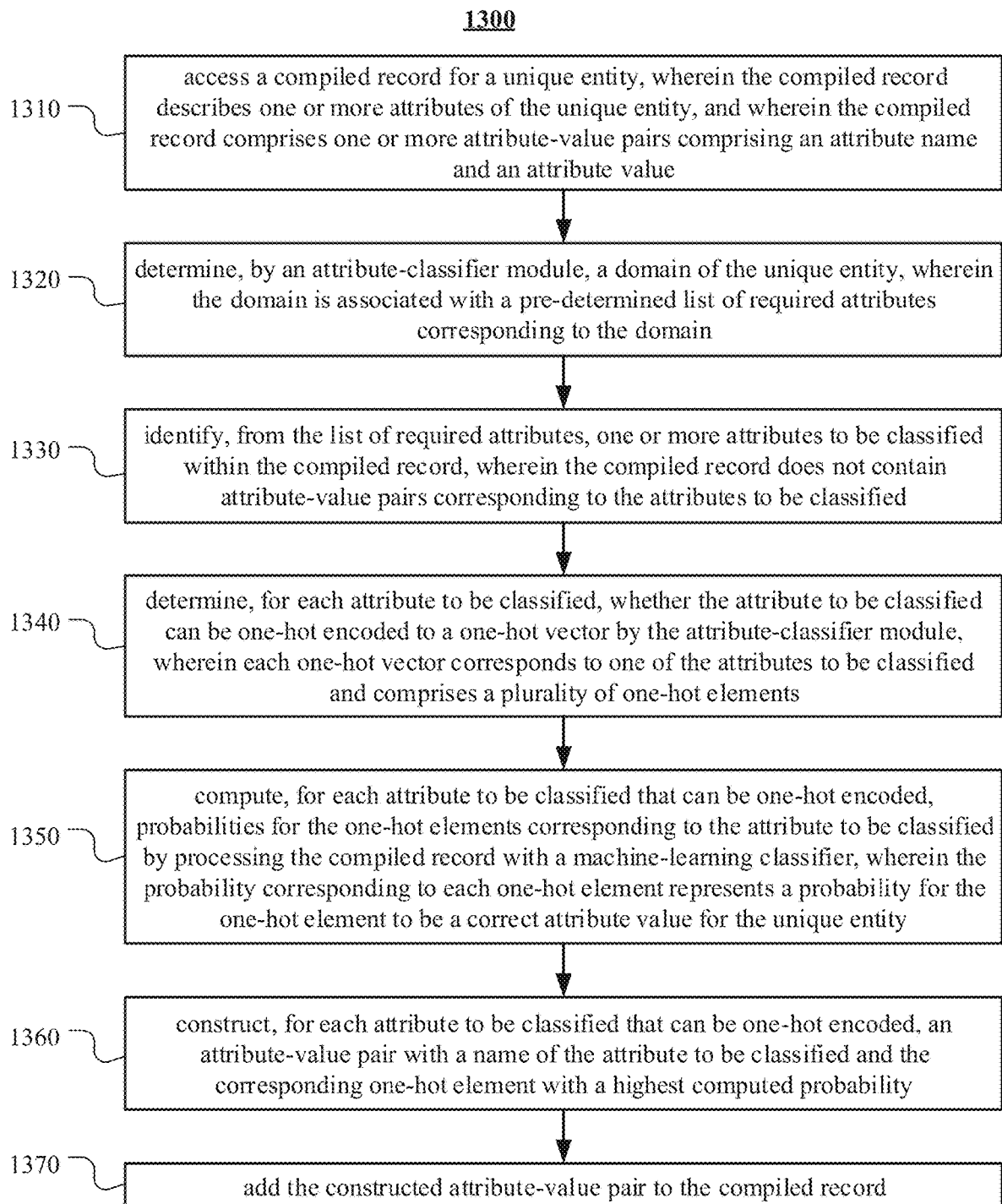
FIG. 13 illustrates an example method for estimating attribute values that are not directly collectable from data sources associated with an entity.

FIG. 13 illustrates an example method 1300 for estimating attribute values that are not directly collectable from data sources associated with an entity. The method may begin at step 1310, where the assistant system 140 may access a compiled record for a unique entity, wherein the compiled record describes one or more attributes of the unique entity, and wherein the compiled record comprises one or more attribute-value pairs comprising an attribute name and an attribute value. At step 1320, the assistant system 140 may determine, by an attribute-classifier module, a domain of the unique entity, wherein the domain is associated with a pre-determined list of required attributes corresponding to the domain. At step 1330, the assistant system 140 may identify, from the list of required attributes, one or more attributes to be classified within the compiled record, wherein the compiled record does not contain attribute-value pairs corresponding to the attributes to be classified. At step 1340, the assistant system 140 may determine, for each attribute to be classified, whether the attribute to be classified can be one-hot encoded to a one-hot vector by the attribute-classifier module, wherein each one-hot vector corresponds to one of the attributes to be classified and comprises a plurality of one-hot elements. At step 1350, the assistant system 140 may compute, for each attribute to be classified that can be one-hot encoded, probabilities for the one-hot elements corresponding to the attribute to be classified by processing the compiled record with a machine-learning classifier, wherein the probability corresponding to each one-hot element represents a probability for the one-hot element to be a correct attribute value for the unique entity. At step 1360, the assistant system 140 may construct, for each attribute to be classified that can be one-hot encoded, an attribute-value pair with a name of the attribute to be classified and the corresponding one-hot element with a highest computed probability. At step 1370, the assistant system 140 may add the constructed attribute-value pair to the compiled record. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for estimating attribute values that are not directly collectable from data sources associated with an entity including the particular steps of the method of FIG. 13, this disclosure contemplates any suitable method for estimating attribute values that are not directly collectable from data sources associated with an entity including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Social Graphs

Figure 14:
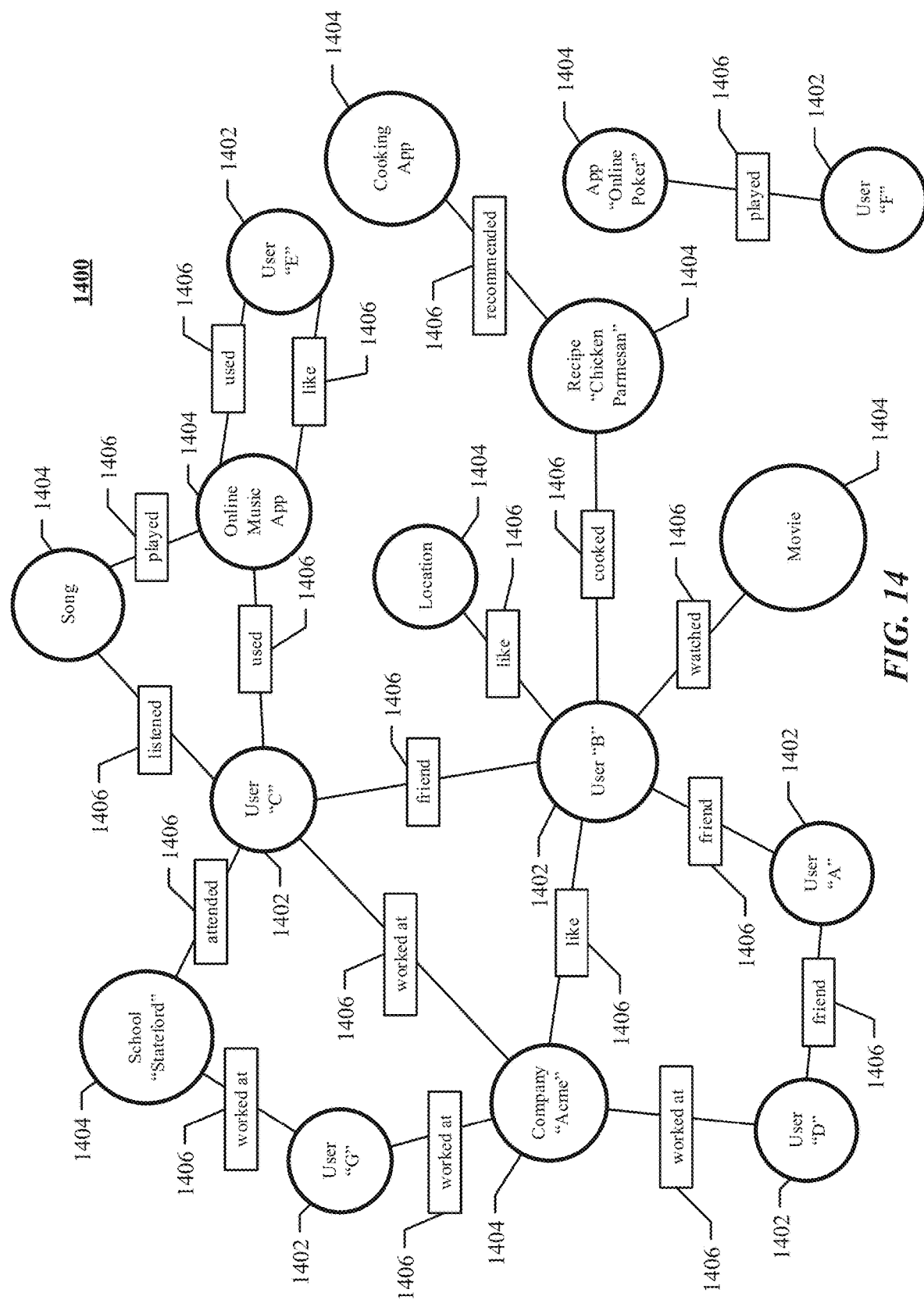
FIG. 14 illustrates an example social graph.

FIG. 14 illustrates an example social graph 1400. In particular embodiments, the social-networking system 160 may store one or more social graphs 1400 in one or more data stores. In particular embodiments, the social graph 1400 may include multiple nodes—which may include multiple user nodes 1402 or multiple concept nodes 1404—and multiple edges 1406 connecting the nodes. Each node may be associated with a unique entity (i.e., user or concept), each of which may have a unique identifier (ID), such as a unique number or username. The example social graph 1400 illustrated in FIG. 14 is shown, for didactic purposes, in a two-dimensional visual map representation. In particular embodiments, a social-networking system 160, a client system 130, an assistant system 1140, or a third-party system 170 may access the social graph 1400 and related social-graph information for suitable applications. The nodes and edges of the social graph 1400 may be stored as data objects, for example, in a data store (such as a social-graph database). Such a data store may include one or more searchable or queryable indexes of nodes or edges of the social graph 1400.

In particular embodiments, a user node 1402 may correspond to a user of the social-networking system 160 or the assistant system 1140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 1140. In particular embodiments, when a user registers for an account with the social-networking system 160, the social-networking system 160 may create a user node 1402 corresponding to the user, and store the user node 1402 in one or more data stores. Users and user nodes 1402 described herein may, where appropriate, refer to registered users and user nodes 1402 associated with registered users. In addition or as an alternative, users and user nodes 1402 described herein may, where appropriate, refer to users that have not registered with the social-networking system 160. In particular embodiments, a user node 1402 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 1402 may be associated with one or more data objects corresponding to information associated with a user. In particular embodiments, a user node 1402 may correspond to one or more web interfaces.

In particular embodiments, a concept node 1404 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1404 may be associated with information of a concept provided by a user or information gathered by various systems, including the social-networking system 160 and the assistant system 1140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1404 may be associated with one or more data objects corresponding to information associated with concept node 1404. In particular embodiments, a concept node 1404 may correspond to one or more web interfaces.

In particular embodiments, a node in the social graph 1400 may represent or be represented by a web interface (which may be referred to as a "profile interface"). Profile interfaces may be hosted by or accessible to the social-networking system 160 or the assistant system 1140. Profile interfaces may also be hosted on third-party websites associated with a third-party system 170. As an example and not by way of limitation, a profile interface corresponding to a particular external web interface may be the particular external web interface and the profile interface may correspond to a particular concept node 1404. Profile interfaces may be viewable by all or a selected subset of other users. As an example and not by way of limitation, a user node 1402 may have a corresponding user-profile interface in which the corresponding user may add content, make declarations, or otherwise express himself or herself. As another example and not by way of limitation, a concept node 1404 may have a corresponding concept-profile interface in which one or more users may add content, make declarations, or express themselves, particularly in relation to the concept corresponding to concept node 1404.

In particular embodiments, a concept node 1404 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 1402 corresponding to the user and a concept node 1404 corresponding to the third-party web interface or resource and store edge 1406 in one or more data stores.

In particular embodiments, a pair of nodes in the social graph 1400 may be connected to each other by one or more edges 1406. An edge 1406 connecting a pair of nodes may represent a relationship between the pair of nodes. In particular embodiments, an edge 1406 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 1406 connecting the first user's user node 1402 to the second user's user node 1402 in the social graph 1400 and store edge 1406 as social-graph information in one or more of data stores 1614. In the example of FIG. 14, the social graph 1400 includes an edge 1406 indicating a friend relation between user nodes 1402 of user "A" and user "B" and an edge indicating a friend relation between user nodes 1402 of user "C" and user "B." Although this disclosure describes or illustrates particular edges 1406 with particular attributes connecting particular user nodes 1402, this disclosure contemplates any suitable edges 1406 with any suitable attributes connecting user nodes 1402. As an example and not by way of limitation, an edge 1406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1400 by one or more edges 1406.

In particular embodiments, an edge 1406 between a user node 1402 and a concept node 1404 may represent a particular action or activity performed by a user associated with user node 1402 toward a concept associated with a concept node 1404. As an example and not by way of limitation, as illustrated in FIG. 14, a user may "like," "attended," "played," "listened," "cooked," "worked at," or "watched" a concept, each of which may correspond to an edge type or subtype. A concept-profile interface corresponding to a concept node 1404 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, the social-networking system 160 may create a "listened" edge 1406 and a "used" edge (as illustrated in FIG. 14) between user nodes 1402 corresponding to the user and concept nodes 1404 corresponding to the song and application to indicate that the user listened to the song and used the application. Moreover, the social-networking system 160 may create a "played" edge 1406 (as illustrated in FIG. 14) between concept nodes 1404 corresponding to the song and the application to indicate that the particular song was played by the particular application. In this case, "played" edge 1406 corresponds to an action performed by an external application (an online music application) on an external audio file (the song "Imagine"). Although this disclosure describes particular edges 1406 with particular attributes connecting user nodes 1402 and concept nodes 1404, this disclosure contemplates any suitable edges 1406 with any suitable attributes connecting user nodes 1402 and concept nodes 1404. Moreover, although this disclosure describes edges between a user node 1402 and a concept node 1404 representing a single relationship, this disclosure contemplates edges between a user node 1402 and a concept node 1404 representing one or more relationships. As an example and not by way of limitation, an edge 1406 may represent both that a user likes and has used at a particular concept. Alternatively, another edge 1406 may represent each type of relationship (or multiples of a single relationship) between a user node 1402 and a concept node 1404 (as illustrated in FIG. 14 between user node 1402 for user "E" and concept node 1404 for "Online Music App").

In particular embodiments, the social-networking system 160 may create an edge 1406 between a user node 1402 and a concept node 1404 in the social graph 1400. As an example and not by way of limitation, a user viewing a concept-profile interface (such as, for example, by using a web browser or a special-purpose application hosted by the user's client system 130) may indicate that he or she likes the concept represented by the concept node 1404 by clicking or selecting a "Like" icon, which may cause the user's client system 130 to send to the social-networking system 160 a message indicating the user's liking of the concept associated with the concept-profile interface. In response to the message, the social-networking system 160 may create an edge 1406 between user node 1402 associated with the user and concept node 1404, as illustrated by "like" edge 1406 between the user and concept node 1404. In particular embodiments, the social-networking system 160 may store an edge 1406 in one or more data stores. In particular embodiments, an edge 1406 may be automatically formed by the social-networking system 160 in response to a particular user action. As an example and not by way of limitation, if a first user uploads a picture, watches a movie, or listens to a song, an edge 1406 may be formed between user node 1402 corresponding to the first user and concept nodes 1404 corresponding to those concepts. Although this disclosure describes forming particular edges 1406 in particular manners, this disclosure contemplates forming any suitable edges 1406 in any suitable manner.

Vector Spaces and Embeddings

Figure 15:
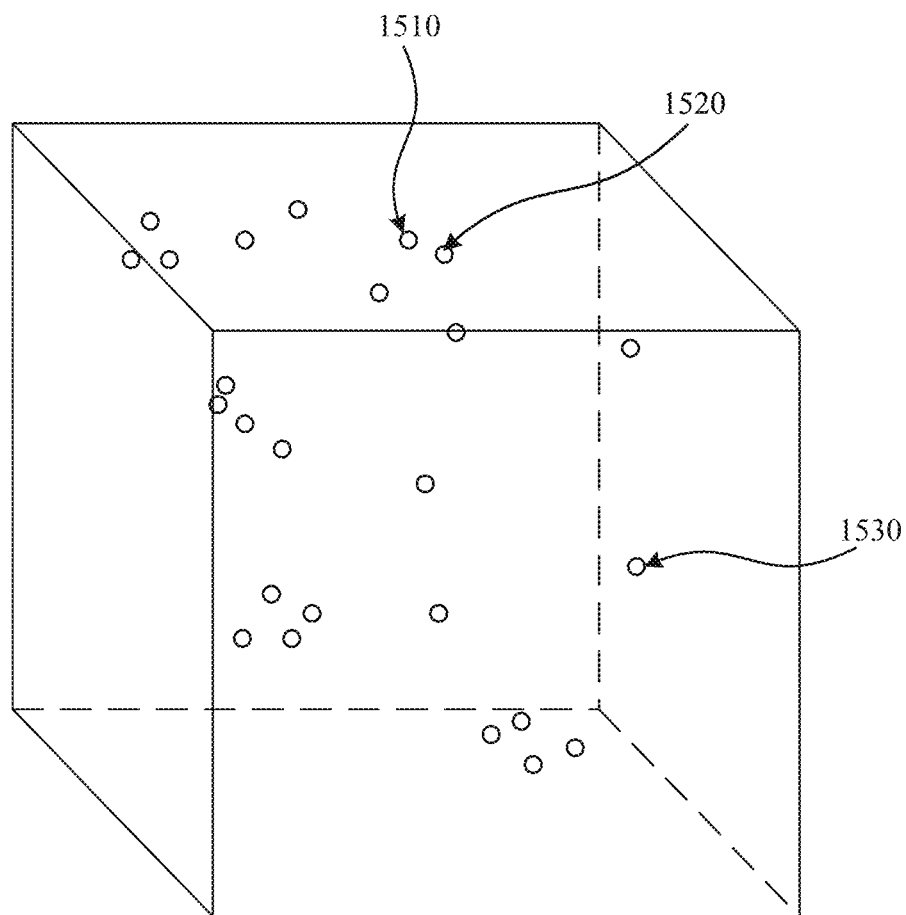
FIG. 15 illustrates an example view of an embedding space.

FIG. 15 illustrates an example view of a vector space 1500. In particular embodiments, an object or an n-gram may be represented in a d-dimensional vector space, where d denotes any suitable number of dimensions. Although the vector space 1500 is illustrated as a three-dimensional space, this is for illustrative purposes only, as the vector space 1500 may be of any suitable dimension. In particular embodiments, an n-gram may be represented in the vector space 1500 as a vector referred to as a term embedding. Each vector may comprise coordinates corresponding to a particular point in the vector space 1500 (i.e., the terminal point of the vector). As an example and not by way of limitation, vectors 1510, 1520, and 15150 may be represented as points in the vector space 1500, as illustrated in FIG. 15. An n-gram may be mapped to a respective vector representation. As an example and not by way of limitation, n-grams $t_1$ and $t_2$ may be mapped to vectors $\vec{v_1}$ and $\vec{v_2}$ in the vector space 1500, respectively, by applying a function $\vec{\pi}$ defined by a dictionary, such that $\vec{v_1} = \vec{\pi}(t_1)$ and $=\vec{v_2}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 1500. In particular embodiments, an n-gram may be mapped to a vector representation in the vector space 1500 by using a machine leaning model (e.g., a neural network). The machine learning model may have been trained using a sequence of training data (e.g., a corpus of objects each comprising n-grams).

In particular embodiments, an object may be represented in the vector space 1500 as a vector referred to as a feature vector or an object embedding. As an example and not by way of limitation, objects $e_1$ and $e_2$ may be mapped to vectors $\vec{v_1}$ and $\vec{v_2}$ in the vector space 1500, respectively, by applying a function $\vec{\pi}$ such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 1500. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 1500. As an example and not by way of limitation, vector 1510 and vector 1520 may correspond to objects that are more similar to one another than the objects corresponding to vector 1510 and vector 15150, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 16:
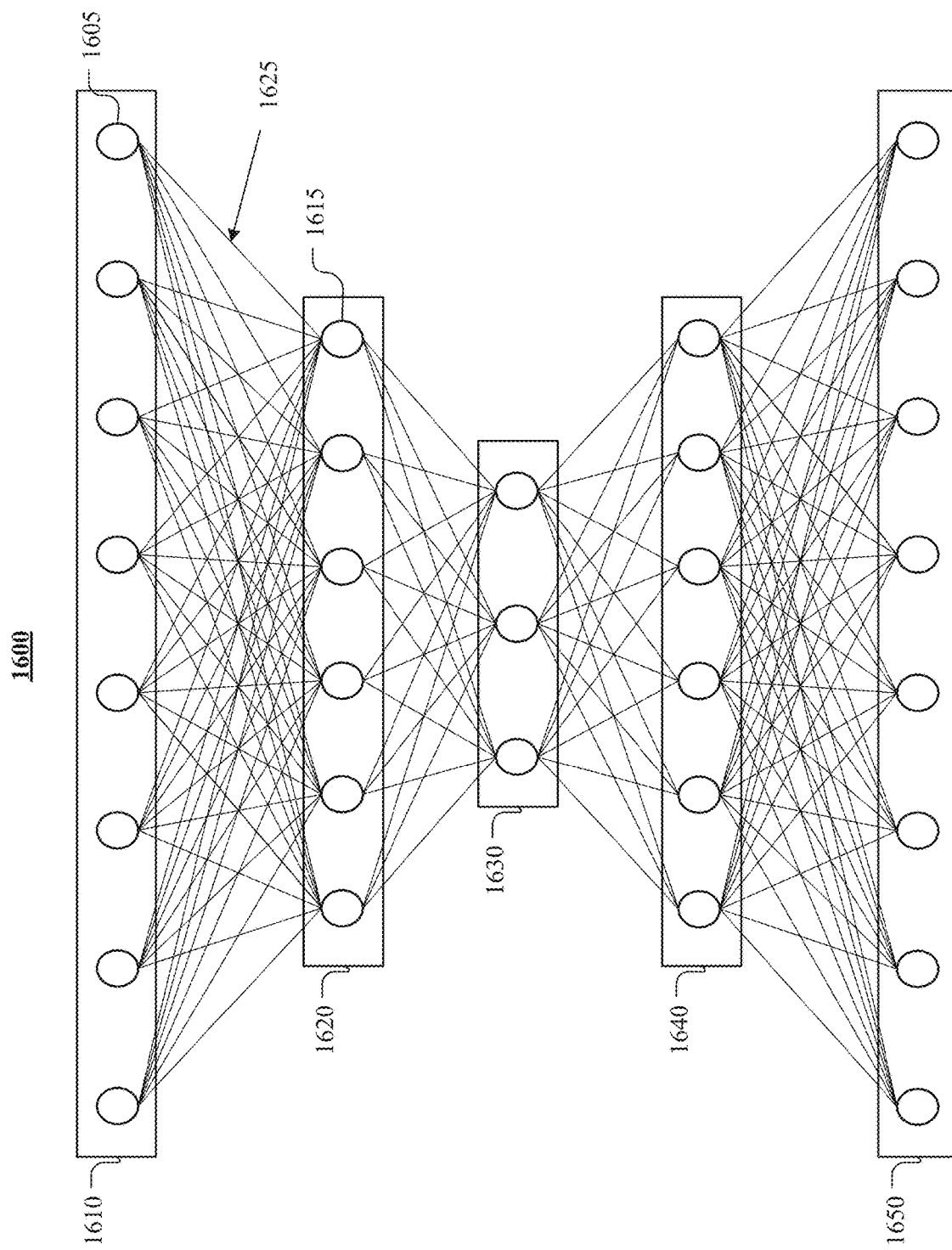
FIG. 16 illustrates an example artificial neural network.

FIG. 16 illustrates an example artificial neural network ("ANN") 1600. In particular embodiments, an ANN may refer to a computational model comprising one or more nodes. Example ANN 1600 may comprise an input layer 1610, hidden layers 1620, 1630, 1640, and an output layer 1650. Each layer of the ANN 1600 may comprise one or more nodes, such as a node 1605 or a node 1615. In particular embodiments, each node of an ANN may be connected to another node of the ANN. As an example and not by way of limitation, each node of the input layer 1610 may be connected to one of more nodes of the hidden layer 1620. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 16 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 16 depicts a connection between each node of the input layer 1610 and each node of the hidden layer 1620, one or more nodes of the input layer 1610 may not be connected to one or more nodes of the hidden layer 1620.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1620 may comprise the output of one or more nodes of the input layer 1610. As another example and not by way of limitation, the input to each node of the output layer 1650 may comprise the output of one or more nodes of the hidden layer 1640. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be $F(x)+x$, where $F(x)$ may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)$=max $(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1625 between the node 1605 and the node 1615 may have a weighting coefficient of 0.4, which may indicate that 0.4 multiplied by the output of the node 1605 is used as an input to the node 1615. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1600 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 1404 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 1400. A privacy setting may be specified for one or more edges 1406 or edge-types of the social graph 1400, or with respect to one or more nodes 1402, 1404 or node-types of the social graph 1400. The privacy settings applied to a particular edge 1406 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 1404 connected to a user node 1402 of the first user by an edge 1406. The first user may specify privacy settings that apply to a particular edge 1406 connecting to the concept node 1404 of the object, or may specify privacy settings that apply to all edges 1406 connecting to the concept node 1404. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

Privacy Settings Based on Location

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

Privacy Settings for User Authentication and Experience Personalization Information In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 170 or used by other processes or applications associated with the social-networking system 160.

Systems and Methods

Figure 17:
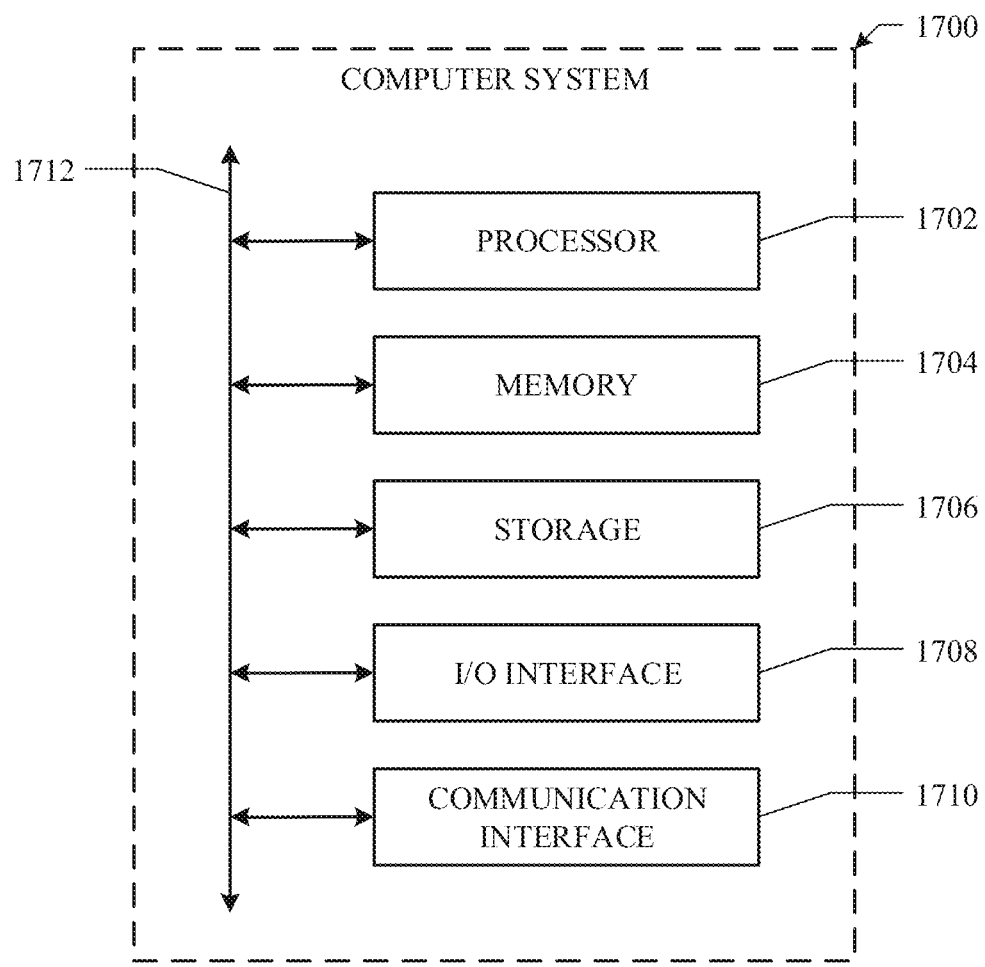
FIG. 17 illustrates an example computer system.

FIG. 17 illustrates an example computer system 1700. In particular embodiments, one or more computer systems 1700 perform one or more steps of one or more methods described or illustrated herein. In particular embodiments, one or more computer systems 1700 provide functionality described or illustrated herein. In particular embodiments, software running on one or more computer systems 1700 performs one or more steps of one or more methods described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1702, memory 1704, storage 1706, an input/output (I/O) interface 1708, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702. Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706; or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere). One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1708 for them. Where appropriate, I/O interface 1708 may include one or more device or software drivers enabling processor 1702 to drive one or more of these I/O devices. I/O interface 1708 may include one or more I/O interfaces 1708, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1710 for it. As an example and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, memory storage cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving, from a client system, a request to access a first record in a plurality of records, wherein the first record describes a first set of attributes of a first entity;
   determining the first record is linked to a globally unique entity identifier;
   identifying one or more second records linked to the unique entity identifier, wherein the one or more second records describe one or more second sets of attributes of the first entity;
   generating a fused record comprising descriptions of attributes of the first entity from the first set and second sets of attributes, wherein the fused record is generated by deduping the plurality of records to associate the first record and the one or more second record with the unique entity identifier and compiling the first set and one or more second sets of attributes; and
   sending, to the client system, responsive to the request to access the first record, instructions for presenting the fused record.

2. The method of claim 1, wherein generating the fused record further comprises:
   computing a semantic weight for each set of attributes of the first entity; and
   sorting each set of attributes in the order of corresponding semantic weights.

3. The method of claim 1, wherein each record of the plurality of records is generated based on information associated with an entity presented around an occurrence of the entity on the collected data from a data source when the occurrence of the entity is detected by a data-analyzing module.

4. The method of claim 3, wherein the data-analyzing module extracts the information associated with the entity by parsing and analyzing text and multimedia data around the occurrence of the entity.

5. The method of claim 1, further comprising:
   computing, for each of the one or more second records, a probability that the respective second record is linked to the unique entity identifier.

6. The method of claim 5, wherein computing the probability that the respective second record is linked to the unique entity identifier further comprises, for each of the one or more second records:
   generating a feature vector based on a measure of similarities of the respective attributes for the first record and the respective second record;
   processing, using a machine-learning classifier, the feature vector.

7. The method of claim 6, wherein the machine-learning classifier is a Gradient Boosted Decision Trees (GBDT) classifier.

8. The method of claim 6, wherein the machine-learning classifier is a logistic regression classifier.

9. The method of claim 6, wherein the machine-learning classifier is trained with labelled training data.

10. The method of claim 9, wherein the training data is labelled based on crowdsourced data.

11. The method of claim 1, wherein the one or more second records are linked to the unique entity identifier when a probability that the one or more second records describes the first entity exceeds a pre-determined threshold.

12. The method of claim 1, wherein a domain of the first entity is associated with a predetermined list of required attributes corresponding to the domain.

13. The method of claim 1, wherein each record of the plurality of records comprises one or more attribute-value pairs comprising an attribute name and an attribute value, wherein each attribute-value pair describes an attribute of the corresponding entity.

14. The method of claim 1, wherein determining the first record is linked to the globally unique entity identifier further comprises:
   computing a semantic weight for each set of attributes of the first entity; and
   sorting each set of attributes in the order of corresponding semantic weights.

15. The method of claim 1, wherein the globally unique entity identifier is the entity identifier unique within a core group of records, wherein for a plurality of data sources one data source is selected as a core source, wherein the group of records associated with the core source is selected as the core group of records.

16. The method of claim 1, wherein computing a probability that a respective second record describes the first entity further comprises, for each of the one or more second records:
   generating a feature vector based on a measure of similarities of the respective attributes for the first record and the respective second record;
   processing, using a machine-learning classifier, the feature vector, wherein for each pair of records, if the probability exceeds a threshold:
   if the first record does not contain more information than the second record:
     assigning, to the second record, the entity identifier assigned to the first record;
     swapping the two records such that the first record becomes the second record and the second record becomes the first record; and
     removing the second record.

17. One or more computer-readable non-transitory storage media embodying software that is operable when executed to:
   receive, from a client system, a request to access a first record in a plurality of records, wherein the first record describes a first set of attributes of a first entity;
   determine the first record is linked to a globally unique entity identifier;
   identify one or more second records linked to the unique entity identifier, wherein the one or more second records describe one or more second sets of attributes of the first entity;
   generate a fused record comprising descriptions of attributes of the first entity from the first set and second sets of attributes, wherein the fused record is generated by deduping the plurality of records to associate the first record and the one or more second record with the unique entity identifier and compiling the first set and one or more second sets of attributes; and
   send, to the client system, responsive to the request to access the first record, instructions for presenting the fused record.

18. The media of claim 17, wherein the software is further operable when executed to:
   compute a semantic weight for each set of attributes of the first entity; and
   sort each set of attributes in the order of corresponding semantic weights.

19. A system comprising: one or more processors; and a non-transitory memory coupled to the processors comprising instructions executable by the processors, the processors operable when executing the instructions to:
- receive, from a client system, a request to access a first record in a plurality of records, wherein the first record describes a first set of attributes of a first entity;
- determine the first record is linked to a globally unique entity identifier;
- identify one or more second records linked to the unique entity identifier, wherein the one or more second records describe one or more second sets of attributes of the first entity;
- generate a fused record comprising descriptions of attributes of the first entity from the first set and second sets of attributes, wherein the fused record is generated by deduping the plurality of records to associate the first record and the one or more second record with the unique entity identifier and compiling the first set and one or more second sets of attributes; and
- send, to the client system, responsive to the request to access the first record, instructions for presenting the fused record.

20. The system of claim 19, further comprising:
- compute a semantic weight for each set of attributes of the first entity; and
- sort each set of attributes in the order of corresponding semantic weights.

\* \* \* \* \*